United States Patent
Drach et al.

(10) Patent No.: US 11,712,964 B1
(45) Date of Patent: Aug. 1, 2023

(54) SYSTEMS AND METHODS FOR VEHICLE SUSPENSIONS

(71) Applicant: Oshkosh Corporation, Oshkosh, WI (US)

(72) Inventors: Andrew Drach, Oshkosh, WI (US); Erik S. Ellifson, Oshkosh, WI (US); Aaron J. Rositch, Oshkosh, WI (US); Devon C. Palmer, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 330 days.

(21) Appl. No.: 17/097,605

(22) Filed: Nov. 13, 2020

Related U.S. Application Data

(63) Continuation of application No. 17/085,748, filed on Oct. 30, 2020, now abandoned.
(Continued)

(51) Int. Cl.
*B60K 17/04* (2006.01)
*B62D 7/15* (2006.01)
(Continued)

(52) U.S. Cl.
CPC ........ *B60K 17/043* (2013.01); *B60G 17/0157* (2013.01); *B62D 7/15* (2013.01); *F16C 3/03* (2013.01); *B60G 2204/30* (2013.01)

(58) Field of Classification Search
CPC .... B60K 17/043; B60K 17/165; B60K 17/24; B60K 17/22; B60K 17/30; B60G 17/0157; B60G 2204/30; B62D 7/15; F16C 3/03
See application file for complete search history.

(56) References Cited

U.S. PATENT DOCUMENTS 2,427,710 A 9/1947 Bush
2,661,069 A 12/1953 Cooper
(Continued)

FOREIGN PATENT DOCUMENTS

CN 108422855 A * 8/2018 ............. B60K 17/06
CN 114043823 A * 2/2022
(Continued)

OTHER PUBLICATIONS

Kocheshev, Single Wheel-electric Drive I.e. Front Wheel Drive For E.g. Electric Vehicle . . . , Jul. 3, 2008, EPO, DE 102006061770 A1, Machine Translation (Year: 2008).*

*Primary Examiner* — Paul N Dickson
*Assistant Examiner* — Matthew D Lee
(74) *Attorney, Agent, or Firm* — Foley & Lardner LLP

(57) ABSTRACT

A suspension element includes a housing, a first joint, and a second joint. The housing is configured to couple a tractive element assembly to a vehicle. The housing has a first end configured to engage a portion of the vehicle and a second end configured to interface with the tractive element assembly. The first joint includes a first actuator and a first resilient member. The first actuator is configured to facilitate linear extension and retraction of the suspension element. The second joint includes a second actuator and a second resilient member. The second actuator is configured to facilitate rotational movement of the suspension element. The first resilient member and the second resilient member are configured to support a static load of the vehicle.

20 Claims, 24 Drawing Sheets

Related U.S. Application Data

(60) Provisional application No. 62/927,852, filed on Oct. 30, 2019.

(51) Int. Cl.
  *B60G 17/015*   (2006.01)
  *F16C 3/03*    (2006.01)

(56) References Cited

U.S. PATENT DOCUMENTS

| | | | |
|---|---|---|---|
| 2,779,425 A | 1/1957 | Miller | |
| 3,689,101 A * | 9/1972 | Spence | B62D 49/0621 16/44 |
| 4,205,730 A | 6/1980 | McColl | |
| 7,588,113 B2 | 9/2009 | Scharfenberg | |
| 2011/0024219 A1 | 2/2011 | Jorgensen et al. | |
| 2020/0062303 A1 | 2/2020 | Althaus et al. | |
| 2020/0189376 A1 * | 6/2020 | Crane | B60K 17/04 |

FOREIGN PATENT DOCUMENTS

| | | | | |
|---|---|---|---|---|
| DE | 102006061770 A1 * | 7/2008 | | B60C 23/003 |
| DE | 10 2004 005 869 | 9/2009 | | |
| DE | 102011121795 A1 * | 6/2013 | | B60K 17/043 |
| JP | S 56163970 A | 12/1981 | | |
| WO | WO-0154939 A2 * | 8/2001 | | B60G 11/16 |
| WO | WO-2009118084 A1 * | 10/2009 | | B60G 17/015 |

* cited by examiner

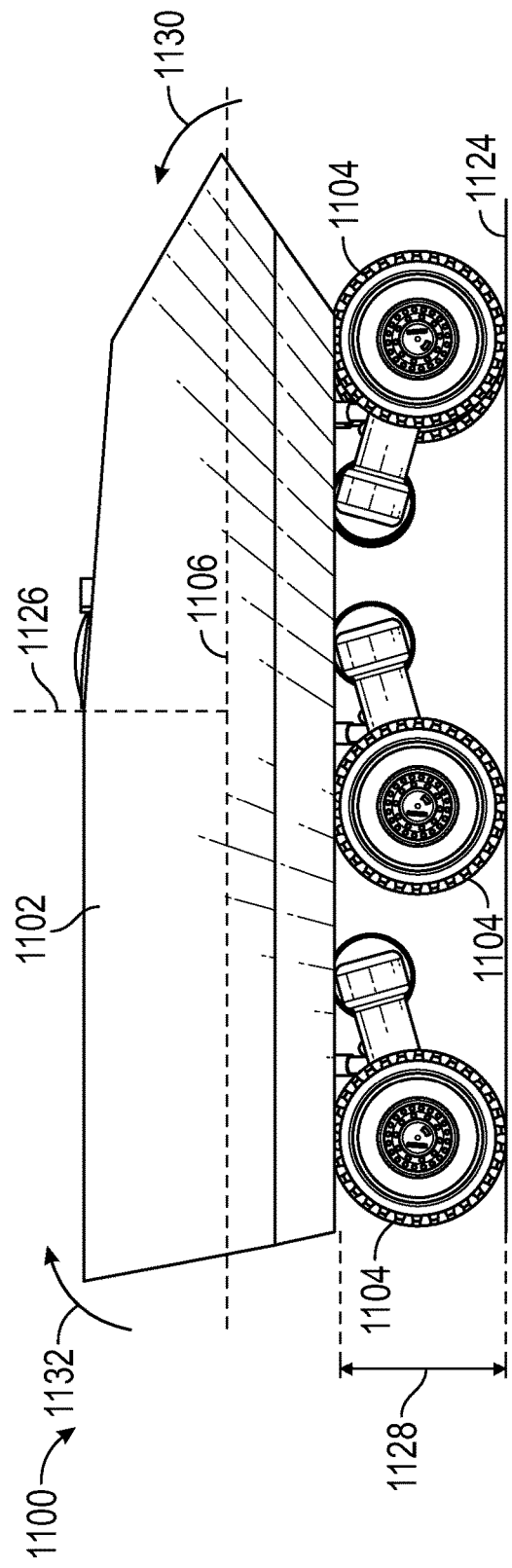
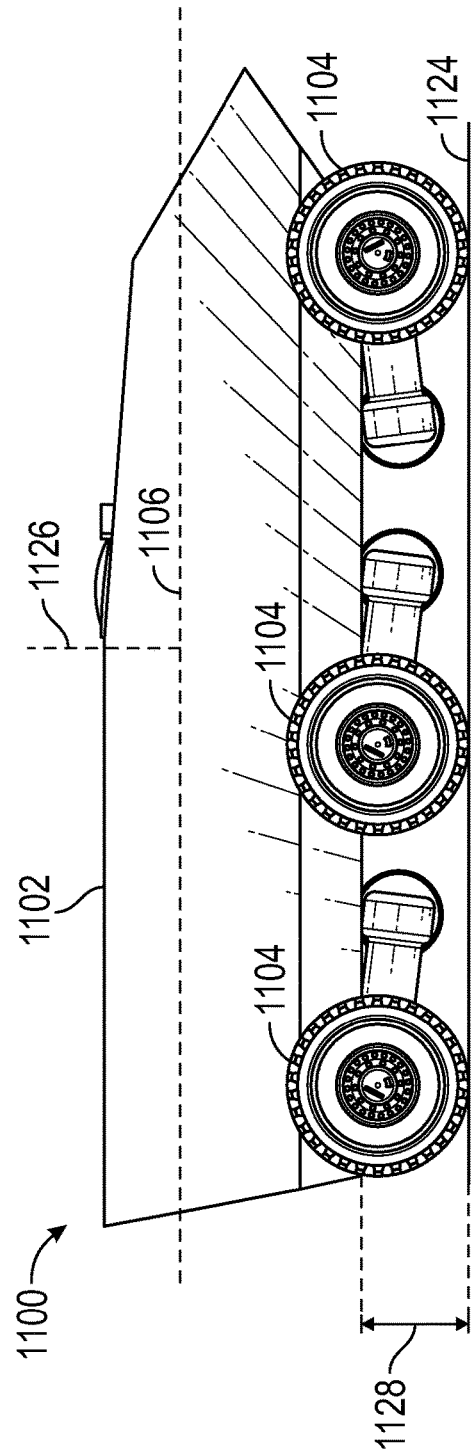

SYSTEMS AND METHODS FOR VEHICLE SUSPENSIONS

CROSS-REFERENCE TO RELATED PATENT APPLICATION

This application is a continuation of U.S. patent application Ser. No. 17/085,748, filed Oct. 30, 2020, which claims the benefit of and priority to U.S. Provisional Patent Application No. 62/927,852, filed Oct. 30, 2019, both of which are incorporated herein by reference in their entireties.

BACKGROUND

Suspension systems traditionally couple a body of a vehicle to one or more axles. Such suspension systems may include solid axle suspension systems and independent suspension systems, among others. Independent suspension systems facilitate independent wheel movement as the vehicle encounters one or more obstacles (e.g., uneven terrain, potholes, curbs, etc.). The independent suspension system reduces the forces experienced by passengers as the vehicle encounters the obstacles. Independent suspension systems may include one or more arms (e.g., A-arms, swing arms, etc.) that are coupled to a hub. A wheel and tire assembly may be attached to the hub. Various suspension components are coupled to the arms and the body of the vehicle.

SUMMARY

One embodiment of the present disclosure is a suspension system for a vehicle. The suspension system includes a wheel hub, a tractive element, a housing, a first power transmission train, and a second power transmission train. The tractive element is rotatably coupled with the wheel hub and configured to be driven for transportation and rotated for steering. The first power transmission train is positioned at least partially within the housing and is configured to drive the tractive element for transportation. The first power transmission train includes a first telescoping drive shaft. The second power transmission train is positioned at least partially within the housing and is configured to drive the tractive element to rotate for steering. The second power transmission train includes a second telescoping drive shaft. The second telescoping drive shaft is positioned within the first telescoping drive shaft, and both the first telescoping drive shaft and the second telescoping drive shaft are positioned within the housing.

Another embodiment of the present disclosure is a suspension system for a vehicle. The suspension system includes multiple suspension sub-systems. Each of the multiple suspension sub-systems are angularly offset from each other. Each of the multiple suspension sub-systems include a wheel hub, a tractive element, a housing, and multiple power transmission trains. The tractive element is rotatably coupled with the wheel hub and is configured to be driven for transportation and rotated for steering. The multiple power transmission trains are positioned at least partially within the housing. Each of the power transmission trains are configured to independently drive the tractive element for transportation, to drive the tractive element to rotate for steering, or to drive the wheel hub to rotate.

Another embodiment of the present disclosure is a vehicle including a chassis and a suspension system coupled with the chassis. The suspension system includes a wheel hub, a tractive element, a housing, a first power transmission train, and a second power transmission train. The tractive element is rotatably coupled with the wheel hub and configured to be driven for transportation and rotated for steering. The first power transmission train is positioned at least partially within the housing and is configured to drive the tractive element for transportation. The first power transmission train includes a first telescoping drive shaft. The second power transmission train is positioned at least partially within the housing configured to drive the tractive element to rotate for steering. The second power transmission train includes a second telescoping drive shaft. The second telescoping drive shaft is positioned within the first telescoping drive shaft, and both the first telescoping drive shaft and the second telescoping drive shaft are positioned within the housing.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, in which:

FIG. 21 is a side view of the suspension system of FIG. 20 in a partially raised position, according to an exemplary embodiment;

FIG. 22 is a side view of the suspension system of FIG. 20 in a lowered position, according to an exemplary embodiment;

DETAILED DESCRIPTION

Figure 1:
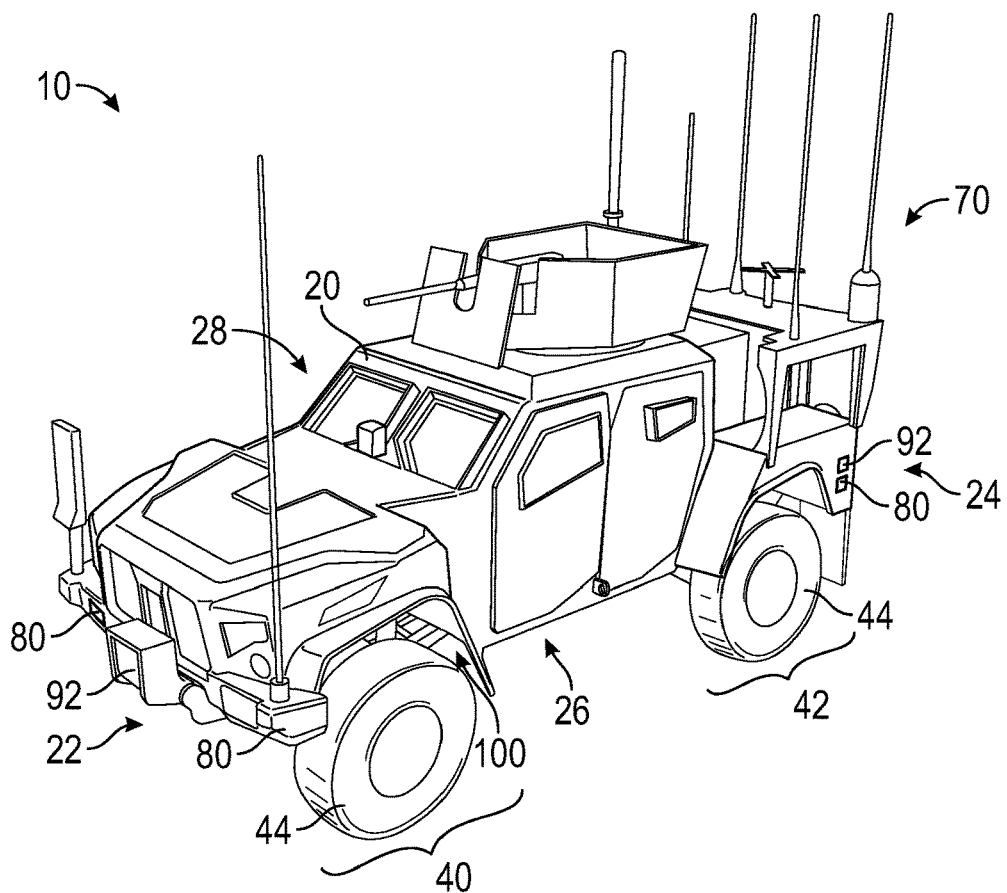
FIG. 1 is a perspective view of a vehicle, according to an exemplary embodiment.

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

According to an exemplary embodiment, a vehicle includes a chassis and a body supported by a suspension system. Vehicle suspension systems may be passive, semi-active, or fully-active systems. Passive suspension systems may have conventional uncontrolled, passive springs and dampers configured to absorb and dissipate loads experienced by a tractive element (e.g., wheel assembly, etc.) to reduce (e.g., lessen, mitigate, etc.) impact loads (e.g., from bumps, potholes, etc.) transferred to the chassis, body, and/or passengers of the vehicle. Semi-active suspension systems may further reduce impact loads (e.g., relative to passive suspension systems, etc.) by controlling a damping force provided by the suspension system. According to an exemplary embodiment, the vehicle of the present disclosure has a fully-active suspension system configured to add energy with a controlled motoring force and remove energy with a controlled damping force. The suspension system has passive resilient members (e.g., springs, etc.) to support the static mass of the vehicle. Traditional passive, semi-active, and/or fully-active suspension systems are configured as single degree of freedom suspension systems (e.g., linear actuation, etc.).

According to an exemplary embodiment, the suspension system of the present disclosure is a fully-active and multiple degree of freedom suspension system configured to facilitate providing a near-constant force capability (e.g., the force transferred to the chassis, body, and/or passengers of the vehicle varies less than a threshold amount, is near-constant, etc.). The suspension system combines multiple degrees of freedom and active, independent suspension control to provide superior off-road performance and terrain accessibility of a vehicle (e.g., enabling access to terrain that current vehicles are not capable of negotiating, etc.). Equipped with the fully-active and multiple degree of freedom suspension system, the exemplary vehicle may no longer be limited to driving on roads or improved surfaces where improvised explosive devices (IEDs) pose the largest threat (e.g., the exemplary suspension facilitates avoiding enemy engagement, etc.).

Each suspension element of the fully-active and multiple degree of freedom suspension system includes a multiple degree of freedom linkage configured to facilitate increased wheel travel, independent corner control, and active force control, among other features. According to an exemplary embodiment, the suspension elements increase vehicle mobility by substantially increasing suspension travel. The suspension having increased suspension travel facilitates faster vehicle speed on terrain, extreme obstacle negotiation, and increased access to various terrain. By way of example, vehicles equipped with the suspension system of the present disclosure may traverse terrain that is inaccessible by vehicles with other, traditional suspension systems (e.g., trenches, gaps, rubble piles, and rocks may become more negotiable, etc.). By way of another example, vehicles having the exemplary suspension system may have increased vertical suspension travel, be faster, and highly mobile (e.g., over rough terrain, etc.). Greater vertical wheel travel may also improve a vehicle's ride quality compared to traditional vehicles with less vertical wheel travel.

According to an exemplary embodiment, the suspension system includes or is coupled to a control system and an energy storage system. The control system is configured to input energy into the suspension system according to a suspension control strategy and regenerate energy to the vehicle energy storage system during controlled damping. The suspension system may thereby provide both superior ride and improved efficiency compared to passive or semi-active suspension systems. In some embodiments, the suspension system is configured to rapidly lower the vehicle's profile (e.g., center of gravity, signature, etc.) when the vehicle is being engaged by or encountering a threat (e.g., an enemy, a rocket propelled grenade (RPG), a low hanging obstacle, etc.). By reducing its signature (e.g., ducking, squatting, kneeling, etc.), the vehicle may have an increased likelihood of avoiding the threat.

Figure 2:
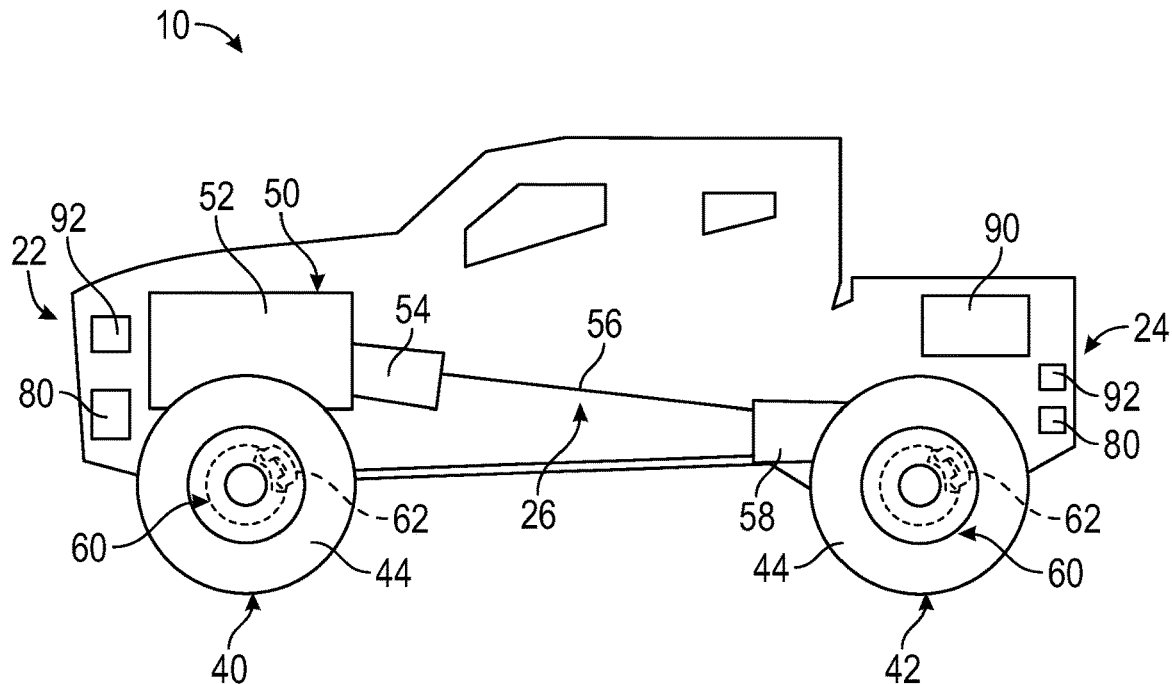
FIG. 2 is a schematic side view of the vehicle of FIG. 1, according to an exemplary embodiment.
Figure 3:
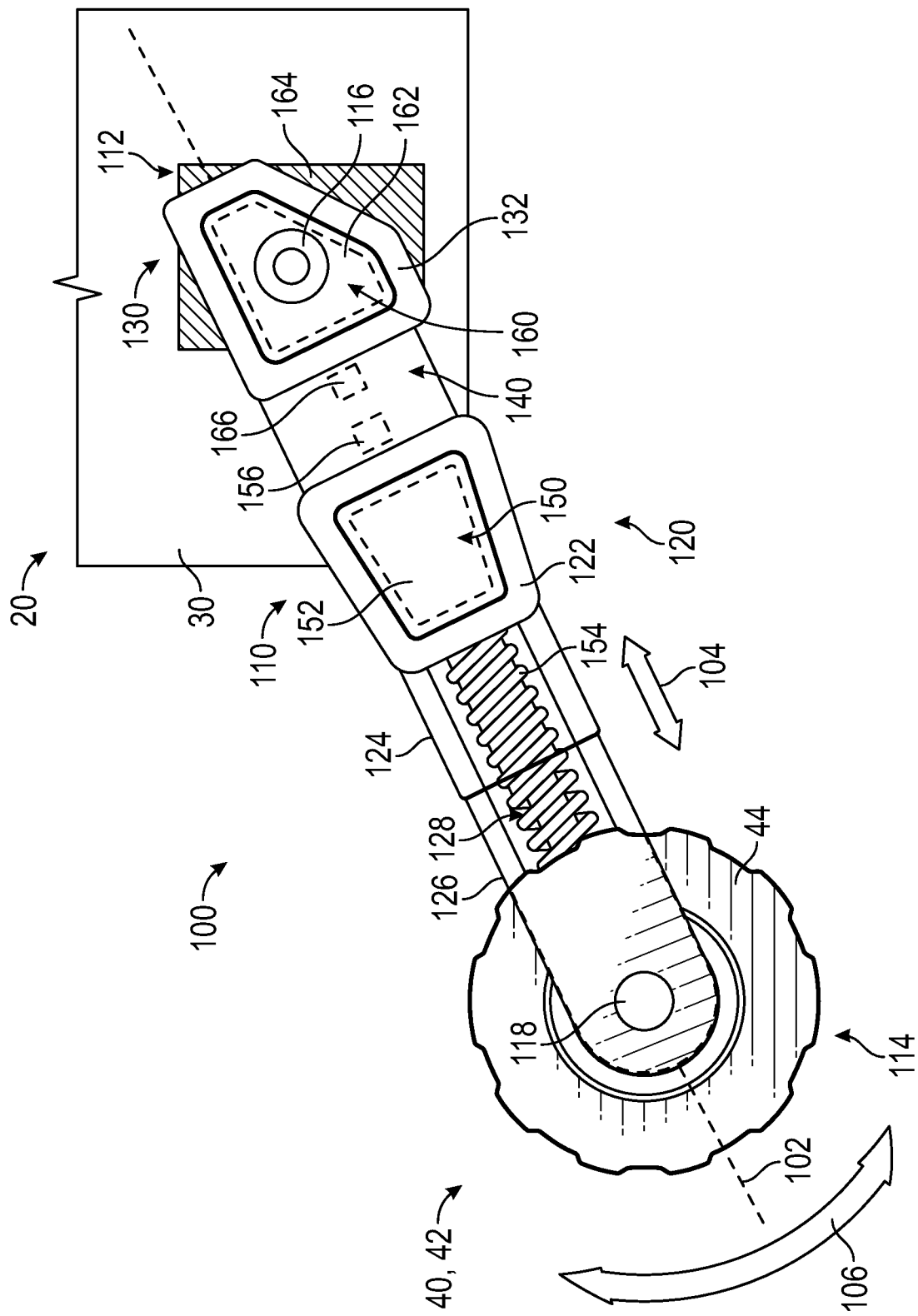
FIG. 3 is a schematic side view of a suspension element of the vehicle of FIG. 1, according to an exemplary embodiment.

According to the exemplary embodiment shown in FIGS. 1-3, a suspension system (e.g. a fully-active and multiple degree of freedom suspension system, etc.) includes a plurality of suspension elements, shown as electromechanical suspension elements 100, coupled to a vehicle, shown as vehicle 10. According to an exemplary embodiment, the vehicle 10 is a military ground vehicle. In other embodiments, the vehicle 10 is an off-road vehicle such as an utility task vehicle, a recreational off highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle. The suspension system of the vehicle 10 may be configured for operation on both paved and rough, off-road terrain. As such, the suspension system may be correspondingly configured to support the weight of the vehicle 10 while providing comfortable ride quality on both paved and rough, off-road terrain.

As shown in FIGS. 1-2, the vehicle 10 includes a hull and frame assembly 20 (e.g., a monocoque, etc.). In other embodiments, the vehicle 10 includes a chassis or frame (e.g., frame rails, etc.) that supports a body assembly. As shown in FIGS. 1-2, the hull and frame assembly 20 defines a first longitudinal side, shown as front 22, a second longitudinal side, shown as rear 24, a first lateral side, shown as left side 26, and a second lateral side, shown as right side 28. The vehicle 10 includes a plurality of tractive element assemblies, shown as front tractive element assemblies 40 and rear tractive element assemblies 42. In some embodiments, the vehicle 10 includes a plurality of front tractive element assemblies 40 and/or a plurality of rear tractive element assemblies 42 positioned on each of the left side 26 and right side 28 of the vehicle 10 (e.g., two, three, four, etc.). The front tractive element assemblies 40 and/or the rear tractive element assemblies 42 may include brakes (e.g., disc brakes, drum brakes, air brakes, etc.), gear reductions, steering components, wheel hubs, wheels, and/or other features. As shown in FIGS. 1-2, the front tractive element assemblies 40 and the rear tractive element assemblies 42 include a tractive element, shown as wheel and tire assembly 44. In other embodiments, at least one of the front tractive element assemblies 40 and rear tractive element assemblies 42 include a different type of tractive element (e.g., a track, etc.).

According to an exemplary embodiment, electromechanical suspension element 100 of the suspension system is configured to couple one of the front tractive element assemblies 40 and/or one of the rear tractive element assemblies 42 to the hull and frame assembly 20 (or frame, chassis, body, etc.) of the vehicle 10 or another portion thereof. In one embodiment, the electromechanical suspension elements 100 are configured as leading-arm suspension elements (e.g., where the tractive elements are positioned in front of pivot axes for the respective electromechanical suspension elements 100, etc.). In other embodiments, the electromechanical suspension elements 100 are configured as trailing-arm suspension elements (e.g., where the tractive elements are positioned behind pivot axes for the respective electromechanical suspension elements 100, etc.). In still other embodiments, the electromechanical suspension elements 100 that couple the front tractive element assemblies 40 to the hull and frame assembly 20 are configured as leading-arm suspension elements and the electromechanical suspension elements 100 that couple the rear tractive element assemblies 42 to the hull and frame assembly 20 are configured as trailing-arm suspension elements. In an alternative embodiment, only the front tractive element assemblies 40 are coupled to the hull and frame assembly 20 with the electromechanical suspension elements 100 and the rear tractive element assemblies 42 are coupled to the hull and frame assembly 20 with another suspension system (e.g., traditional spring and damper suspension elements, etc.), or vice versa. In another alternative embodiment, the front tractive element assemblies 40 are coupled to the hull and frame assembly 20 with two-degree of freedom electromechanical suspension elements 100 (e.g., facilitate both rotation and extension and retraction, etc.) and the rear tractive element assemblies 42 are coupled to the hull and frame assembly 20 with one-degree of freedom electromechanical suspension elements 100 (e.g., facilitate rotation or extension and retraction, etc.), or vice versa.

As shown in FIG. 2, the vehicle 10 includes a powertrain system, shown as powertrain 50. The powertrain 50 includes a primary driver, shown as engine 52, an energy generation device, shown as generator 54, and an energy storage device (e.g., battery, capacitors, ultra-capacitors, etc.), shown as energy storage device 58, electrically coupled to the generator 54 by a connection (e.g., wire, lead, etc.), shown as electrical connection 56. The engine 52 may receive fuel (e.g., gasoline, diesel, etc.) from a fuel tank and combust the fuel to generate mechanical energy. A transmission may receive the mechanical energy and provides an output to the generator 54. In other embodiments, the engine 52 drives the generator 54 directly. The generator 54 is configured to convert the mechanical energy into electrical energy that may be stored by the energy storage device 58. The energy storage device 58 may provide electrical energy to a motive driver to drive at least one of the front tractive element assemblies 40 and the rear tractive element assemblies 42. In some embodiments, each of the front tractive element assemblies 40 and/or the rear tractive element assemblies 42 include an individual motive driver (e.g., a motor that is electrically coupled to the energy storage device 58, etc.) configured to facilitate independently driving each of the wheel and tire assemblies 44. In an alternative embodiment, a transmission of the vehicle is rotationally coupled to the engine 52 and a drive shaft. The drive shaft may be received by a differential configured to convey the rotational energy of the drive shaft to a final drive (e.g., half-shafts coupled to the wheel and tire assemblies 44, etc.). The final drive then propels or moves the vehicle 10. In such embodiments, the vehicle 10 may not include the generator 54 and/or the energy storage device 58. According to an exemplary embodiment, the engine 52 is a compression-ignition internal combustion engine that utilizes diesel fuel. In alternative embodiments, the engine 52 is another type of device (e.g., spark-ignition engine, fuel cell, electric motor, etc.) that is otherwise powered (e.g., with gasoline, compressed natural gas, hydrogen, electricity, etc.).

As shown in FIG. 2, the vehicle 10 includes one or more steering assemblies, shown as steering systems 60, configured to steer the vehicle 10. The steering systems 60 may include one or more braking systems (e.g., disc brakes, air brakes, drum brakes, etc.), shown as brakes 62, configured to brake the vehicle 10. In other embodiments, the vehicle 10 includes both steering systems 60 and brakes 62. In some embodiments, the vehicle 10 includes one or more front steering systems 60 (e.g., to facilitate steering the front tractive element assemblies 40 based on a steering wheel position, etc.) and/or one or more rear steering systems 60 (e.g., to facilitate steering the rear tractive element assemblies 42 based on a steering wheel position, etc.). In one embodiment, each of the front tractive element assemblies 40 and/or the rear tractive element assemblies 42 include an actuator (e.g., linear actuator, rotational actuator, etc.) electrically coupled to the energy storage device 58 and configured to facilitate independently steering each of the wheel and tire assemblies 44 (e.g., actuating a king pin steering mechanism with the actuator, etc.). In another embodiment, the vehicle 10 is steered using skid steering (e.g., the brakes 62 and/or the motive drivers are used to steer the vehicle 10, etc.). By way of example, the individual motive drivers and/or the brakes 62 may be used to operate the wheel and tire assemblies 44 at different speeds to steer the vehicle 10. For example, a front tractive element assembly 40 on the left side 26 of the vehicle 10 may be driven slower (e.g., by changing the speed of individual motive drivers, by engaging a brake 62, etc.) than a front tractive element assembly 40 on the right side 28 of the vehicle 10 such that the vehicle 10 turns left. In some embodiments, the vehicle 10 is steered cooperatively using skid steering and king pin steering with actuators. In an alternative embodiment, the vehicle 10 includes a traditional steering mechanism (e.g., a rack and pinion steering mechanism with king pin steering, etc.).

As shown in FIGS. 1-2, the vehicle 10 includes a communication system, shown as communication system 70, first sensors, shown as terrain sensors 80, and a threat avoidance system, shown as threat avoidance system 90. The threat avoidance system 90 includes second sensors, shown as threat detection sensors 92, according to the exemplary embodiment shown in FIGS. 1-2. According to an exemplary embodiment, the communication system 70 is configured to communicate with an external system such as a global positioning system (GPS) and/or a topography system. Communication with a GPS and/or a topography system may facilitate receiving topography data indicative of the topography of a surrounding environment or landscape around and/or ahead of the vehicle 10 (e.g., based on the current position of the vehicle 10, based on the direction of travel of the vehicle 10, etc.). According to an exemplary embodiment, the terrain sensors 80 are configured to acquire topography data indicative of the topography of a surrounding environment (e.g., terrain, landscape, trenches, gaps, rubble piles, rocks, etc.) proximate the vehicle 10 (e.g., forward, to the side, to the rear, within the range of the terrain sensors 80, to facilitate terrain mapping, etc.). The terrain sensors 80 may be variously positioned about the vehicle 10 (e.g., disposed along the front 22, the rear 24, the left side 26, the right side 28, etc.). According to an exemplary embodiment, the threat detection sensors 92 of the threat avoidance system 90 are configured to acquire data indicative of a potential threat and/or an actual threat near the vehicle 10 (e.g., an incoming RPG, a low hanging obstacle, etc.). The threat detection sensors 92 may be variously positioned about the vehicle 10 (e.g., disposed along the front 22, the rear 24, the left side 26, the right side 28, etc.). The control system may use the topography data and/or the threat data to control the electromechanical suspension elements 100 of the suspension system.

As shown in FIG. 3, the electromechanical suspension element 100 includes a main body or linkage, shown as housing 110. The housing 110 defines a longitudinal axis, shown as longitudinal axis 102, that extends along the length of the housing 110. The housing 110 has a first end, shown as proximal end 112, and an opposing second end, shown as distal end 114. As shown in FIG. 3, the proximal end 112 includes a first coupler, shown as proximal eyelet 116, and the distal end 114 includes a second coupler, shown as distal eyelet 118. According to the exemplary embodiment shown in FIG. 3, the proximal eyelet 116 is configured to facilitate coupling the proximal end 112 of the housing 110 to a portion of the hull and frame assembly 20 (e.g., chassis, side plate, hull, body, bracket, etc.) with a mount, shown as suspension mount 30, and the distal eyelet 118 is configured to facilitate coupling the distal end 114 of the housing 110 to one of the wheel and tire assemblies 44 (e.g., thereby coupling the wheel and tire assemblies 44 to the hull and frame assembly 20, etc.). According to an exemplary embodiment, the proximal eyelet 116 and the distal eyelet 118 are integrally formed with the housing 110.

As shown in FIG. 3, the electromechanical suspension element 100 includes a first joint, shown as linear joint 120, that provides a first degree of freedom (e.g., linear extension and retraction of the electromechanical suspension element 100, etc.) and a second joint, shown as rotational joint 130, that provides a second degree of freedom (e.g., rotational movement of the electromechanical suspension element 100 about a pivot axis extending through the proximal eyelet 116, etc.). According to an exemplary embodiment, the linear joint 120 and the rotational joint 130 are configured to provide fully-active actuation (e.g., capable of adding energy with a controlled motoring force and removing energy with a controlled damping force, etc.). In other embodiments, at least one of the linear joint 120 and the rotational joint 130 are configured to provide another actuation profile (e.g., semi-active actuation, passive actuation, etc.).

As shown in FIG. 3, the linear joint 120 includes a first actuator housing, shown as linear actuator housing 122, a first tube, shown as outer tube 124, and a second tube, shown as inner tube 126. The inner tube 126 is configured to translate along the longitudinal axis 102 (e.g., into and out of the outer tube 124, etc.). In one embodiment, the outer tube 124 and the inner tube 126 have circular cross-sections. According to an exemplary embodiment, the outer tube 124 has an inner diameter that is approximately equal to the outer diameter of the inner tube 126 such that the inner tube 126 is received in the outer tube 124. In other embodiments, the outer tube 124 and the inner tube 126 have another cross-sectional shape (e.g., square, hexagonal, rectangular, oval, etc.). In still other embodiments, the electromechanical suspension element 100 includes another structure configured to facilitate extension and retraction thereof (e.g., a bellows, etc.). As shown in FIG. 3, the outer tube 124 and the inner tube 126 cooperatively define a cavity, shown as internal volume 128. Movement of the inner tube 126 relative to the outer tube 124 causes the internal volume 128 to increase or decrease in size. By way of example, the internal volume 128 decreases as the inner tube 126 retracts along the longitudinal axis 102 into the outer tube 124 and increases as the inner tube 126 extends along the longitudinal axis 102 out of the outer tube 124.

As shown in FIG. 3, the linear joint 120 includes a first actuation system, shown as linear actuation system 150, having a first actuator, shown as linear actuator 152, and a first resilient member, shown as linear resilient member 154. The linear actuator housing 122 is configured to receive and store the linear actuator 152, according to an exemplary embodiment. The outer tube 124 and the inner tube 126 are configured to cooperatively receive and store the linear resilient member 154 within the internal volume 128.

According to an exemplary embodiment, the linear resilient member 154 is configured to support at least a portion of the static load (e.g., weight, sprung mass, etc.) of the vehicle 10. In one embodiment, the linear resilient member 154 is or includes a coil spring. In another embodiment, the linear resilient member 154 is or includes a hydro-pneumatic spring. In still another embodiment, the linear resilient member 154 is or includes another type of resilient member capable of supporting the static load of the vehicle 10 (e.g., a gas spring, etc.).

According to an exemplary embodiment, the linear actuator 152 is configured to facilitate linear extension and retraction of the inner tube 126 along the longitudinal axis 102 into and out of the outer tube 124, as indicated by directional arrow 104. The linear actuator 152 is electrically coupled to the energy storage device 58 and configured to extend and/or retract the linear joint 120 (e.g., compress and/or expand the linear resilient member 154, etc.), according to an exemplary embodiment. In other embodiments, the linear actuator 152 is otherwise powered (e.g., pneumatically, hydraulically, etc.). The linear joint 120 extension and retraction provides compliance and facilitates absorbing forces incident in the longitudinal direction of the vehicle 10.

As shown in FIG. 3, the rotational joint 130 includes a second actuator housing, shown as rotational actuator housing 132. According to an exemplary embodiment, the rotational actuator housing 132 is coupled to (e.g., attached to, fixed to, integrally formed with, etc.) the linear actuator housing 122 by an intermediate structural element, shown as intermediate member 140. As shown in FIG. 3, the rotational joint 130 is configured to receive at least one component of a second actuation system, shown as rotational actuation system 160, having a second actuator, shown as rotational actuator 162, and a second resilient member, shown as rotational resilient member 164. The rotational actuator housing 132 is configured to receive and store the rotational actuator 162, according to an exemplary embodiment. In an alternative embodiment, the rotational actuator 162 is coupled to the housing 110 (e.g., to the rotational actuator housing 132 at the proximal eyelet 116, coaxial with a pivot axis through the proximal eyelet 116, coupled along the length of the housing 110, etc.) and positioned externally relative to the rotational actuator housing 132. In one embodiment, the rotational resilient member 164 is rotationally coupled to the housing 110 (e.g., to the rotational actuator housing 132 at the proximal eyelet 116, coaxial with a pivot axis through the proximal eyelet 116, to the proximal end 112 of the housing 110, etc.). In another embodiment, the rotational resilient member 164 is received by and disposed within the rotational actuator housing 132.

According to an exemplary embodiment, the rotational resilient member 164 is configured to support at least a portion of the static load (e.g., weight, sprung mass, etc.) of the vehicle 10. The linear resilient members 154 and the rotational resilient members 164 of the electromechanical suspension elements 100 are configured to cooperatively support the entire static load of the vehicle 10, according to an exemplary embodiment. In one embodiment, the rotational resilient member 164 is or includes a torsion bar. By way of example, a first end of the torsion bar may be coupled (e.g., fixed, welded, fastened, etc.) to a portion of the hull and frame assembly 20 (e.g., chassis, frame, mounting location, bracket, suspension mount 30, etc.), and a second end of the torsion bar may be coupled to the housing 110 of the electromechanical suspension element 100 (e.g., coaxially coupled along a pivot axis of the proximal eyelet 116, coupled to the rotational actuator housing 132, coupled to the linear actuator housing 122, coupled to the intermediate member 140, etc.). In another embodiment, the rotational resilient member 164 is or includes a bell crank assembly. The bell crank assembly may include a cam having a lobe and a linear resilient element (e.g., a coil spring, etc.). By way of example, the cam may be coaxially and rotationally coupled along the pivot axis of the housing 110 (e.g., an axis through the proximal eyelet 116, etc.). The lobe may be configured to engage the linear resilient element. The linear resilient element may be positioned to bias the cam and the electromechanical suspension element 100 to a static load position (e.g., providing a rotational biasing force, etc.). In other embodiments, the rotational resilient member 164 is or includes a hydro-pneumatic spring. In still other embodiments, the rotational resilient member 164 is or includes a rotational spring element. In yet other embodiments, the rotational resilient member 164 is or includes another type of resilient member capable of supporting the static load of the vehicle 10.

According to an exemplary embodiment, the rotational actuator 162 is configured to rotate the electromechanical suspension element 100 about the proximal eyelet 116 (i.e., about the pivot axis thereof), as indicated by directional arrow 106. The rotational actuator 162 is electrically coupled to the energy storage device 58 and configured to rotate the electromechanical suspension element 100, according to an exemplary embodiment. In other embodiments, the rotational actuator 162 is otherwise powered (e.g., pneumatically, hydraulically, etc.). The electromechanical suspension element 100 rotation provides compliance and facilitates absorbing forces incident in a vertical direction (e.g., by facilitating a relatively large amount of vertical travel of the front tractive element assemblies 40 and/or the rear tractive element assemblies 42, etc.).

According to an exemplary embodiment, the rotational actuator 162 pivots the electromechanical suspension element 100 through a range of motion that corresponds with a vertical displacement of the wheel and tire assembly 44. In one embodiment, the maximum vertical displacement of the wheel and tire assembly 44 is between three and four feet. In other embodiments, the maximum vertical displacement of the wheel and tire assembly 44 is less than or greater than three to four feet. The suspension system having the large amount of suspension travel facilitates increased vehicle speed on terrain, extreme obstacle negotiation, and increased access to various terrain. By way of example, the electromechanical suspension elements 100 may facilitate traversing terrain that is inaccessible by vehicles with other, traditional suspension systems (e.g., trenches, gaps, rubble piles, and rocks may become more negotiable, etc.). By way of another example, the electromechanical suspension elements 100 may facilitate designing fast, highly mobile, off-road and/or on-road vehicles, while improving ride quality.

In some embodiments, the linear actuation system 150 includes a first sensor, shown as linear sensor 156. According to an exemplary embodiment, the linear sensor 156 is positioned to acquire position data indicative of the extension or retraction of the linear joint 120. By way of example, the linear sensor 156 may be positioned to acquire data relating to the position of the inner tube 126 (e.g., relative to a static position or static ride height, relative to the linear sensor 156, based on an amount of actuation of the linear actuator 152, etc.) and/or the amount of actuation of the linear actuator 152. In some embodiments, the rotational actuation system 160 includes a second sensor, shown as rotational sensor 166. According to an exemplary embodiment, the rotational sensor 166 is positioned to acquire position data indicative of the rotational position of the electromechanical suspension element 100 (e.g., relative to a static position, relative to the rotational sensor 166, etc.).

Figure 4:
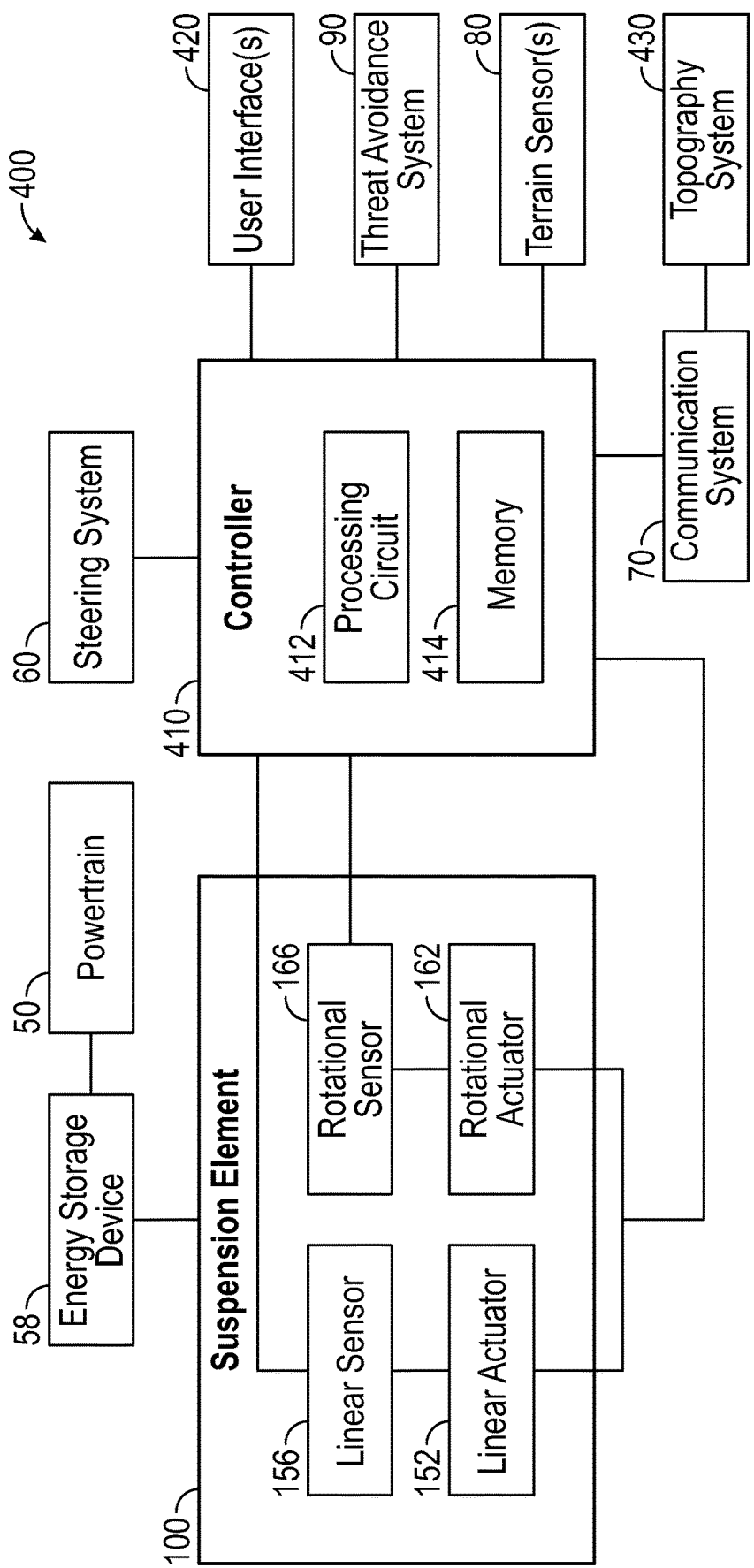
FIG. 4 is a schematic block diagram of a controller configured to operate and/or control various components of a vehicle, according to an exemplary embodiment.

According to the exemplary embodiment shown in FIG. 4, a control system 400 for a vehicle (e.g., the vehicle 10, etc.) includes a controller 410. In one embodiment, the controller 410 is configured to selectively engage, selectively disengage, control, and/or otherwise communicate with components of the vehicle 10. As shown in FIG. 4, the controller 410 is coupled to the steering system 60, a topography system 430 (e.g., with the communication system 70, etc.), the terrain sensors 80, the threat avoidance system 90, the linear actuator 152, the linear sensor 156, the rotational actuator 162, the rotational sensor 166, and a user interface 420. In other embodiments, the controller 410 is coupled to more or fewer components. The controller 410 may be configured to selectively control the position (e.g., rotation, extension, retraction, etc.) of the electromechanical suspension elements 100 to facilitate providing a near-constant force to the vehicle 10. By way of example, the controller 410 may send and receive signals with the steering system 60, the topography system 430 with the communication system 70, the terrain sensors 80, the threat avoidance system 90, the linear actuator 152, the linear sensor 156, the rotational actuator 162, the rotational sensor 166, and the user interface 420.

The controller 410 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 4, the controller 410 includes a processing circuit 412 and a memory 414. The processing circuit 412 may include an ASIC, one or more FPGAs, a DSP, circuits containing one or more processing components, circuitry for supporting a microprocessor, a group of processing components, or other suitable electronic processing components. In some embodiments, the processing circuit 412 is configured to execute computer code stored in the memory 414 to facilitate the activities described herein. The memory 414 may be any volatile or non-volatile computer-readable storage medium capable of storing data or computer code relating to the activities described herein. According to an exemplary embodiment, the memory 414 includes computer code modules (e.g., executable code, object code, source code, script code, machine code, etc.) configured for execution by the processing circuit 412. The memory 414 includes various actuation profiles corresponding to loading conditions experienced by the suspension system of the vehicle 10, according to an exemplary embodiment. In some embodiments, controller 410 represents a collection of processing devices (e.g., servers, data centers, etc.). In such cases, the processing circuit 412 represents the collective processors of the devices, and the memory 414 represents the collective storage devices of the devices.

In one embodiment, the user interface 420 includes a display and an operator input. The display may be configured to display a graphical user interface, an image, an icon, and/or still other information. In one embodiment, the display includes a graphical user interface configured to provide general information about the vehicle 10 (e.g., vehicle speed, fuel level, warning lights, etc.). The graphical user interface may also be configured to display a current position of the vehicle 10, one or more orientations of the electromechanical suspension elements 100, potential threats or incoming threats (e.g., a RPG, a low hanging obstacle, etc.), a suggested path or route to follow, and/or still other information relating to the vehicle 10 and/or the electromechanical suspension elements 100.

The operator input may be used by an operator to provide commands to at least one of the steering system 60, the communication system 70, the linear actuator 152, and the rotational actuator 162. The operator input may include one or more buttons, knobs, touchscreens, switches, levers, joysticks, pedals, a steering wheel, or handles. The operator input may facilitate manual control of some or all aspects of the operation of the electromechanical suspension elements 100 and the vehicle 10. It should be understood that any type of display or input controls may be implemented with the systems and methods described herein.

The controller 410 may be configured to control the linear actuator 152 and/or the rotational actuator 162 of each of the electromechanical suspension elements 100 to facilitate providing a near-constant force to the hull and frame assembly 20 of the vehicle 10 (e.g., by adjusting the pitch and roll of the vehicle 10, by absorbing input forces from the terrain or obstacles, etc.). In some embodiments, the controller 410 is configured to provide a command to the linear actuators 152 and/or the rotational actuators 162 positioned on the left side 26 and/or the right side 28 to adjust the roll of the vehicle 10. In some embodiments, the controller 410 is configured to provide a command to the linear actuators 152 and/or the rotational actuators 162 positioned at the front 22 and/or the rear 24 to adjust the pitch of the vehicle 10. In some embodiments, the controller 410 is configured to provide a command to any of the linear actuators 152 and/or the rotational actuators 162 to otherwise adjust the orientation of the vehicle 10.

In some embodiments, the controller 410 is configured to reactively control the linear actuators 152 and/or the rotational actuators 162 based on information feedback from the linear sensor 156 and/or the rotational sensor 166, respectively. By way of example, the controller 410 may provide a command to at least one of the linear actuator 152 and the rotational actuator 162 to lift (e.g., retract, rotate upward, etc.) a respective wheel and tire assembly 44 over an obstacle (e.g., rock, bump, etc.) in response to the linear sensor 156 and/or the rotational sensor 166 acquiring data that indicates such an obstacle has been encountered. By way of another example, the controller 410 may provide a command to at least one of the linear actuator 152 and the rotational actuator 162 to push (e.g., extend, rotate downward, etc.) a respective wheel and tire assembly 44 into an obstacle (e.g., pothole, trench, etc.) in response to the linear sensor 156 and/or the rotational sensor 166 acquiring data that indicates such an obstacle has been encountered. The controller 410 is thereby capable of adding energy via a controlled motoring force or removing energy via a controlled damping force. The linear sensor 156 and/or the rotational sensor 166 may be or include at least one of position sensors and load sensors, among other types of sensors, positioned to provide signals relating to obstacles and/or the surrounding terrain.

In some embodiments, the controller 410 is configured to actively control the linear actuators 152 and/or the rotational actuators 162 based on information feedback from the topography system 430 and/or the terrain sensors 80. By way of example, the controller 410 may receive topography data indicative of the topography of a surrounding environment or landscape around and/or ahead of the vehicle 10 (e.g., based on the current position of the vehicle 10, based on the direction of travel of the vehicle 10, etc.). By way of another example, the terrain sensors 80 may be configured to acquire topography data indicative of the topography of a surrounding environment (e.g., terrain, landscape, trenches, gaps, rubble piles, rocks, etc.) around the vehicle 10 (e.g., within the range of the terrain sensors 80, etc.). The controller 410 may provide a command to at least one of the linear actuators 152 and the rotational actuators 162 based on the topography data to compensate for obstacles and/or changes in the terrain to facilitate providing a near-constant force to the hull and frame assembly 20 (or chassis, frame, and/or body). For example, the controller 410 may be configured to provide a command to the linear actuators 152 and/or the rotational actuators 162 of one or more of the electromechanical suspension elements 100 to rotate, extend, and/or retract the electromechanical suspension elements 100 in order to level the vehicle 10 in response to the topography data indicating that the vehicle 10 is traveling on an uneven surface. In another example, the controller 410 may be configured to provide a command to the linear actuator 152 and/or the rotational actuator 162 of a respective electromechanical suspension element 100 to rotate, extend, and/or retract the electromechanical suspension element 100 in response to the topography data indicating the wheel and tire assembly 44 coupled to the electromechanical suspension element 100 is encountering or about to encounter an obstacle (e.g., a rock, pothole, trench, gap, rubble pile, etc.).

In some embodiments, the controller 410 is configured to actively control the linear actuators 152 and/or the rotational actuators 162 based on data provided by the threat detection sensors 92 of the threat avoidance system 90. By way of example, the threat detection sensors 92 may be configured to acquire threat data indicative of a potential threat and/or an actual threat near and/or approaching the vehicle 10. The controller 410 may thereby provide a command to at least one of the linear actuators 152 and the rotational actuators 162 based on the threat data to reduce the likelihood of encountering the threat. For example, the controller 410 may be configured to provide a command to the linear actuators 152 and/or the rotational actuators 162 of one or more of the electromechanical suspension elements 100 to rotate, extend, and/or retract the electromechanical suspension elements 100 in order reduce the signature (e.g., center of ncounters the step 2702. In order to crawl up the step 2702, a ducking, etc.) to avoid a low hanging obstacle (e.g., a tree branch, a low height clearance, etc.) and/or an incoming obstacle (e.g., enemy fire, an RPG, etc.). In another example, the controller 410 is configured to provide a command to the linear actuators 152 and/or the rotational actuators 162 of one or more of the electromechanical suspension elements 100 to rotate, extend, and/or retract the electromechanical suspension elements 100 in order increase the height of the vehicle 10 to avoid an obstacle on the ground (e.g., a tree stump, a boulder, an TED, etc.) and/or a low incoming obstacle (e.g., enemy fire, an RPG, a grenade, an animal, etc.).

In some embodiments, the controller 410 is configured to accommodate different passive spring rates (e.g., of the linear resilient member 154, the rotational resilient member 164, etc.), load fluctuations (e.g., from additional passengers or cargo, encountering obstacles, etc.), center of gravity shifts of the vehicle 10 (e.g., from additional passengers, cargo, etc.), etc. In some embodiments, the controller 410 is configured to control the linear actuators 152 and/or the rotational actuators 162 to isolate the hull and frame assembly 20 from vibrations (e.g., onboard the vehicle 10, incident upon the vehicle 10, etc.). In some embodiments, the controller 410 is configured to control the linear actuators 152 and/or the rotational actuators 162 to maintain the vehicle 10 at a target height (e.g., a static loading height, etc.) in response to different load conditions (e.g., additional weight, etc.).

Orbital Wheel Drive

Overview

Figure 5:
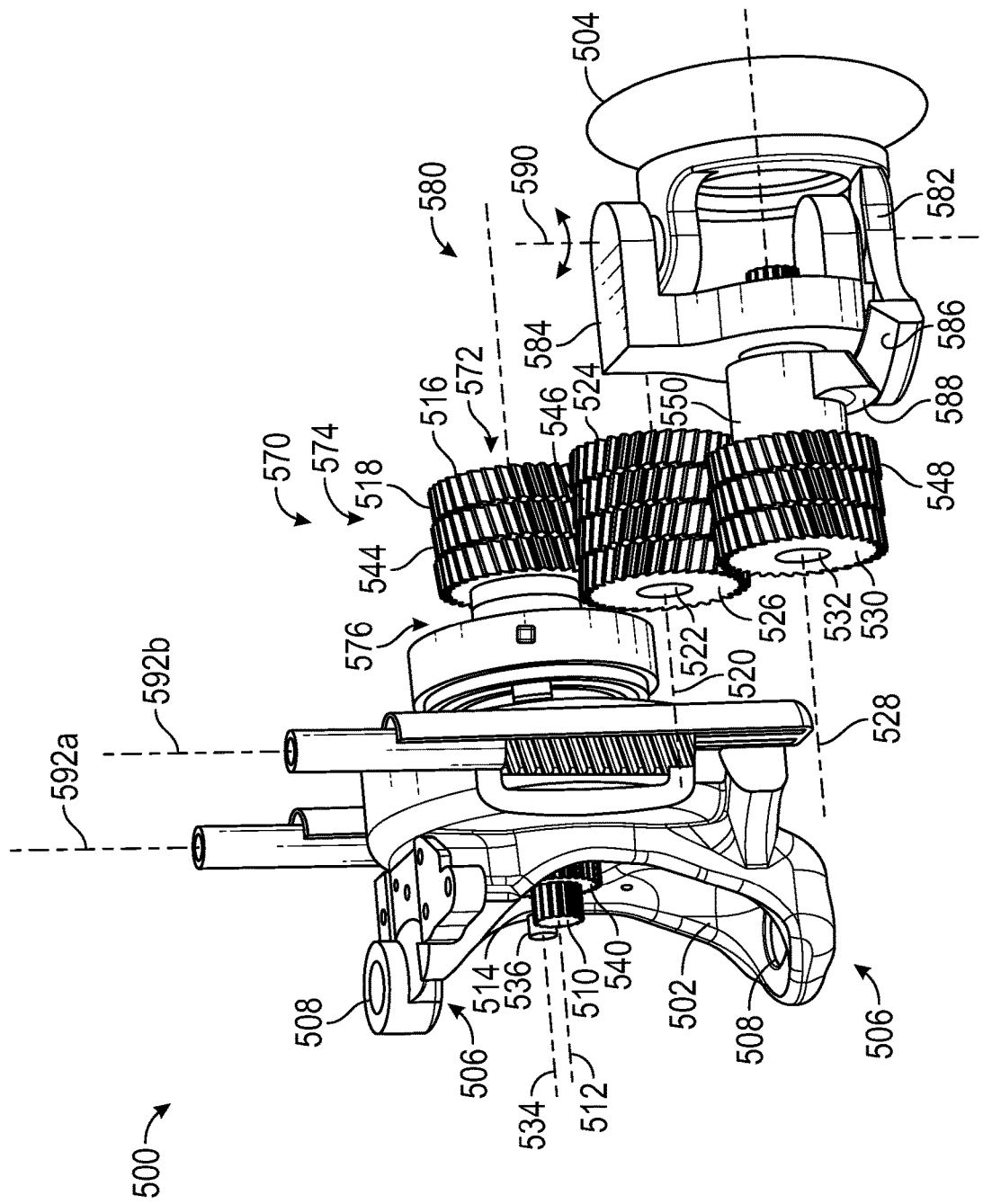
FIG. 5 is a perspective view of a suspension system, according to an exemplary embodiment.
Figure 6:
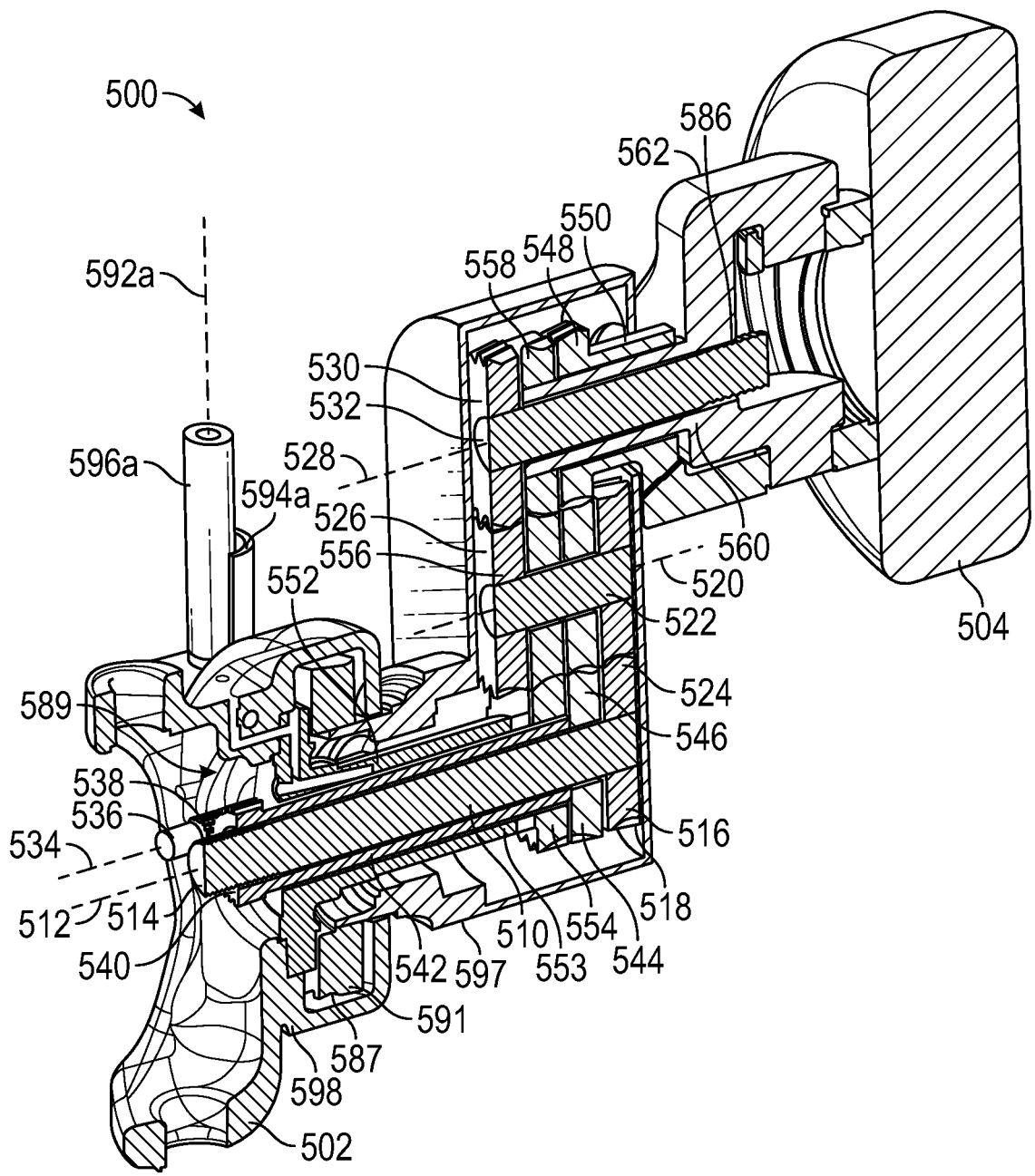
FIG. 6 is a cross-sectional perspective view of the suspension system of FIG. 5, according to an exemplary embodiment.
Figure 7:
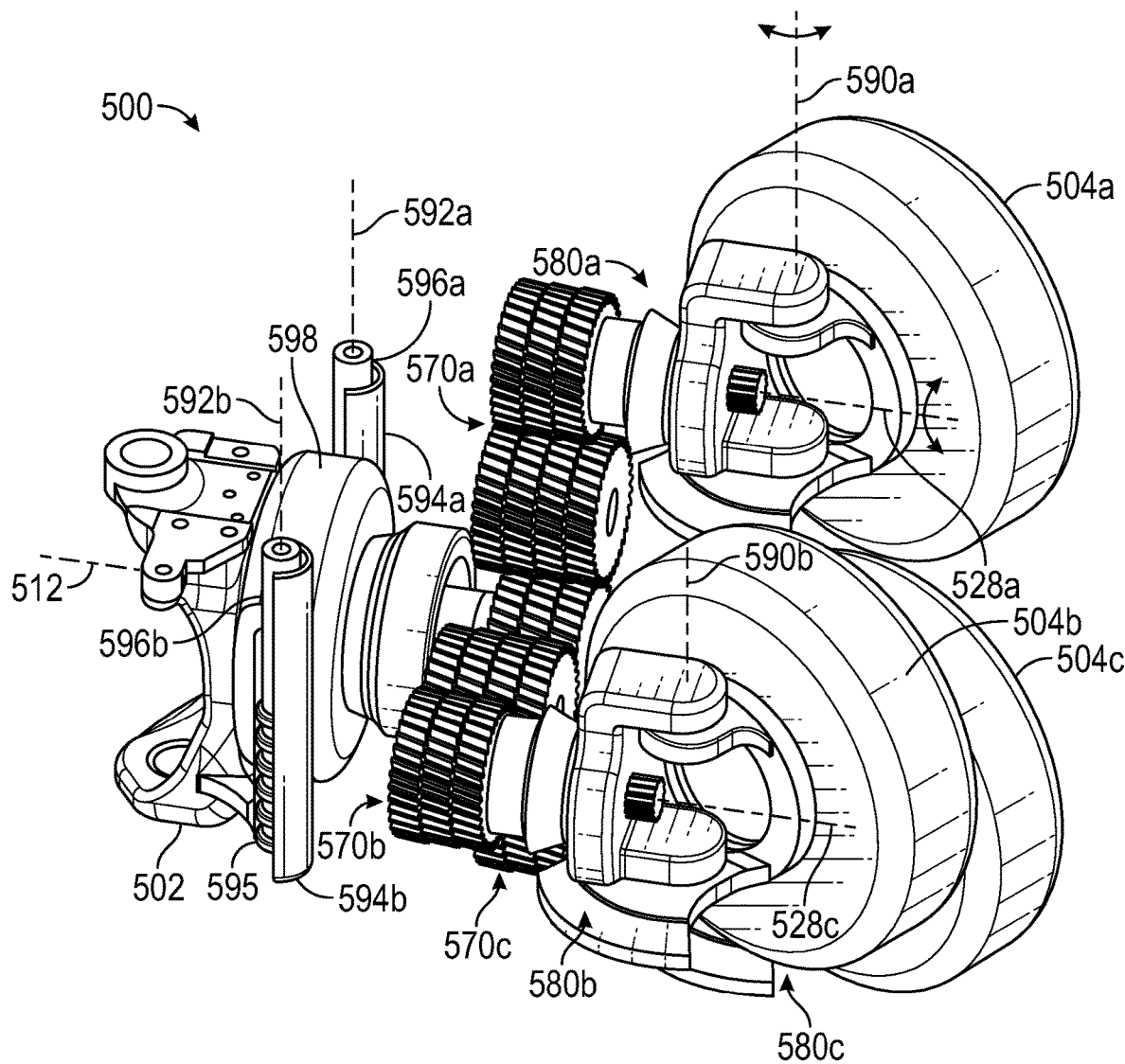
FIG. 7 is a perspective view of the suspension system of FIG. 5 configured for three tractive elements, according to an exemplary embodiment.
Figure 8:
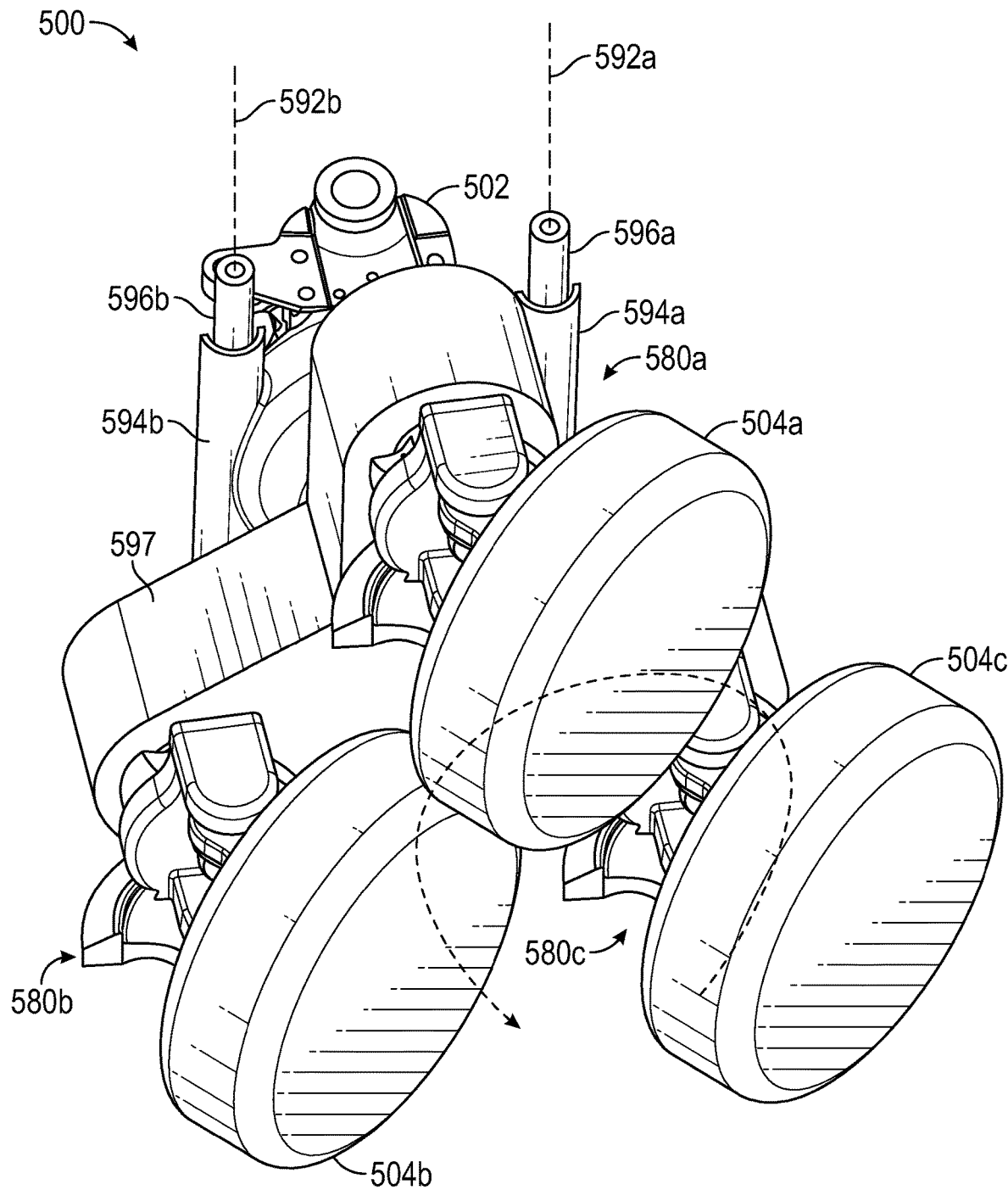
FIG. 8 is a perspective view of the suspension system of FIG. 7, according to an exemplary embodiment.

Referring particularly to FIGS. 5 and 6, a suspension system 500 includes an attachment member, a control arm, a frame member, etc., shown as control arm 502. The suspension system 500 also includes a hub assembly, a wheel attachment member, etc., shown as wheel hub 580 and a power transmission system 570 configured to transfer power from the control arm 502 to the wheel hub 580. The power transmission system 570 includes multiple gear systems, gear trains, etc. Specifically, the power transmission system 570 includes a first or drive gear train 572, a second or steering gear train 574, and a third or steering knuckle gear train 576.

Drive Gear Train

The drive gear train 572 is configured to transfer power to a wheel, a tractive member, a tractive element, a rotational member, a driven member, etc., shown as tractive element 504. The drive gear train 572 is configured to receive input power (e.g., rotational kinetic energy, torque, rotation, etc.) through an input shaft 510. The input shaft 510 can be driven to rotate about an axis 512 that extends centrally through the input shaft 510. The drive gear train 572 outputs torque or power (e.g., rotational kinetic energy) to the tractive element 504 through an output shaft 532. An axis 528 extends centrally and longitudinally through the output shaft 532 and is laterally offset from the axis 512. In this way, the drive gear train 572 transfers rotational kinetic energy from the input shaft 510 to the output shaft 532 that are laterally offset from each other.

The input shaft 510 includes a spline, a geared end, etc., shown as teeth 514. The input shaft 510 is configured to receive rotational kinetic energy through the teeth 514. For example, the input shaft 510 can be driven to rotate through the teeth 514 and a member (e.g., a female member) that is configured to engage the input shaft 510 through the teeth 514. The drive gear train 572 includes a first gear 516 that is fixedly and rotatably coupled with the input shaft 510. The first gear 516 includes teeth 518 and is configured to engage and drive a laterally offset gear, shown as second gear 524. The second gear 524 is fixedly and rotatably coupled with an intermediate shaft 522 that is laterally offset from the input shaft 510. An axis 520 extends centrally through the intermediate shaft 522 and is laterally offset from the axis 512. The intermediate shaft 522 includes the second gear 524 and a third gear 526 positioned or disposed at opposite ends of the intermediate shaft 522. The second gear 524 and the third gear 526 can be similar to the first gear 516 and can include similar teeth. In some embodiments, the second gear 524 and the third gear 526 have a same number of teeth. In other embodiments, the second gear 524 and the third gear 526 have a different number of teeth (e.g., the second gear 524 has more teeth than the third gear 526 or vice versa). The second gear 524 and the third gear 526 are longitudinally offset at opposite ends of the intermediate shaft 522.

The third gear 526 is configured to engage a corresponding gear, shown as fourth gear 530. The fourth gear 530 is fixedly and rotatably coupled with an output shaft 532 such that rotation of the third gear 526 drives the output shaft 532 to also rotate. The output shaft 532 is laterally offset from both the axis 520 that extends through the intermediate shaft 522 and the axis 512 that extends through the input shaft 510. The output shaft 532 includes the fourth gear 530 positioned at a first end, and an engagement portion, teeth, a spline, etc., shown as engagement portion 586. The engagement portion 586 is configured to engage a corresponding portion of the tractive element 504 to drive the tractive element 504. In this way, rotational kinetic energy is transferred through the drive gear train 572 from the input shaft 510, through the first gear 516, the second gear 524, the intermediate shaft 522, the third gear 526, the fourth gear 530, and the output shaft 532 to the tractive element 504. The drive gear train 572 can receive input rotational kinetic energy at a speed $\omega_1$ with a torque $T_1$ and may output kinetic energy at a speed $\omega_2$ with a torque $T_2$. In some embodiments, the output torque $T_2$ is greater than the input torque $T_1$ (e.g., $T_2 > T_1$) and the output speed $\omega_2$ is less than the input speed $\omega_1$ (e.g., $\omega_2 < \omega_1$). In other embodiments, the output torque $T_2$ is less than the input torque $T_1$ (e.g., $T_2 < T_1$) and the output speed $\omega_2$ is greater than the input speed $\omega_1$ (e.g., $\omega_2 > \omega_1$). In other embodiments, the output torque $T_2$ is equal to the input torque $T_1$ (e.g., $T_2 = T_1$) and the output speed $\omega_2$ is equal to the input speed $\omega_1$ (e.g., $\omega_2 = \omega_1$).

The output shaft 532 can be configured to directly engage the tractive element 504 or may be configured to indirectly engage and drive the tractive element 504. For example, the output shaft 532 can be configured to drive an axle (e.g., a constant velocity joint) disposed between the output shaft 532 and the tractive element 504. In this way, an orientation of the tractive element 504 (e.g., a steering orientation) may change, while still facilitating the transmission of drive power to the tractive element 504.

Steering Gear Train

Referring still to FIGS. 5 and 6, the steering gear train 574 includes a steering gear, shown as first gear 540 and a steering shaft, shown as first shaft 542. The first gear 540 and the first shaft 542 include an inner volume through which the input shaft 510 extends. The input shaft 510 may slidably couple with or slidably engage an inner surface of the first gear 540 and the input steering shaft 542. For example, an inner surface of the first gear 540 and the input steering shaft 542 can be configured to slidably engage an outer surface of the input shaft 510. The first gear 540 and the input steering shaft 542 can be co-axial with the input shaft 510.

The first gear 540 is configured to be driven by an input gear 538 and an input shaft 536. The input gear 538 is fixedly and rotatably coupled with the input shaft 536. The input shaft 536 and the input gear 538 are laterally offset from the input shaft 510 of the drive gear train 572 and the first shaft 542 of the steering gear train 574. The input gear 538 and the input shaft 536 can receive input rotational kinetic energy and transfer the rotational kinetic energy to the first gear 540 and the first shaft 542.

The steering gear train 574 includes a first gear 544 that is fixedly and rotatably coupled with the first shaft 542. The first gear 544 is driven by the first shaft 542 and transfers rotational kinetic energy to a second gear 546 of the steering gear train 574. The first gear 544 can be slidably coupled with the exterior surface of the input shaft 510 such that the input shaft 510 and the gear 544 can rotate independently of each other. The first gear 544 is configured to drive a second gear 546. The first gear 544 and the second gear 546 can mesh or engage each other (e.g., through correspondingly configured teeth) to facilitate the transfer of rotational kinetic energy from the first gear 544 to the second gear 546. The second gear 546 can be slidably coupled with the intermediate shaft 522 such that the second gear 546 can rotate independently of the intermediate shaft 522. The second gear 546 of the steering gear train 574 can be co-axial with the intermediate shaft 522 of the drive gear train 572. The intermediate shaft 522 can extend through the second gear 546 (e.g., through a central aperture of the second gear 546) such that the intermediate shaft 522 can rotate independently of the second gear 546. The second gear 546 of the steering gear train 574 can be positioned between the second gear 524 and the third gear 526 of the drive gear train 572.

The second gear 546 is configured to mesh with or engage a third gear 548 and drive the third gear 548. The third gear 548 can have correspondingly configured teeth that engage the second gear 546 to facilitate the transfer of rotational kinetic energy from the second gear 546 to the third gear 548. The third gear 548 may be fixedly coupled or integrally formed with an output shaft 550. The output shaft 550 can be co-axial with the output shaft 532 of the drive gear train 572. The output shaft 550 may include an inner volume that is configured to receive the output shaft 532 of the drive gear train 572 therethrough such that the output shaft 550 can rotate relative to the output shaft 532 of the drive gear train 572.

The output shaft 550 includes an engagement portion, a driving portion, a steering portion, a steering guide, etc., shown as steering member 588. The steering member 588 can protrude radially outwards from the output shaft 550 and is configured to engage and drive/steer the tractive element 504. The steering member 588 is configured to engage a steering bevel (e.g., engagement portion 586) of the wheel hub 580. In particular, the steering member 588 is configured to drive a first yoke 582 of the wheel hub 580 that the tractive element 504 rotatably couples with. Rotation of the output shaft 550 drives rotation of the first yoke 582 relative to a second yoke 584 of the wheel hub 580 about axis 590. In this way, the steering gear train 574 can be operated to rotate the tractive element 504 for steering purposes (e.g., to rotate the first yoke 582 relative to the second yoke 584 about the axis 590). The steering gear train 574 can be driven to rotate the first yoke 582 relative to the second yoke 584 in either direction.

Knuckle Gear Train

Referring still to FIGS. 5-6, the steering knuckle gear train 576 includes a first gear 554 that is configured to be driven by an input shaft 553. The input shaft 553 and the first gear 554 are centered about the axis 512. The input shaft 553 may be co-cylindrical with the first shaft 542 of the steering gear train 574 and the input shaft 510 of the of the drive gear train 572. For example, the input shaft 510 of the drive gear train 572 may extend through and be slidably coupled with the first shaft 542 of the steering gear train 574, with the first shaft 542 of the steering gear train 574 extending through and slidably coupling with the input shaft 553. The input shaft 553 may fixedly couple and/or rotatably couple with the first gear 554 such that rotational kinetic energy or torque may be input to the first gear 554 through the input shaft 553.

The first gear 554 can be rotatably and/or slidably coupled with an exterior (e.g., a radially outwards facing surface) of the first shaft 542 such that the first gear 554 can rotate independently of the first shaft 542. The first gear 554 is configured to engage a second gear 556 of the steering knuckle gear train 576. The second gear 556 can be rotatably coupled and/or slidably coupled with the intermediate shaft 522 such that the second gear 556 can rotate relative to or independently of the intermediate shaft 522. For example, the second gear 556 can be rotatably coupled with the intermediate shaft 522 using a bearing, a ball bearing, a roller bearing, a slidable coupling, a low-frictional interface, etc. The second gear 556 rotates about the axis 520 independently of rotation of the intermediate shaft 522.

The second gear 556 is configured to drive or engage a third gear 558 which is fixedly coupled with an output shaft 560 of the steering knuckle gear train 576. The third gear 558 is fixedly coupled or integrally formed with the output shaft 560 such that rotation of the third gear 558 results in rotation of the output shaft 560. The output shaft 560 and the third gear 558 are rotatably coupled with the output shaft 532 of the drive gear train 572 such that the output shaft 560 and the third gear 558 can rotate independently of the output shaft 532. The output shaft 550 of the steering gear train 574, the output shaft 560 of the steering knuckle gear train 576, and the output shaft 532 of the drive gear train 572 are all co-cylindrical with each other (e.g., centered about the axis 528).

The output shaft 560 of the steering knuckle gear train 576 is fixedly coupled or integrally formed with the second yoke 584 such that rotation of the output shaft 560 about the axis 528 drives the second yoke 584 to rotate about the axis 528. In this way, the second yoke 584 can be rotated about the axis 528 by operation (e.g., by driving) the steering knuckle gear train 576. In some embodiments, rotational kinetic energy can be input into the steering knuckle gear train 576 in either direction to drive the second yoke 584 to rotate about the axis 528 in either direction. For example, the input shaft 553 can be driven to rotate about the axis 512 in either direction, thereby driving the second yoke 584 and the first yoke 582 to rotate about the axis 528 in either direction.

In this way, the steering knuckle gear train 576 can be operated to achieve adjustment or rotation of the wheel hub 580 about the axis 528, while the steering gear train 574 can be operated to achieve adjustment or rotation of the tractive element 504 about the axis 590. Advantageously, the power transmission system 570 can be used to adjust an orientation of the tractive element 504 in several directions (e.g., about the axis 590 and the axis 528) and to transmit power (e.g., rotational kinetic energy) from a primary mover (e.g., an engine, a motor, etc.) of a vehicle to the tractive element 504.

Referring now to FIGS. 5-8, the suspension system 500 can include three power transmission systems 570 that are all driven by a common input shaft 510, a common first gear 540, and a common input shaft 553. Each of the power transmission systems 570a-c are configured to transmit power to, steer, and adjust the orientation of the wheel hub 580 for a corresponding wheel hub 580 and a corresponding tractive element 504. For example, the power transmission system 570a is configured to provide power to a tractive element 504a of a wheel hub 580a. Likewise, the power transmission system 570b and the power transmission system 570c are configured to provide rotational power to tractive elements 504b and 504c of the wheel hubs 580b and 580c, respectively. The power transmission systems 570a-c can also be operated to rotate the tractive elements 504 about their respective axes 590 as well as about their respective axes 528. In this way, the tractive elements 504 can each have several degrees of freedom and are able to rotate about the corresponding axis 590 and the axis 528. In some embodiments, the power transmission systems 570 are configured to rotate in unison about a central axis 512 that extends longitudinally through a center of the suspension system 500. In some embodiments, the central axis 512 is the axis 512 that extends centrally through the input shaft 510.

In some embodiments, the control arm 502 includes a first adjustment member 596a and a second adjustment member 596b. The first adjustment member 596a and second adjustment member 596b can be screws, elongated members, cylindrical members, threaded members, worms, etc. The first adjustment member 596a and the second adjustment member 596b are configured to pivotally or rotatably couple with the control arm 502 to facilitate rotation of the power transmission systems 570 and the tractive elements 504 about the axis 512. In some embodiments, the first adjustment member 596a and the second adjustment member 596b are configured to rotate within a corresponding guide structure 594. For example, the first adjustment member 596a can be received within and rotatably couple with the guide structure 594a. The guide structure 594a can be a hollow cylindrical member that is integrally formed with the control arm 502. The second adjustment member 596b is similar to the first adjustment member 596a and is received within a guide structure 594b that is positioned on an opposite side of the control arm.

The control arm 502 includes an inner volume 589 and is configured to rotatably couple with a housing member 597 that the power transmission systems 570 extend through. In some embodiments, the housing member 597 includes sidewalls that are configured to enclose and/or protect the various gears and shafts of the power transmission systems 570. The housing member 597 includes a male pivotal member 591. The control arm 502 includes a female pivotal member 598 that is integrally formed with the control arm 502 and is configured to receive the male pivotal member 591 therewithin. The male pivotal member 591 can have a generally cylindrical or rotor shape, and the female pivotal member 598 includes an internal volume that is configured to receive the male pivotal member 591. For example the male pivotal member 591 can include a radial protrusion that is configured to rotatably or pivotally couple with the female pivotal member 598. The radial protrusion can include teeth 587 that are configured to engage the threads 595 of the first adjustment member 596a and the second adjustment member 596b. The female pivotal member 598 and the male pivotal member 591 can be co-axial with each other and may both be centered about the axis 512. The female pivotal member 598 and the male pivotal member 591 each include a central opening, a central aperture, an inner volume, etc., through which the first shaft 542 of the steering gear train 574, the input shaft 553 of the steering knuckle gear train 576, and the input shaft 510 of the drive gear train 572 extend.

The housing member 597 and thereby the power transmission systems 570 can be driven to rotate about the central axis 512 by the first adjustment member 596a and the second adjustment member 596b. For example, the first adjustment member 596a and the second adjustment member 596b can be driven to rotate about their respective axes 592 that extend longitudinally through the adjustment members 602. In some embodiments, the first adjustment member 596a is driven to rotate about the axis 592a in a first direction (e.g., a clockwise direction) while the second adjustment member 596b is driven to rotate about the axis 592b in a second direction that is opposite the first direction (e.g., a counterclockwise direction) to drive the male pivotal member 591, the housing member 597, and the power transmission systems 570 to rotate about the central axis 512. The first adjustment member 596a and the second adjustment member 596b can be driven to rotate about their respective axes 592 to rotate the power transmission systems 570, the wheel hubs 580, and the tractive elements 504 about the central axis 512.

In this way, the tractive elements 504 can be orbitally rotated. The tractive elements 504 can be rotated in unison about the central axis 512. The tractive elements 504 can each receive rotational kinetic energy or mechanical energy to drive the tractive elements 504 through their corresponding power transmission systems 570. Specifically, each of the tractive elements 504 can be driven to rotate for transportation through the corresponding drive gear trains 572. Likewise, each of the tractive elements 504 can be driven to rotate for steering through their corresponding steering gear trains 574. The tractive elements 504 can be rotated about their corresponding axes 528 through their corresponding knuckle gear trains 576.

Figure 9:
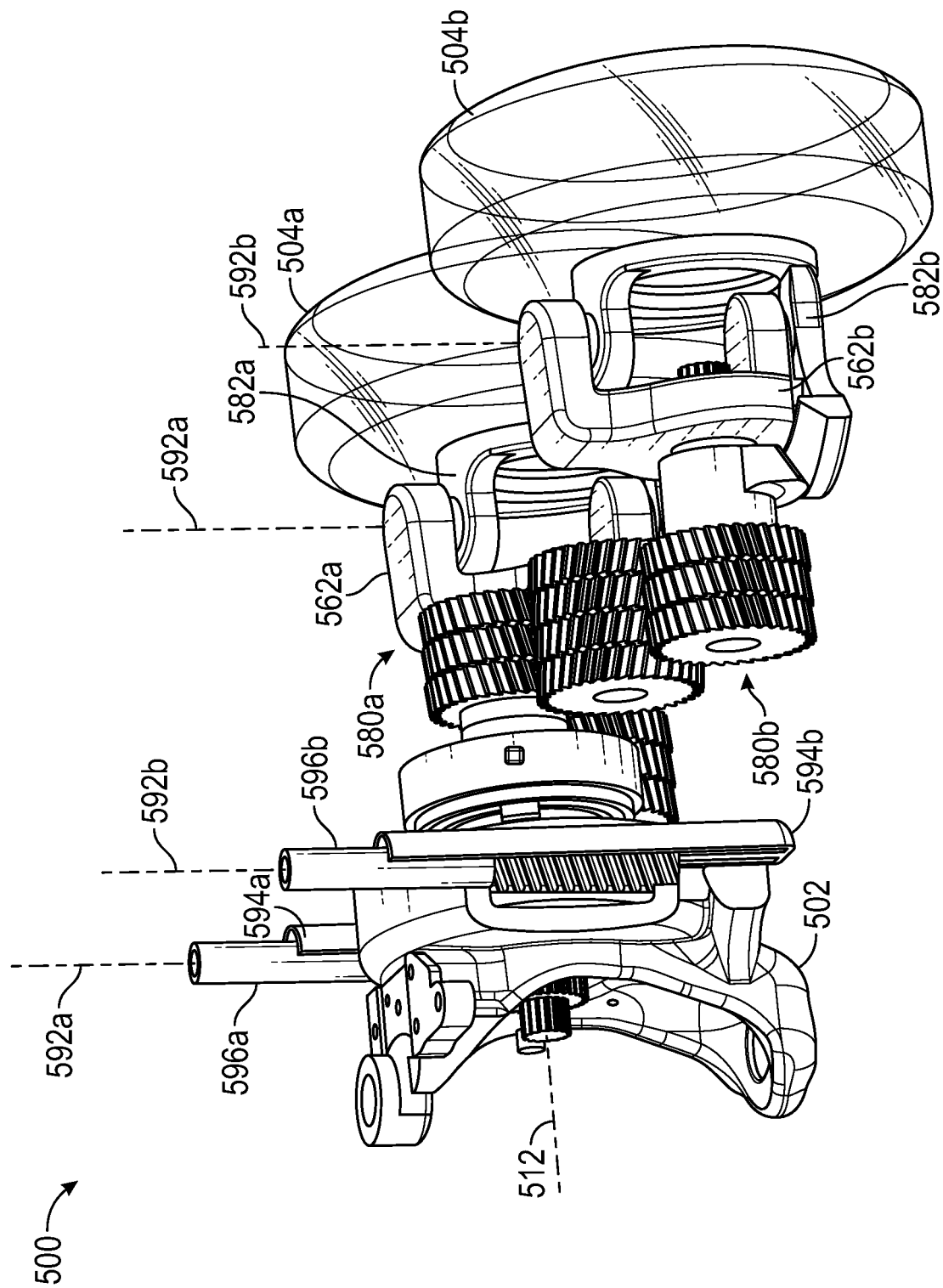
FIG. 9 is a perspective view of the suspension system of FIG. 5, configured for two tractive elements, according to an exemplary embodiment.

Referring particularly to FIG. 9, the suspension system 500 can be configured for two tractive elements 504. Specifically, the tractive elements 504 can be configured to orbitally rotate in unison about the axis 512. The tractive elements 504 can be independently or in unison be driven to rotate for transportation through their corresponding drive gear trains 572, for steering through their corresponding steering gear trains 574, and can be driven to rotate about their respective axes 512 through their corresponding or respective knuckle gear trains 576.

Extendable Orbital Suspension System

Figure 10:
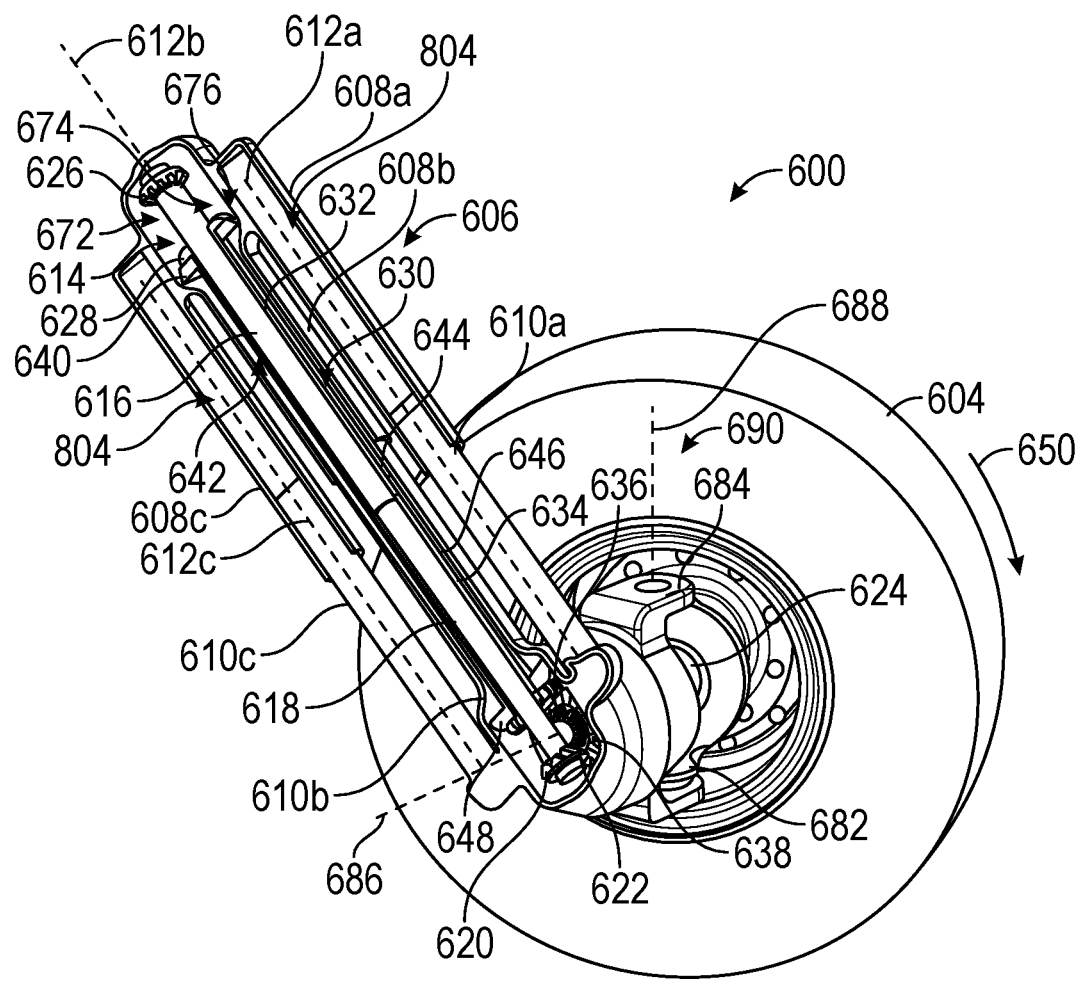
FIG. 10 is a perspective view of a cross section of a suspension system that uses concentric shafts to steer, rotate a wheel hub, and drive a tractive element, according to an exemplary embodiment.
Figure 11:
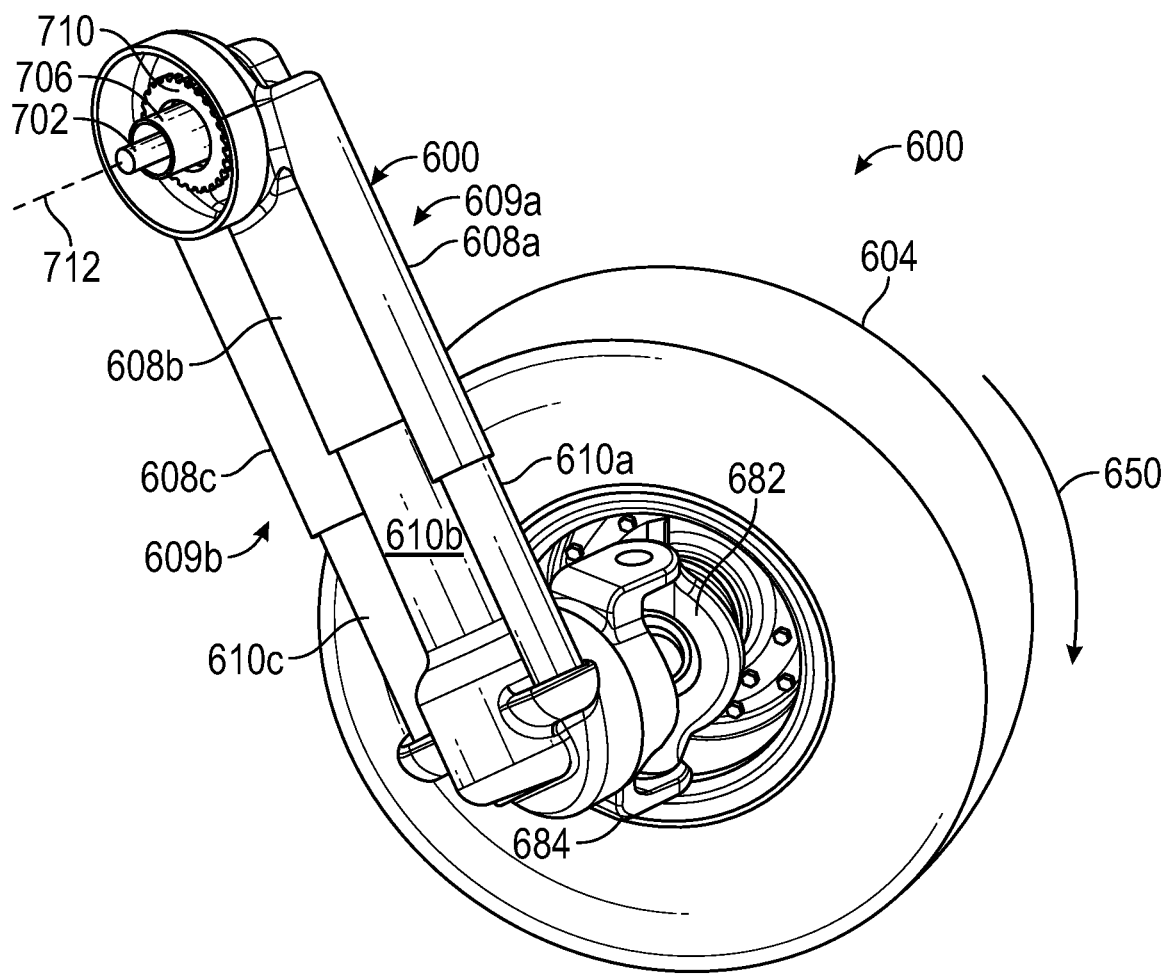
FIG. 11 is a perspective view of the suspension system of FIG. 10, according to an exemplary embodiment.
Figure 12:
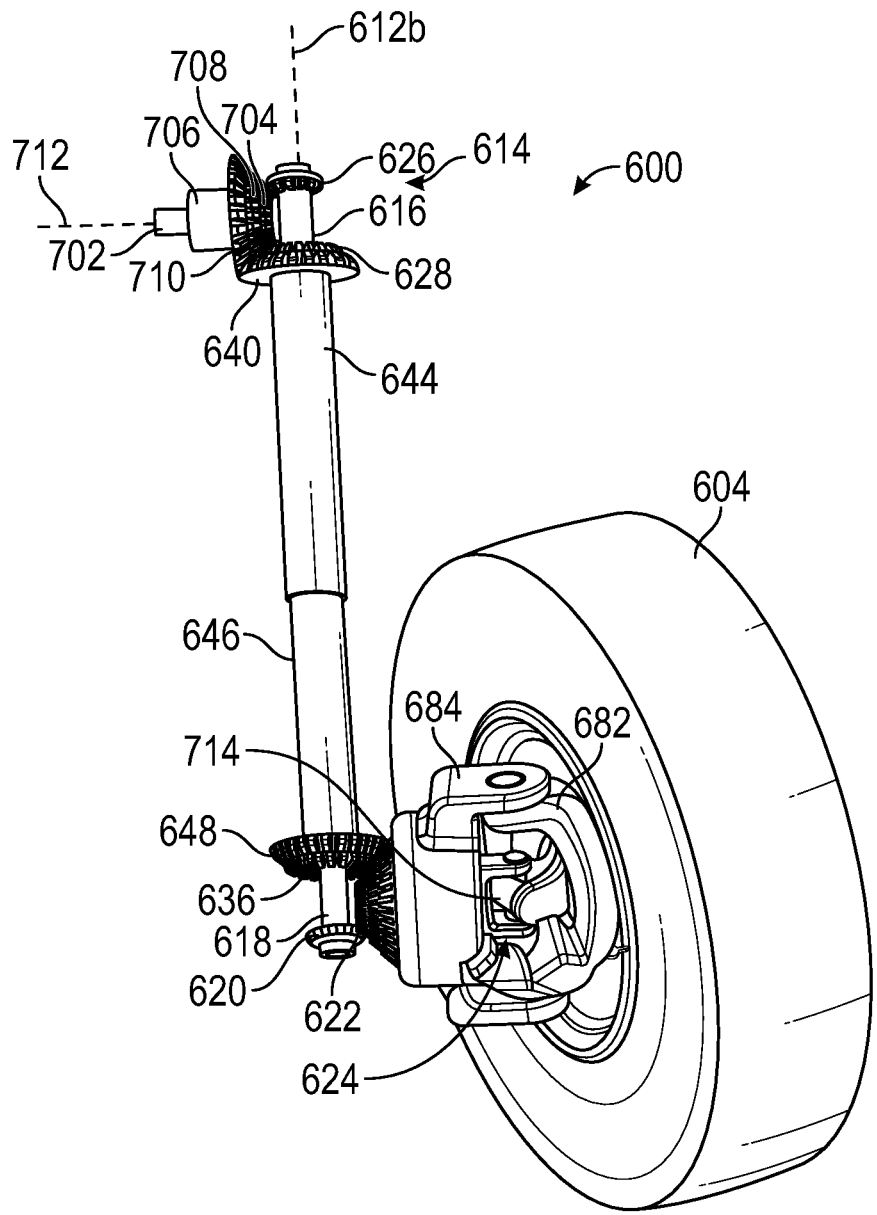
FIG. 12 is a perspective view of the suspension system of FIG. 10, according to an exemplary embodiment.

Referring particularly to FIGS. 10-12, a suspension system 600 for a tractive element 604 includes a power transmission assembly 606. The power transmission assembly 606 can be configured to provide mechanical energy (e.g., rotational kinetic energy, power, torque, etc.) for transportation. In some embodiments, the power transmission assembly 606 is configured to transfer mechanical energy to the tractive element 604 to rotate the tractive element 604 in direction 650 or to rotate the tractive element 604 in a direction that is opposite the direction 650.

The tractive element 604 can be the same as or similar to the tractive elements 504. In some embodiments, the tractive element 604 is a wheel, a tire, a tread, etc., that is configured to frictionally engage a ground surface (e.g., in static friction) and propel a vehicle along the ground surface.

Referring particularly to FIG. 10, the power transmission assembly 606 is configured to rotatably couple with the tractive element 604. The tractive element 604 may be supported by and able to rotate relative to the power transmission assembly 606. The power transmission assembly 606 can be configured to drive or transfer mechanical energy to the tractive element 604 to rotate for steering. The power transmission assembly 606 can also be configured to drive or transfer mechanical energy to the tractive element 604 to rotate a wheel hub of the tractive element 604.

The power transmission assembly 606 can include a plurality of or multiple telescoping cylinders that are configured to slidably translate relative to each other. In some embodiments, the power transmission assembly 606 includes a first outer member, a first telescoping member, a first outer housing, etc., shown as first outer member 608a. The power transmission assembly 606 can also include a second outer member 608b or a central outer member 608b. The power transmission assembly 606 can also include a third outer member, a third telescoping member, a third outer housing member, etc., shown as third outer member 608c. The first outer member 608a and the third outer member 608c can be positioned on either side of the second outer member 608b. The first outer member 608a, the second outer member 608, and the third outer member 608c may be hollow members configured to receive and slidably translate relative to corresponding inner members. For example, the first outer member 608a and the third outer member 608c can be configured to receive a corresponding first inner member 610a and a third inner member 610c, respectively such that the inner members 610 can translate (e.g., slidably translate) relative to the corresponding outer members 608 (e.g., translate within).

Likewise, the second outer member 608b is configured to slidably engage, slidably couple with, translatably couples with, etc., a corresponding second or central inner member 610b. In some embodiments, the first outer member 608a, the second outer member 608b, and the third outer member 608c are integrally formed with each other. In some embodiments, the first inner member 610a, the second inner member 610b, and the third inner member 610c are integrally formed with each other. In some embodiments, the second outer member 608b and the second inner member 610b define a central telescoping member, a central telescoping shaft, a central telescoping housing member, etc. The central telescoping member can be supported on either side by the outer members 608a and 608c and the corresponding inner members 610a and 610c.

In some embodiments, the outer members 608a and 608c and their corresponding inner members 610a and 610c are suspension components (e.g., damper piston 609a and damper piston 609c, respectively). For example, the outer member 608a and the corresponding inner member 610c can be a damper or a piston (e.g., damper pistons 609) that is configured to absorb shocks, impacts, sudden translation of the tractive element 604, etc., that is transferred to the power transmission assembly 606 through the tractive element 604. In some embodiments, the dampers or pistons are positioned on either side of the central telescoping member as shown in FIGS. 10-12.

Referring still to FIG. 10, the outer members 608 and their corresponding inner members 610 each define a corresponding longitudinal axis 612. Specifically, the first outer member 608a and the first inner member 610a may define a longitudinal axis 612a, the second or central outer member 608b and the corresponding second inner member 610b may define a longitudinal axis 612b, and the third outer member 608c and the corresponding inner member 610c may define a longitudinal axis 612c. In some embodiments, the longitudinal axes 612a-612c are parallel with each other.

Referring still to FIG. 10, the power transmission assembly 606 includes a drive train 672 that is configured to receive rotational kinetic energy or mechanical energy and transfer the mechanical energy to the tractive element 604 for transportation purposes (e.g., to rotate the tractive element 604 to transport the vehicle). The drive train 672 includes a central shaft, an input shaft, an elongated member, etc., shown as drive shaft 614. The drive shaft 614 extends through the second or central outer member 608b and the second or central inner member 610b. The drive shaft 614 is configured to receive rotational kinetic energy or mechanical energy and transfer the mechanical energy to the tractive element 604 for transportation. The drive shaft 614 can be a telescoping member, including an outer member 616 and an inner member 618. The outer member 616 is configured to rotatably couple with the inner member 618 such that the outer member 616 and the inner member 618 rotate in unison. In some embodiments, the outer member 616 includes an inner volume and a spline or interlocking portions that are configured to engage corresponding spline or interlocking portions of the inner member 618. In some embodiments, the outer member 616 is configured to translate relative to the inner member 618 or vice versa, such that an overall longitudinal length of the outer member 616 and the inner member 618 may increase or decrease. Likewise, the outer member 616 is configured to rotatable couple with the inner member 618 such that the outer member 616 can drive the inner member 618 to rotate.

The drive shaft 614 includes or is fixedly coupled with an input gear, a first bevel gear, etc., shown as input gear 626. In some embodiments, the input gear 626 is fixedly coupled with the outer member 616 such that the input gear 626 can be driven to rotate the outer member 616 and the inner member 618. The input gear 626 can be positioned at a first or proximate end of the outer member 616 that is opposite a second or distal end of the outer member 616 that receives the inner member 618 therewithin.

Referring still to FIG. 10, the drive shaft 614 includes an output gear, a second bevel gear, etc., shown as output gear 620. The output gear 620 can be fixedly coupled with the inner member 618. In some embodiments, the output gear 620 is fixedly and rotatably coupled with the inner member 618 such that rotation of the inner member 618 drives the output gear 620 to rotate. For example, the output gear 620 may be press fit, keyed, fastened, etc., or otherwise fixedly coupled with the inner member 618. The input gear 626 can be similarly fixedly coupled with the outer member 616. In some embodiments, the output gear 620 and the input gear 626 are fixedly coupled with the drive shaft 614 at opposite ends of the drive shaft 614. For example, the output gear 620 can be fixedly coupled with the inner member 618 at an end of the inner member 618 that is opposite the end of the inner member 618 that extends into and slidably couples with the outer member 616.

The drive train 672 includes a driven gear, a third bevel gear, etc., shown as driven gear 622. The driven gear 622 is configured to engage, mesh with, etc., the output gear 620 such that the mechanical energy of the output gear 620 is transferred to the driven gear 622 for transportation. The driven gear 622 can be mounted on, fixedly coupled with, press fit onto, keyed with, etc., a corresponding shaft. The shaft may fixedly and rotatably couple with an axle that drives the tractive element 604. In some embodiments, the output gear 620 and the driven gear 622 are bevel gears that transfer the mechanical energy from a first axis (i.e., the longitudinal axis 612b that extends through the drive shaft 614) to a second axis that extends through the driven gear 622, shown as axis 686. In some embodiments, the axis 686 is perpendicular with the longitudinal axis 612b. The driven gear 622 can be rotatably fixedly coupled with an axle 624 that transfers the torque or the rotational kinetic energy to the tractive element 604.

Referring still to FIG. 10, the power transmission assembly 606 includes a steering train 674 that is configured to rotate the tractive element 604 for steering. The steering train 674 includes a steering input shaft 630 that is configured to rotate about the longitudinal axis 612b. The steering input shaft 630 can be co-cylindrical with the drive shaft 614, or may be co-axial with the longitudinal axis 612b. The steering input shaft 630 may be hollow and can include an inner volume through which the drive shaft 614 extends. In some embodiments, an exterior surface (e.g., a radially outwards facing surface) of the drive shaft 614 is slidably coupled with an interior surface (e.g., a radially inwards facing surface) of the steering input shaft 630. The steering input shaft 630 and the drive shaft 614 can be rotatably coupled with each other such that the steering input shaft 630 and the drive shaft 614 can rotate relative to each other and/or independently of each other.

The steering input shaft 630 can be a telescoping member including an inner member 634 and an outer member 632. The inner member 634 can be a hollow cylindrical and/or elongated member that is configured to be received within a corresponding inner volume or hollow portion of the outer member 632. The inner member 634 and the outer member 632 can both be hollow members such that the drive shaft 614 may extend therethrough. A radially outwards facing surface of the inner member 634 can slidably couple with a radially inwards facing surface of the outer member 632. The inner member 634 and the outer member 632 can be fixedly rotatably coupled (e.g., with a spline or an interlocking fit) with each other such that rotation of the inner member 634 drives rotation of the outer member 632 and vice versa. While the inner member 634 and the outer member 632 are fixedly rotatably coupled, the inner member 634 and the outer member 632 may still be translatably slidably coupled such that the inner member 634 can extend or retract relative to the outer member 632 (or vice versa) thereby increasing or decreasing an overall longitudinal length of the steering input shaft 630.

Referring still to FIG. 10, the steering input shaft 630 includes an input gear, an input steering gear, a bevel gear, etc., shown as input steering gear 628, according to an exemplary embodiment. The input steering gear 628 can be rotatably fixedly coupled with the outer member 632. Specifically, the input steering gear 628 can be press fit, slip fit, keyed, etc., onto the outer member 632. In other embodiments, the input steering gear 628 is integrally formed with the outer member 632. The input steering gear 628 can be longitudinally positioned at an input end of the steering input shaft 630. For example, the input steering gear 628 can be longitudinally positioned proximate the input gear 626.

The steering input shaft 630 also includes an output gear, an output steering gear, another bevel gear, etc., shown as output steering gear 636. The output steering gear 636 can be positioned longitudinally at an opposite end of the steering input shaft 630 as compared to the input steering gear 628. The input steering gear 628 can be positioned at a first longitudinal end of the steering input shaft 630 (e.g., at the input end) while the output steering gear 636 can be positioned at an opposite end of the steering input shaft 630 (e.g., at an output end, proximate the tractive element 604).

The output steering gear 636 can be fixedly rotatably coupled with the inner member 634 of the steering input shaft 630. For example, the output steering gear 636 can be integrally formed, keyed, press fit, etc., onto the inner member 634 of the steering input shaft 630.

The output steering gear 636 may be a bevel gear that is configured to engage a corresponding steering bevel gear 638. The steering bevel gear 638 can be configured to drive a steering member that engages a steering bevel. For example, the output steering gear 636 can transfer rotational kinetic energy or torque from the steering input shaft 630 to steer the tractive element 604. The output steering gear 636 can be configured to rotate to drive an inner yoke 682 to rotate about axis 688 relative to an outer yoke 684. The inner yoke 682 and the outer yoke 684 may define a hub assembly 690. The hub assembly 690 can be the same as or similar to the wheel hub 580. In this way, the outer yoke 684 can be the same as or similar to second yoke 584, and the inner yoke 682 can be the same as or similar to the first yoke 582. The hub assembly 690 can include similar configurations to the wheel hub 580 for steering, with the input torque for steering received at the hub assembly 690 from the steering input shaft 630 and the steering bevel gear 638. In this way, the steering train 674 can be operated independently of the drive train 672 to steer the tractive element 604 (e.g., to rotate the tractive element 604 about the axis 688 in either direction).

Referring still to FIG. 10, the power transmission assembly 606 includes a knuckle drive train 676. The knuckle drive train 676 can be configured to drive the outer yoke 684 to rotate about the axis 686. The knuckle drive train 676 includes a knuckle input shaft 642 that extends longitudinally along the longitudinal axis 612b. The knuckle input shaft 642 can be co-cylindrical with the steering input shaft 630 and the drive shaft 614. The knuckle input shaft 642 can also be a hollow shaft and may include an inner volume through which the steering input shaft 630 and the drive shaft 614 extend. In some embodiments, the knuckle input shaft 642 is a radially outermost shaft of the knuckle input shaft 642, the steering input shaft 630, and the drive shaft 614. For example, the drive shaft 614 may be a central shaft that extends through the steering input shaft 630 (e.g., through an inner cavity or hollow cylindrical portion of the steering input shaft 630), and the steering input shaft 630 may extend through an inner volume, an inner cavity, a hollow portion, etc., of the knuckle input shaft 642. The knuckle input shaft 642 can be rotatably slidably coupled with the steering input shaft 630 such that the knuckle input shaft 642 can rotate about the longitudinal axis 612b independently of the steering input shaft 630. In this way, the knuckle input shaft 642, the steering input shaft 630, and the drive shaft 614 can all be co-cylindrical with each other and rotatably free relative to each other, such that the knuckle input shaft 642, the steering input shaft 630, and the drive shaft 614 can each be driven independently.

The knuckle input shaft 642 can also be a telescoping shaft or an extendable/retractable shaft. The knuckle input shaft 642 includes an outer shaft member 644 and an inner shaft member 646. The inner shaft member 646 can be rotatably fixedly coupled with the outer shaft member 644 and may be received within the outer shaft member 644. For example, the inner shaft member 646 and the outer shaft member 644 can be rotatably fixedly coupled with each other with a spline fit. The inner shaft member 646 and the outer shaft member 644 can be translatably or slidably coupled with each other such that the inner shaft member 646 can translate relative to the outer shaft member 644 in the longitudinal direction (e.g., such that an overall longitudinal length of the knuckle input shaft 642 can increase or decrease). In this way, the inner shaft member 646 and the outer shaft member 644 can be telescoping tubular or shaft member that are rotatably fixedly coupled with each other.

The knuckle input shaft 642 include an input bevel gear, a knuckle input gear, an input gear, etc., shown as knuckle input gear 640. The knuckle input gear 640 can be a bevel gear and may be fixedly coupled with the knuckle input shaft 642 at a first end, an input end, etc., of the knuckle input shaft 642. Specifically, the knuckle input gear 640 can be positioned at an end of the knuckle input shaft 642 that is proximate the input gear 626. The knuckle input gear 640 can be fixedly rotatably coupled with the outer shaft member 644 of the knuckle input shaft 642. The knuckle input gear 640 can be integrally formed, keyed, press fit, etc., or otherwise fixedly coupled with the outer shaft member 644 of the knuckle input shaft 642. The knuckle input gear 640 can be directly adjacent the input steering gear 628 and may be slidably coupled with the input steering gear 628 such that the knuckle input gear 640 can rotate relative to the input steering gear 628.

The knuckle input shaft 642 includes an output gear, a bevel gear, an knuckle output gear, etc., shown as knuckle output gear 648. The knuckle output gear 648 can be longitudinally positioned at an end of the knuckle input shaft 642 that is opposite the knuckle input gear 640. For example, the knuckle output gear 648 can be longitudinally positioned at an end of the knuckle input shaft 642 that is proximate the tractive element 604. The knuckle output gear 648 can be fixedly coupled (e.g., keyed, press fit, integrally formed, etc.) with the inner shaft member 646. In some embodiments, the knuckle output gear 648 is directly adjacent or engages the output steering gear 636. The knuckle output gear 648 can be slidably and/or rotatably coupled with the output steering gear 636 such that the knuckle output gear 648 may rotate freely or independently relative to the output steering gear 636.

The knuckle output gear 648 is configured to mesh, engage, etc., a corresponding portion of the outer yoke 684 such that rotation of the knuckle output gear 648 drives rotation of the outer yoke 684 about the axis 686. The outer yoke 684 can include teeth that are configured to mesh with or engage teeth of the knuckle output gear 648.

Referring particularly to FIGS. 11-12, the suspension system 600 can include a first power transmitting shaft 702 that is configured to provide the drive shaft 614 with rotational kinetic energy or torque. A lateral axis 712 extends longitudinally through the first power transmitting shaft 702. The lateral axis 712 can extend radially through the longitudinal axis 612b and may be substantially perpendicular with the longitudinal axis 612b. The lateral axis 712 can be a longitudinal axis of the first power transmitting shaft 702.

The first power transmitting shaft 702 can be fixedly coupled with a first bevel gear 704 that is configured to mesh with the input gear 626. The first bevel gear 704 and the input gear 626 may both be bevel gears (e.g., bevel spur gears, bevel helical gears, etc.) such that rotation of the first power transmitting shaft 702 about the lateral axis 712 drives the drive shaft 614 to rotate about the longitudinal axis 612b. The first power transmitting shaft 702 can be driven by an engine, an electric motor, etc. In this way, the first power transmitting shaft 702 can be driven to drive the tractive element 604 for transportation.

The suspension system 600 can include a second power transmitting shaft 706 that is co-cylindrical with the first power transmitting shaft 702 about the lateral axis 712. The second power transmitting shaft 706 can be slidably coupled with the first power transmitting shaft 702 and may include an inner volume, an inner cavity, etc., through which the first power transmitting shaft 702 extends. The second power transmitting shaft 706 can be driven independently of the first power transmitting shaft 702. The second power transmitting shaft 706 is fixedly coupled or integrally formed with a second bevel gear 708. The second bevel gear 708 is configured to engage or mesh with the input steering gear 628 to transfer rotational kinetic energy, mechanical energy, torque, etc., from the second power transmitting shaft 706 to the input steering gear 628 (e.g., for steering the tractive element 604). In this way, the tractive element 604 can be steered by driving the second power transmitting shaft 706 independently of the first power transmitting shaft 702.

Referring still to FIGS. 11-12, the suspension system 600 includes a third bevel gear 710 that is configured to engage the knuckle input gear 640. The third bevel gear 710 can be rotatably coupled with the second power transmitting shaft 706 such that the third bevel gear 710 can rotate independently of the second power transmitting shaft 706 about the lateral axis 712. The third bevel gear 710 can be driven by another shaft that is configured to rotatably and slidably couple with the second power transmitting shaft 706. In this way, the mechanical energy or torque input to the knuckle input gear 640 can be provided independently of the mechanical energy or torque inputs of the first power transmitting shaft 702 and the second power transmitting shaft 706.

Referring particularly to FIG. 12, the axle 624 can include a universal joint 714. The universal joint 714 facilitates transferring the rotational kinetic energy from the driven gear 622 to the tractive element 604 and may be rotatably fixedly coupled with the shaft with which the driven gear 622 is fixedly coupled. Advantageously, the universal joint 714 facilitates providing mechanical energy to the tractive element 604 for transportation even when the tractive element 604 is steered.

Figure 13:
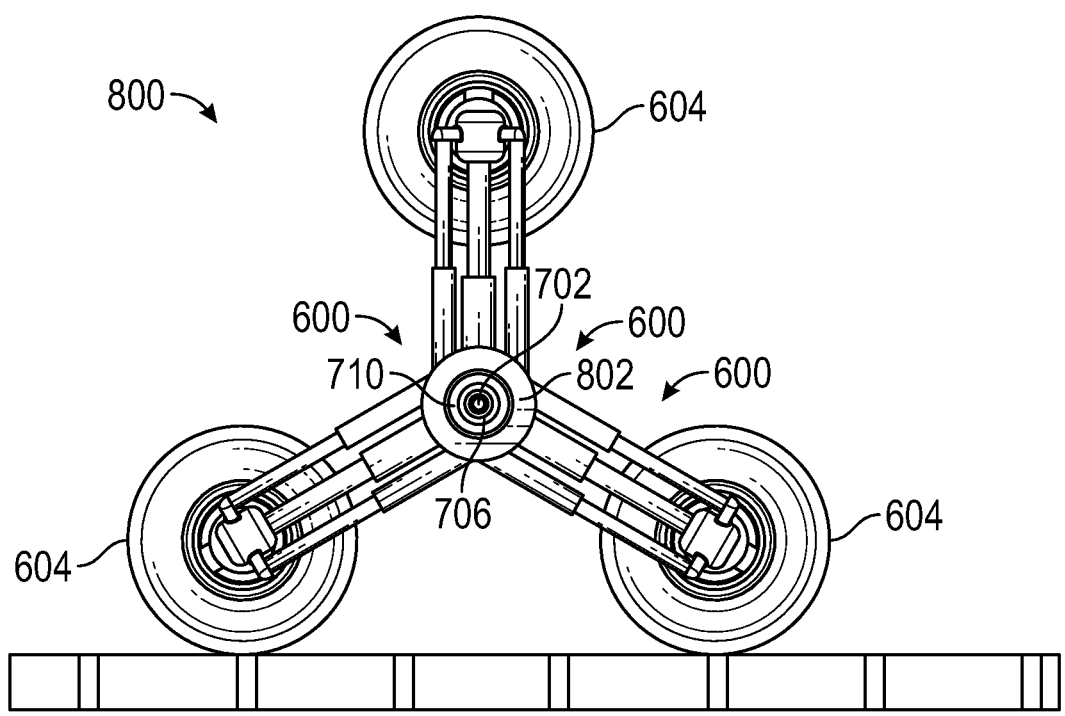
FIG. 13 is a side view of a suspension system that uses three of the suspension systems of FIG. 10, according to an exemplary embodiment.
Figure 14:
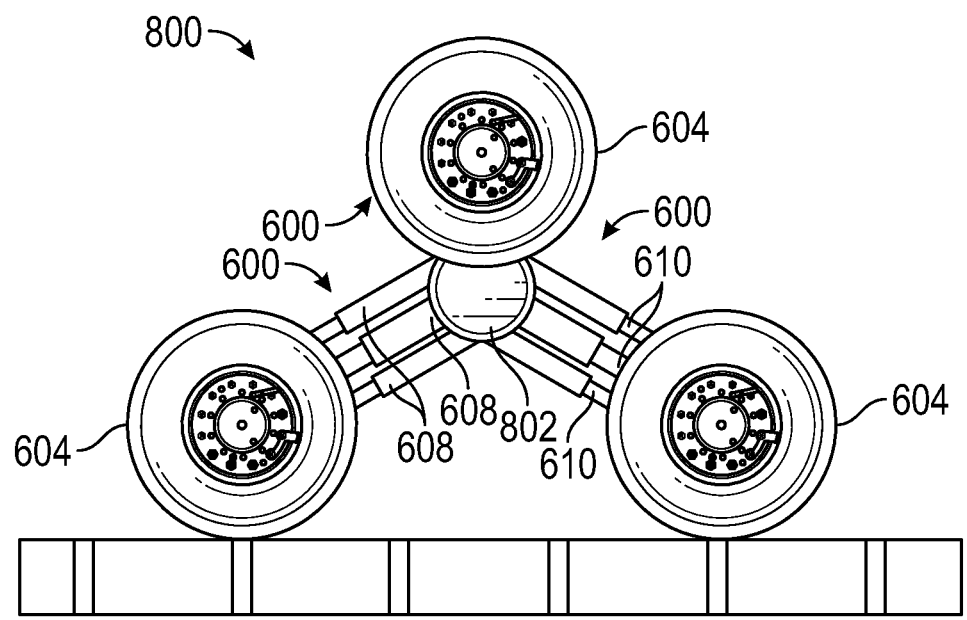
FIG. 14 is a side view of the suspension system of FIG. 13, according to an exemplary embodiment.
Figure 15:
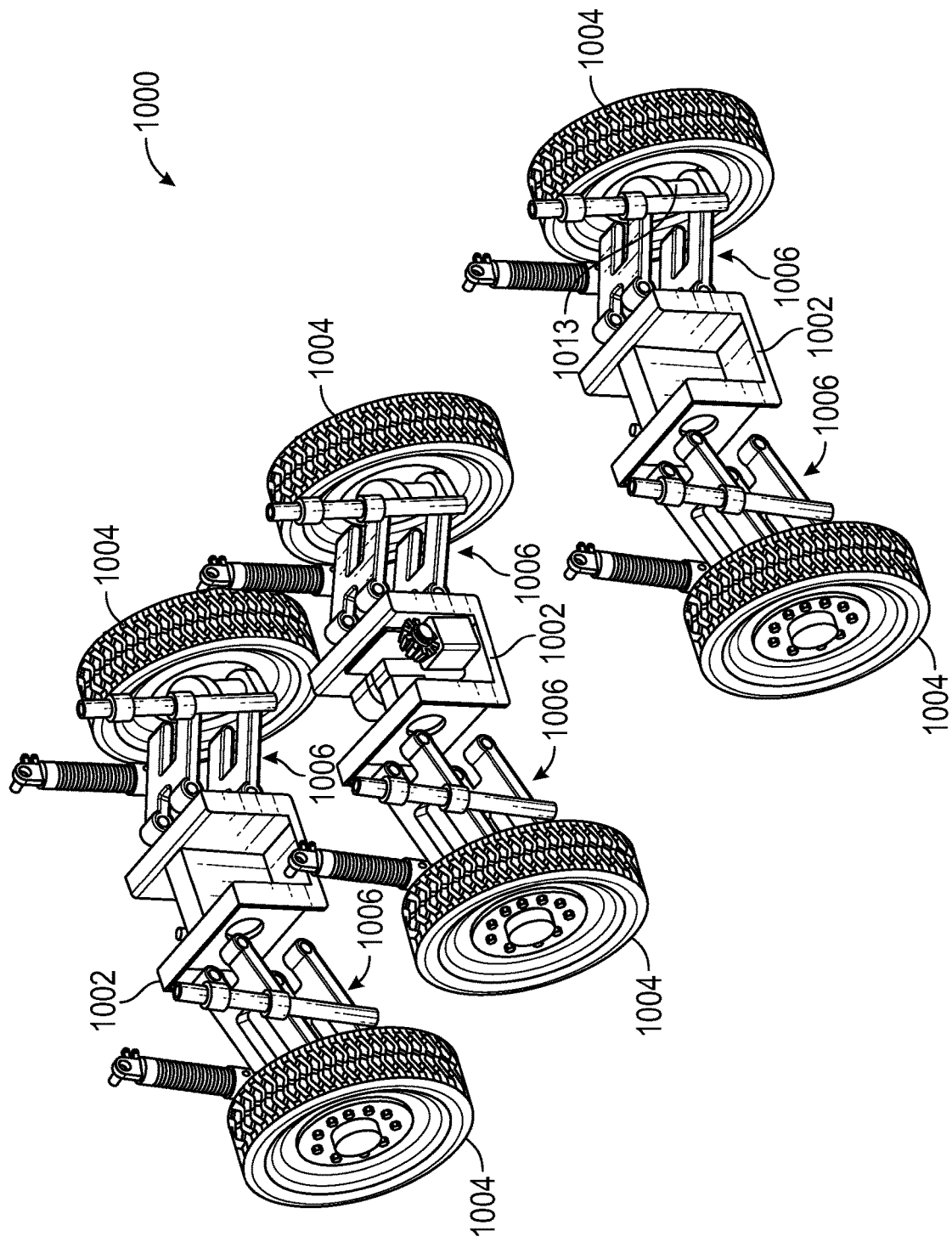
FIG. 15 is a perspective view of a suspension system with an extendable length control arm, according to an exemplary embodiment.

Referring now to FIGS. 13-14, a suspension system 800 includes three of the suspension systems 600 that are angularly offset 120 degrees from each other. The suspension system 800 includes a housing member, a body member, a central member, etc., shown as body 802. The body 802 can be integrally formed with the outer members 608 of each of the suspension systems 600. For example, the body 802 can be integrally formed with the central member 608 of each of the suspension systems 600. The central member 608 can be co-axial with the first power transmitting shaft 702 and the second power transmitting shaft 706. The central member 608 can be rotatably coupled with a body or a frame of a vehicle and can be driven to rotate about the lateral axis 712 to thereby rotate the suspension systems 600 in unison.

Referring to FIGS. 10 and 14, the outer members 608 and the inner members 610 can define an inner volume 804. The inner volume 804 can be filled with a hydraulic fluid or any other incompressible fluid which may be selectably added or removed. In this way, the inner volumes 804 of each of the suspension systems 600 can be increased or decreased by adding fluid to the inner volumes 804. Adding fluid to the inner volumes 804 drives the inner members 610 to translate relative to the outer members 608 such that an overall longitudinal length of the suspension system 800 is increased. Removing fluid from the inner volumes 804 drives the inner members 610 to translate relative to the outer members 608 such that the overall longitudinal length of the suspension system 800 is decreased. As shown in FIGS. 13-14, the longitudinal length of the suspension system 800 can be adjusted (e.g., increased or decreased) to raise or lower the tractive element 604.

The fluid can be selectively added or removed from the inner volumes 804 to raise or lower the tractive elements 604. In some embodiments, the fluid is added or removed using a pump and can be added or removed to achieve a desired position (e.g., a desired longitudinal length) of the tractive element 604. The pump can be a hydraulic or a pneumatic pump and may be configured to provide the fluid from a reservoir. Any number of valves, connections, connectors, tubular members, etc., can be used to fluidly couple the reservoir with the inner volumes 804 of the suspension systems 600.

Extending Length Control Arm

Referring now to FIGS. 15-19, an adjustable length control arm suspension system 1000 includes a frame 1002, and tractive elements, wheels, tires, treads, etc., shown as tractive elements 1004. The tractive elements 1004 are fixedly coupled with the frame 1002 through a support assembly 1006. The support assembly 1006 can include extendable control arms, extendable/retractable frame members, telescoping support members, extendable structural members, extendable beams, bars, elongated members, etc., shown as extendable control arms 1008. The support assembly 1006 can be positioned between each of the tractive elements 1004 and the frame 1002 and can pivotally couple with the frame 1002 and a wheel hub, a hub assembly, etc., shown as wheel hub 1013 at each tractive element 1004.

Figure 19:
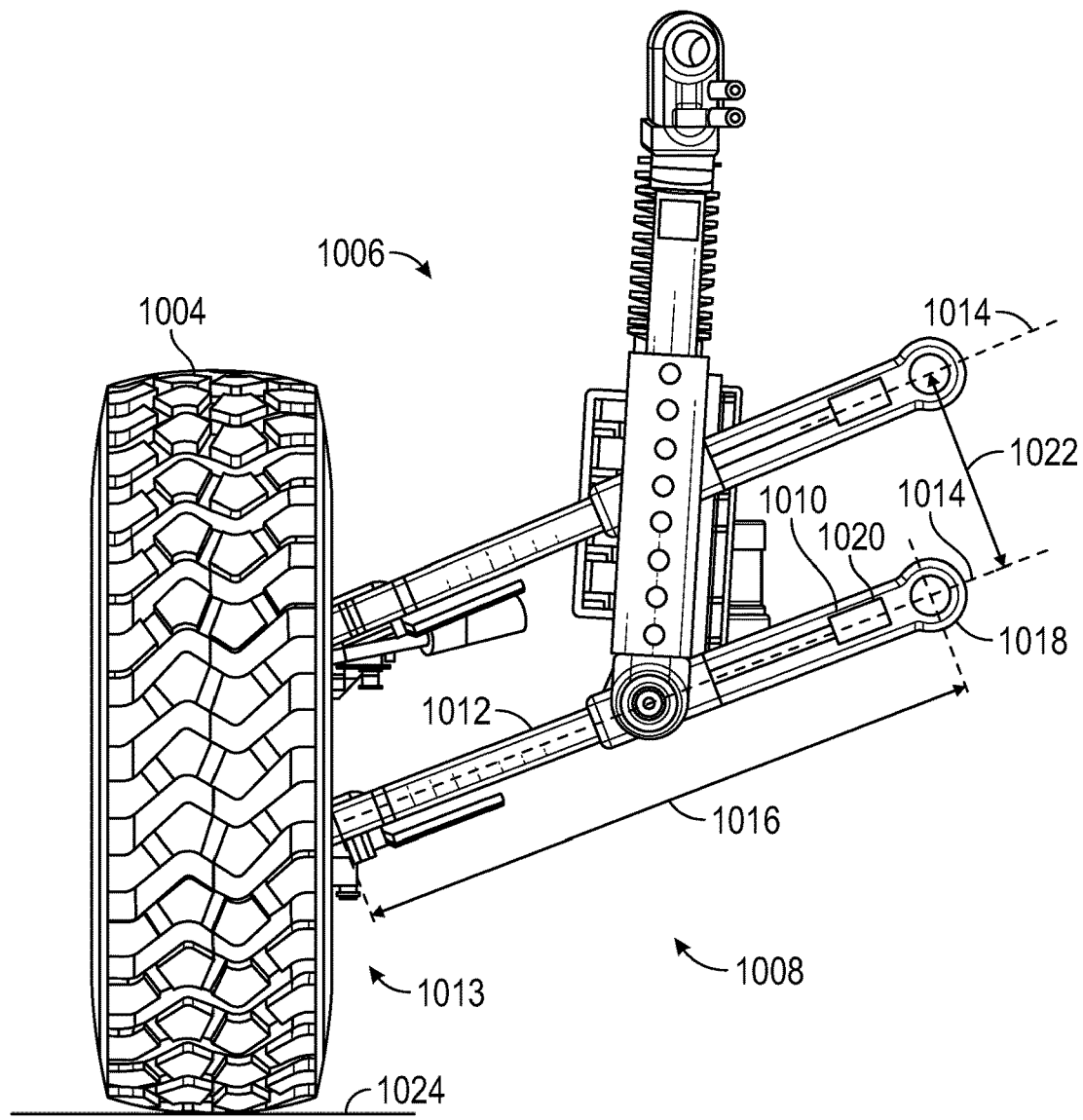
FIG. 19 is a front view of a portion of the suspension system of FIG. 15, according to an exemplary embodiment.
Figure 20:
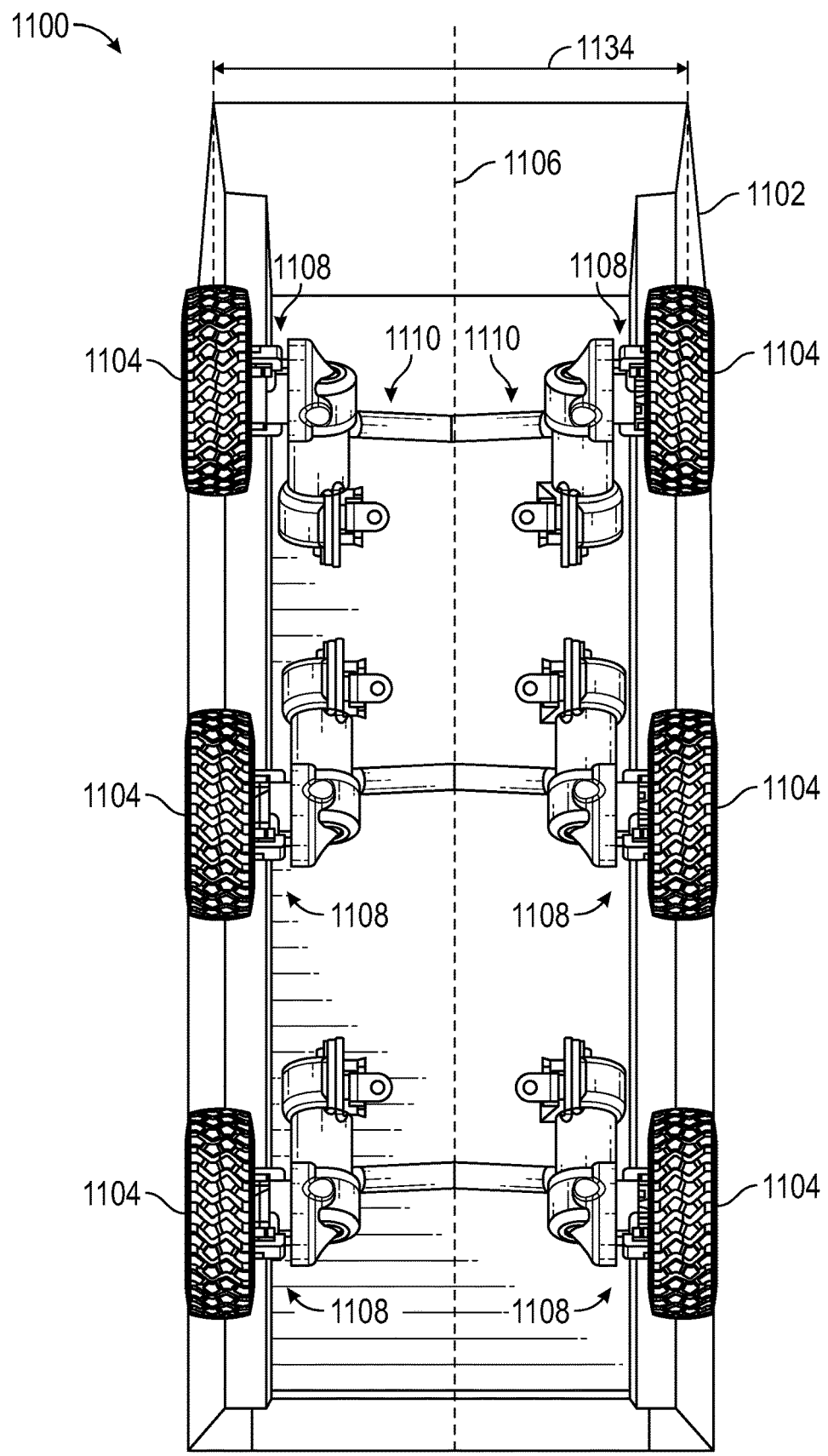
FIG. 20 is a bottom view of an articulated arm suspension system, according to an exemplary embodiment.

Referring particularly to FIG. 19, the extendable control arms 1008 include an outer member, a first member, an outer elongated member, an outer bar, an outer structural member, an outer support member, etc., shown as outer member 1010. The extendable control arm 1008 also includes an inner member, a second member, an inner bar, an inner structural member, an inner support member, etc., shown as inner member 1012. The inner member 1012 can be received within a cavity, a bore, a central openings, an inner volume, an internal volume, a space, etc., of the outer member 1010. The inner member 1012 can be slidably coupled with the outer member 1010 such that the inner member 1012 can translate relative to the outer member 1010. In some embodiments, outer member 1010 includes a track and the inner member 1012 is configured to slide along the track in either direction. The outer member 1010 can be a hollow bar, beam, elongated member, structural member, etc., with an internal volume that extends through at least a portion of a length of the outer member 1010 and has a cross-sectional shape that corresponds to an outer periphery of the inner member 1012.

The inner member 1012 can be driven to extend or retract relative to the outer member 1010 to increase or decrease an overall longitudinal length 1016 of the extendable control arm 1008. A longitudinal axis 1014 extends through the extendable control arm 1008 and defines a longitudinal direction along the extendable control arm 1008. The support assembly 1006 can include two sets of two of the extendable control arm 1008. The first set of the extendable control arms 1008 and the second set of the extendable control arms 1008 can be substantially parallel with each other and may be offset a distance 1022 apart between their respective longitudinal axes 1014. In some embodiments, the first set of extendable control arms 1008 are a lower set of extendable control arms 1008 that are closer to a ground surface and the second set of extendable control arms 1008 are an upper set of extendable control arms 1008 that are above the first set.

The inner member 1012 can be driven to extend or retract by an actuator 1020. The actuator 1020 can be an electric actuator, a hydraulic cylinder, etc., that is positioned within an inner volume of the outer member 1010 (e.g., the inner volume that the inner member 1012 extends into). In some embodiments, the extendable control arm 1008 itself is a cylinder. The inner volume of the outer member 1010 that the inner member 1012 extends into can be filled with a hydraulic fluid or any other incompressible fluid. Fluid can be added or removed from the inner volume to extend or retract the inner member 1012 relative to the outer member 1010. For example, fluid can be added to the inner volume to extend the inner member 1012 relative to the outer member 1010, thereby increasing the overall longitudinal length 1016 of the extendable control arm 1008. Likewise, fluid can be removed from the inner volume to retract the inner member 1012 relative to the outer member 1010, thereby decreasing the overall longitudinal length 1016 of the extendable control arm 1008.

The actuator 1020 can be positioned within the inner volume of the outer member 1010 and can include an extendable shaft. The extendable shaft can fixedly couple with an end of the inner member 1012 that extends into the inner volume of the outer member 1010. In this way, the actuator (e.g., the linear actuator) can be operated (e.g., extended or retracted) to increase or decrease the overall longitudinal length 1016 of the extendable control arm by extending or retracting the inner member 1012 relative to the outer member 1010.

The actuators 1020 of each of the extendable control arms 1008 can be independently operated to achieve a desired camber angle of the tractive element 1004 or to achieve a desired elevation of the frame 1002 relative to a ground surface 1024. In some embodiments, the outer member 1010 includes a connection portion, an eyelet, an end portion, etc., shown as connection portion 1018. The connection portion 1018 can include an aperture, an opening, a hole, etc., to facilitate coupling (e.g., pivotally coupling) the outer member 1010 with the frame 1002. In some embodiments, the outer member 1010 pivotally or rotatably couples with the frame 1002 through the connection portion 1018. The connection portion 1018 can be configured to receive a pin or an elongated member therethrough to rotatably or pivotally couple the extendable control arm 1008 with the frame 1002. The connection portion 1018 can be integrally formed with an outer end (e.g., an end of the outer member 1010 that is proximate the frame 1002) of the outer member 1010, fixedly coupled with the outer member 1010, etc.

The inner member 1012 can be pivotally coupled with the wheel hub 1013. In some embodiments, the inner member 1012 includes a connection portion similar to connection portion 1018 that is configured to couple the inner member 1012 with a ball joint at the wheel hub 1013. In this way, an angle of the extendable control arm 1008 can change, while an orientation of the frame 1002 and the tractive element 1004 may remain relatively constant (e.g., a camber angle of the tractive element 1004).

Figure 16:
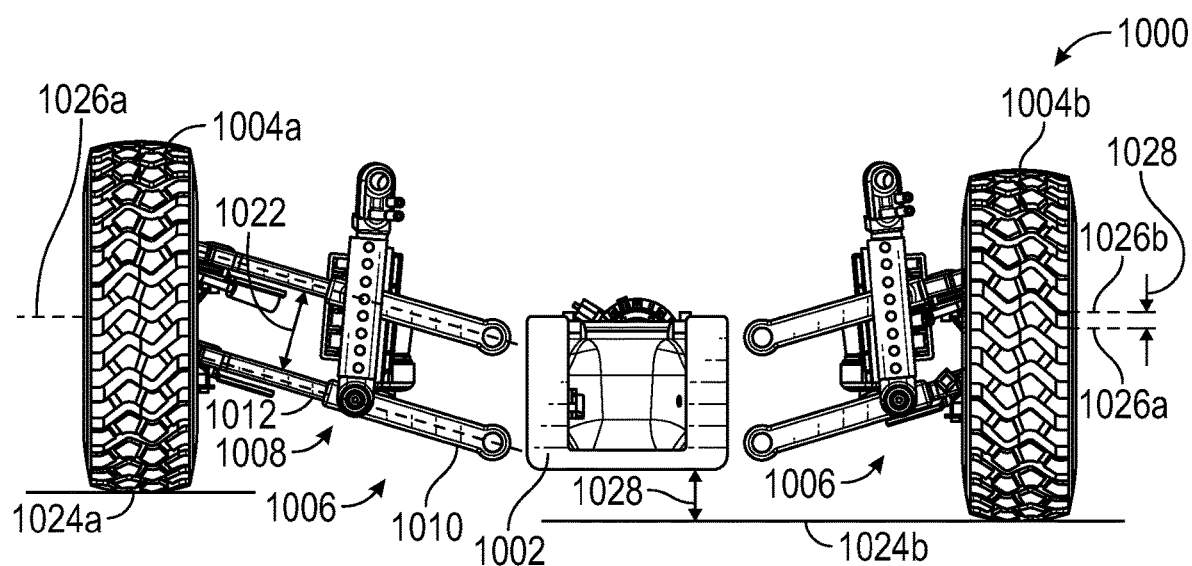
FIG. 16 is a front view of the suspension system of FIG. 15, according to an exemplary embodiment.
Figure 17:
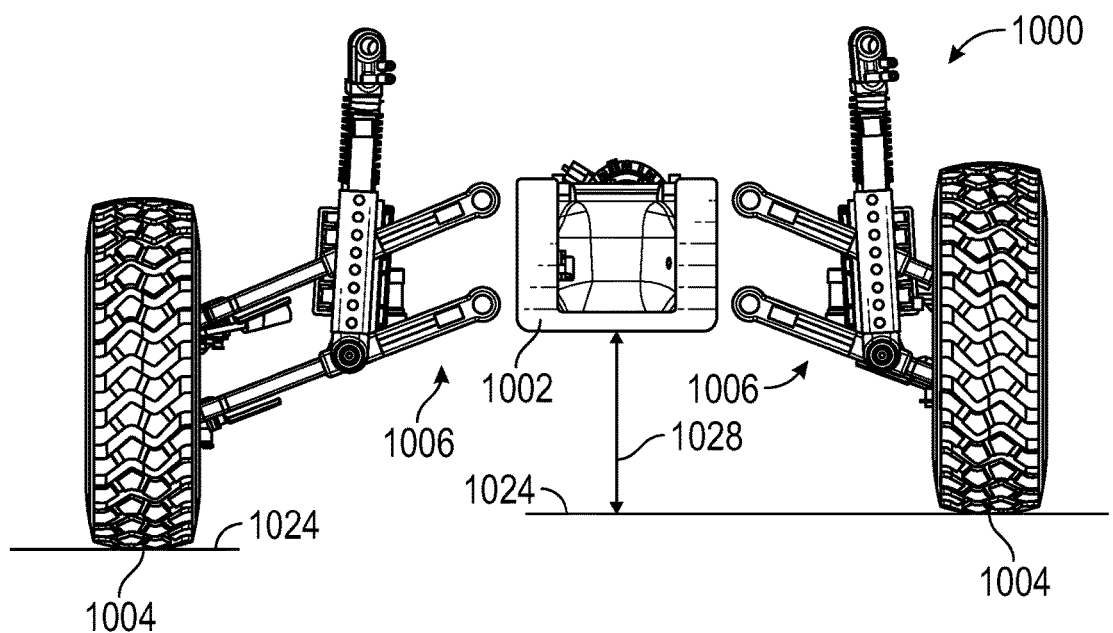
FIG. 17 is a front view of the suspension system of FIG. 15, according to an exemplary embodiment.
Figure 18:
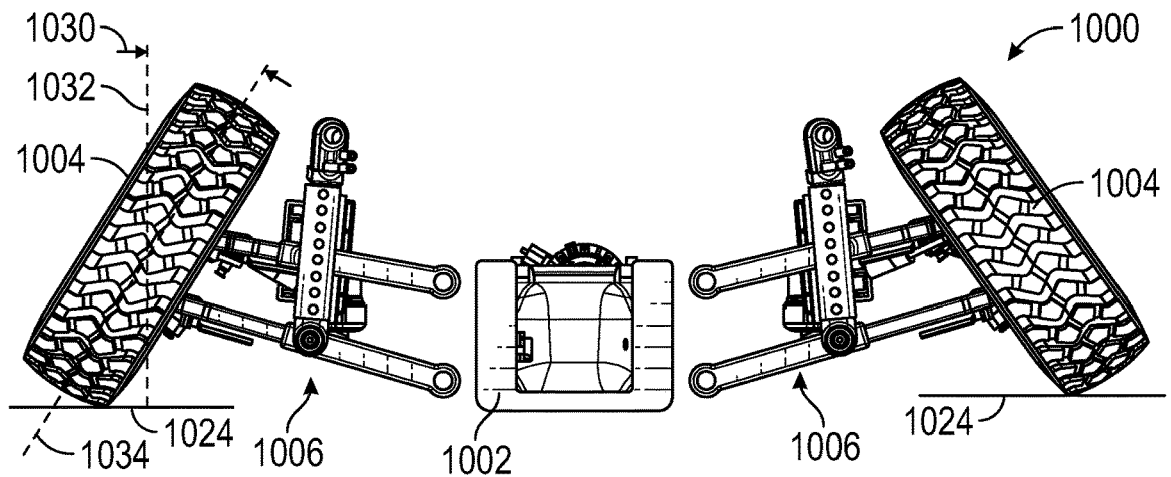
FIG. 18 is a front view of the suspension system of FIG. 15, according to an exemplary embodiment.

Referring particularly to FIGS. 16-18, various operational abilities of the suspension system 1000 are shown. The extendable control arms 1008 can be extended or retracted (e.g., by operating the actuators 1020) in unison to raise or lower the frame 1002 relative to the ground surface 1024. For example, the actuators 1020 can be operated to extend or retract the extendable control arms 1008 a same amount, thereby elevating the frame 1002 relative to the ground surface 1024 while preserving an orientation of the frame 1002 (e.g., increasing or decreasing a distance 1028 between a bottom of the frame 1002 and the ground surface 1024, shown in FIGS. 16-17).

The extendable control arms 1008 can also be operated to level the frame 1002. For example, a first tractive element 1004a may rest upon a ground surface 1024a that is elevated relative to a ground surface 1024b that a second tractive element 1004b rests upon. The extendable control arms 1008 that extend between the first tractive element 1004a and the frame 1002 may be extended to level the frame 1002. Operating the extendable control arms 1008 that extend between the first tractive element 1004a and the frame 1002 may increase the overall longitudinal length 1016 of the extendable control arm 1008, thereby increasing a relative elevation between the first tractive element 1004a and the frame 1002. A relative elevation 1028 between central axes 1026 (e.g., central axis 1026a of the first tractive element 1004a and central axis 1026b of the second tractive element 1004b) can be controlled (e.g., increased or decreased) by operating the extendable control arms 1008.

For example, the extendable control arms 1008 can be operated to extend, thereby increasing the distance 1028 between the frame 1002 and the ground surface 1024. In some embodiments, if the upper set of extendable control arms 1008 and the lower set of extendable control arms 1008 are operated to extend or retract in unison (e.g., a same amount), the upper set of extendable control arms 1008 and the lower set of extendable control arms 1008 may remain parallel, or a relative angle between the upper set of extendable control arms 1008 and the lower set of extendable control arms 1008 remains constant.

However, the upper set of extendable control arms 1008 and the lower set of extendable control arms 1008 can be operated to extend or retract different amounts to thereby change a camber angle 1030 of each tractive element 1004 as shown in FIG. 18. The camber angle 1030 is defined between a vertical axis 1032 and a central plane or a central axis 1034 of the tractive element 1004. The lower set of extendable control arms 1008 can be extended, or the upper set of extendable control arms 1008 can be retracted (or both) to make the camber angle 1030 more negative (e.g., as shown in FIG. 18). Likewise, the lower set of extendable control arms 1008 can be retracted, or the upper set of extendable control arms 1008 can be extended (or both) to make the camber angle 1030 more positive.

Advantageously, the extendable control arms 1008 facilitate a suspension system with increased amounts of wheel travel (e.g., travel of the tractive elements 1004), thereby facilitating avoiding interference between vehicle components and the suspension sweep. The extendable control arms 1008 also facilitate increased space availability for tire sweeps. Soft suspension rates and lower roll stiffness may be associated with increased wheel travel. By using the extendable control arms 1008, the suspension system 1000 facilitates an adjustable track width that can improve handling stability. In some embodiments, the suspension system 1000 facilitates up to 30 inches of suspension travel and increased suspension sweep clearance. The extendable control arms 1008 can also facilitate an added degree of freedom for a transportation mode. The adjustable track width is facilitated by the extendable control arms 1008 and can improve handling stability. The extendable control arms 1008 can be actively controlled (e.g., by a control system) to maintain a desired wheel camber and to maximize wheel contact patch. For an amphibious vehicle, the suspension system 1000 facilitates providing an operation to lift and pivot the tractive elements 1004 for improved water mobility. Track width adjustments can also result in a variable motion ration, effectively changing wheel end suspension rates for different operational modes.

The control system can include a controller configured to operate the actuators 1020 to achieve a desired camber angle (e.g., a desired value of the camber angle 1030 as shown in FIG. 18) and to maintain the camber angle throughout a suspension sweep. The control system can use a variety of hardware configurations and may use a variety of control schemes to maintain the desired camber angle (e.g., feedback control, PID control, PI control, etc.).

Articulated Arm Suspension

Referring now to FIGS. 20-25, an articulated arm suspension 1100 for a vehicle includes various articulated arms 1110 and tractive elements 1104. The tractive elements 1104 can be wheels, tires, treads, rotatable members, etc., that are configured to engage (e.g., frictionally engage) a ground surface 1124 and propel the vehicle. The vehicle can include a body, a frame, a hull, a carriage, etc., shown as body 1102. The tractive elements 1104 are configured to engage the ground surface 1124 to transport the vehicle (e.g., to transport the body 1102) along the ground surface 1124. The tractive elements 1104 can be configured to support the vehicle (e.g., to support the body 1102). Any number of tractive elements 1104 can be used (e.g., six as shown in FIGS. 20-25, four, eight, etc.).

The articulated arm suspension 1100 includes multiple articulated arms 1110 that extend between the body 1102 and the tractive elements 1104. For example, one of the articulated arms 1110 may extend between each of the tractive elements 1104 and the body 1102. The articulated arms 1110 can be configured to couple with the body 1102 at a first end (e.g., an inner end) and a wheel hub of the tractive element 1104 at an opposite end. The body 1102 defines a central longitudinal axis 1106. The articulated arms 1110 can extend at least partially in a lateral direction towards the central longitudinal axis 1106. The articulated arms 1110 can extend to the central longitudinal axis 1106 and may be coupled with the body 1102 at the central longitudinal axis 1106.

Figure 25:
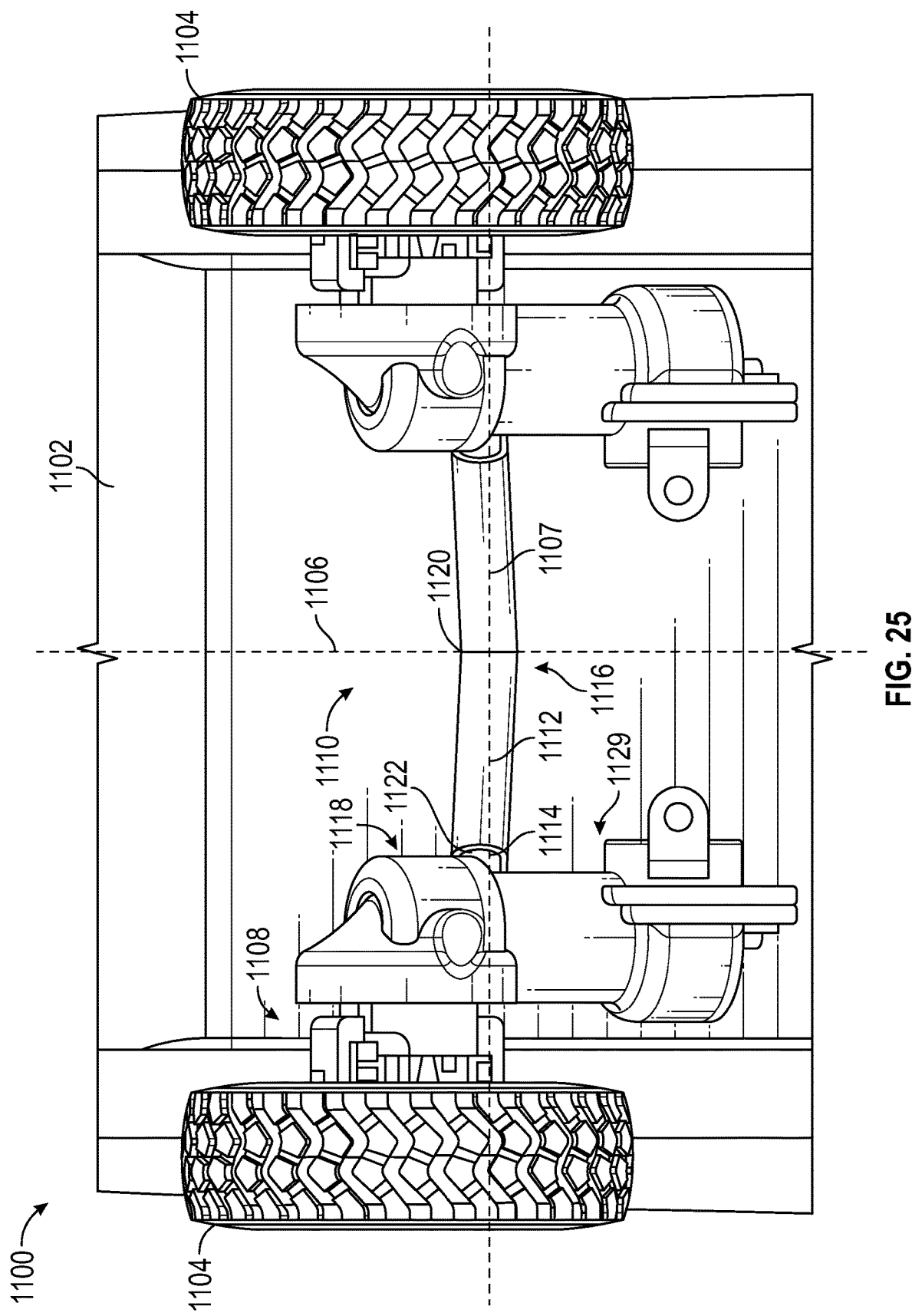
FIG. 25 is a bottom view of a portion of the suspension system of FIG. 20, according to an exemplary embodiment.

Referring particularly to FIG. 25, the articulated arm 1110 can be a telescoping member, an extendable member, a retractable member, etc. Specifically, the articulated arm 1110 can include an inner member, an inner tubular member, an extendable member, etc., shown as inner member 1114. The articulated arm 1110 can also include an outer member, an outer tubular member, a female member, etc., shown as outer member 1112. The inner member 1114 can be configured to extend or retract relative to the outer member 1112. The inner member 1114 can be received within an inner volume, a cavity, a hollow portion, etc., of the outer member 1112. The inner member 1114 and the outer member 1112 may both be tubular members and a cross-sectional shape of the inner volume or cavity of the outer member 1112 that receives the inner member 1114 may correspond to a cross-sectional shape or an outer periphery of the inner member 1114. An exterior surface (e.g., a radially outwards facing surface) of the inner member 1114 can slidably couple with an interior surface (e.g., a radially inwards facing surface of the outer member 1112). The outer member 1112 may be positioned laterally inwards relative to the inner member 1114 (e.g., closer to the central longitudinal axis 1106).

The articulated arm 1110 includes a first end, an inner end, a proximate end, etc., shown as inner end 1116 and a second end, an outer end, a distal end, etc., shown as outer end 1118. The outer end 1118 is opposite the inner end 1116. The outer end 1118 can be an outer most end of the inner member 1114 (e.g., an end of the inner member 1114 that is most proximate the corresponding tractive element 1104 or most laterally outwards). The inner end 1116 can be an inner most end of the outer member 1112 (e.g., an end of the outer member 1112 that is most proximate the central longitudinal axis 1106 or most laterally inwards).

The articulated arm 1110 is coupled, jointed, pivotally coupled, etc., with the body 1102 at the inner end 1116. The articulated arm 1110 is also coupled, jointed, pivotally coupled, etc., with a wheel hub, a hub assembly, etc., shown as wheel hub 1108 at the outer end 1118. The articulated arm 1110 can be pivotally coupled with the body 1102 at the inner end 1116 with an inner joint 1120. The inner joint 1120 can be a ball and socket joint (e.g., providing two degrees or rotational or pivotal freedom), or any other joint to provide at least one degree of rotational or pivotal freedom. In some embodiments, the inner joint 1120 has two degrees of rotational freedom. In other embodiments, the inner joint 1120 has one degree of rotational freedom (e.g., about the longitudinal axis 1106, about a lateral axis 1107 that is perpendicular to the longitudinal axis 1106, about a vertical axis 1126 (see FIGS. 21-24), or any other axis). The inner joint 1120 can be positioned at the inner end 1116 of the articulated arm 1110 (e.g., at the inner end 1116 of the outer member 1112).

The articulated arm 1110 is coupled, jointed, pivotally coupled, etc., with the wheel hub 1108 at the outer end 1118. The articulated arm 1110 can be pivotally coupled with the wheel hub 1108 through an outer joint 1122. The outer joint 1122 can be the same as or similar to the inner joint 1120. For example, the outer joint 1122 can have a same number of degrees of rotational freedom as the inner joint 1120. In other embodiments, the outer joint 1122 has less or more degrees of rotational or pivotal freedom as the inner joint 1120. In some embodiments, the outer joint 1122 has one or more degrees of rotational or pivotal freedom about axes that are the same as the axes of the degrees of rotational/pivotal freedom as the inner joint 1120. For example, if the inner joint 1120 has a degree of rotational or pivotal freedom about the longitudinal axis 1106, the outer joint 1122 can also have a degree of rotational or pivotal freedom about the longitudinal axis 1106. In some embodiments, the outer joint 1122 has rotational/pivotal degrees of freedom that are about axes that are different than the inner joint 1120. For example, the outer joint 1122 may have a degree of freedom about an axis other than the longitudinal axis 1106 while the inner joint 1120 has a degree of freedom about the longitudinal axis 1106.

The wheel hub 1108 can be fixedly coupled with the body 1102 and may support the tractive element 1104. The tractive element 1104 can be rotatably coupled with the wheel hub 1108 such that the tractive element 1104 can rotate relative to the wheel hub 1108 to facilitate transportation of the vehicle. The tractive element 1104 can be driven by an electric motor or a rotary actuator 1129 that is coupled (e.g., fixedly) with the wheel hub 1108. In this way, the electric motor 1129 can drive the tractive element 1104 while being supported by the wheel hub 1108. In other embodiments, a drive train is routed through the articulated arms 1110. For example, the drive train may include shafts that extend through the inner volume of the articulated arms 1110 and can drive bevel gears to transfer the rotational kinetic energy to the tractive elements 1104.

The articulated arm 1110 can be selectively extended or retracted to achieve a desired overall length, and thereby achieve a desired distance or clearance (e.g., a vertical height) between the body 1102 and the ground surface 1124. The articulated arm 1110 may be a hydraulic cylinder that is filled with hydraulic fluid to increase or decrease the overall length of the articulated arm 1110 (e.g., to extend or retract the articulated arm 1110). The articulated arm 1110 can include an electric actuator, a pneumatic cylinder, etc., or any other linear actuator that is positioned within the inner volume of the outer member 1112. The actuator can be operated by a controller, a control system, a pump, a motor, an engine, etc., or any combination thereof to achieve a desired overall length of the articulated arm 1110. The actuator can be configured to drive the inner member 1114 to translate relative to the outer member 1112 (e.g., to extend from or retract into the outer member 1112).

Figure 23:
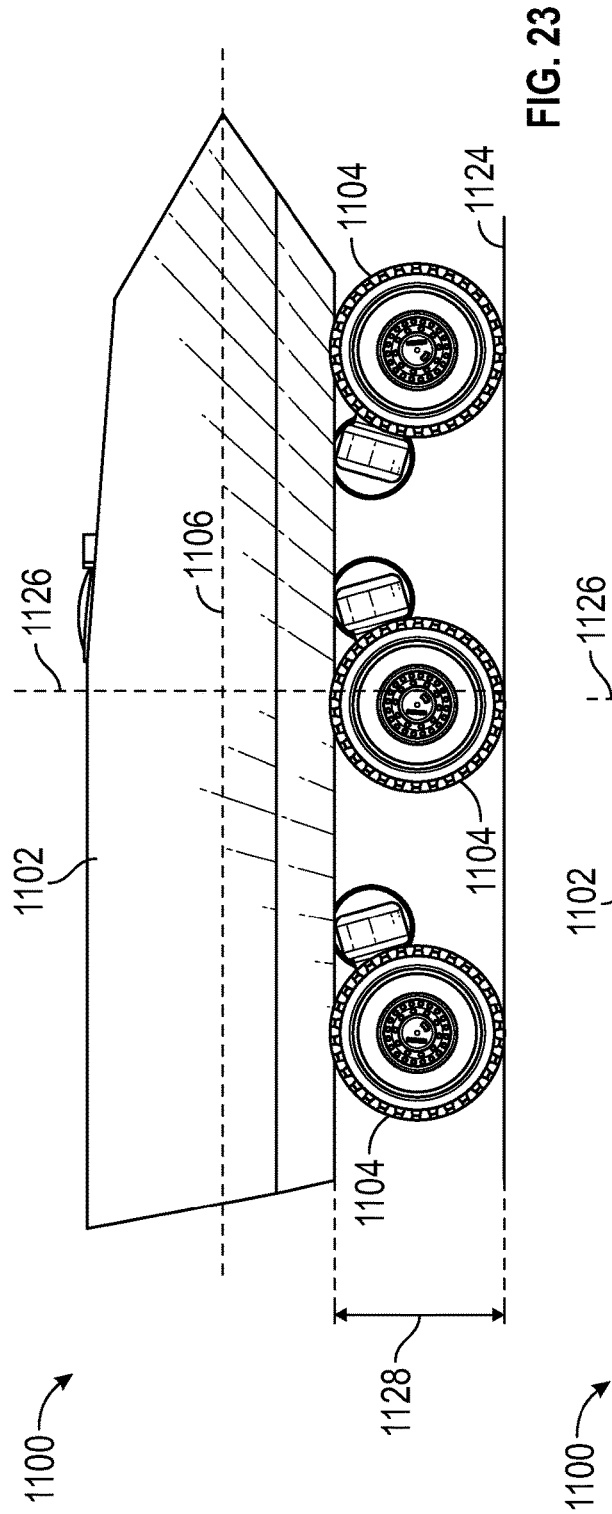
FIG. 23 is a side view of the suspension system of FIG. 20 in a partially lowered position, according to an exemplary embodiment.
Figure 24:
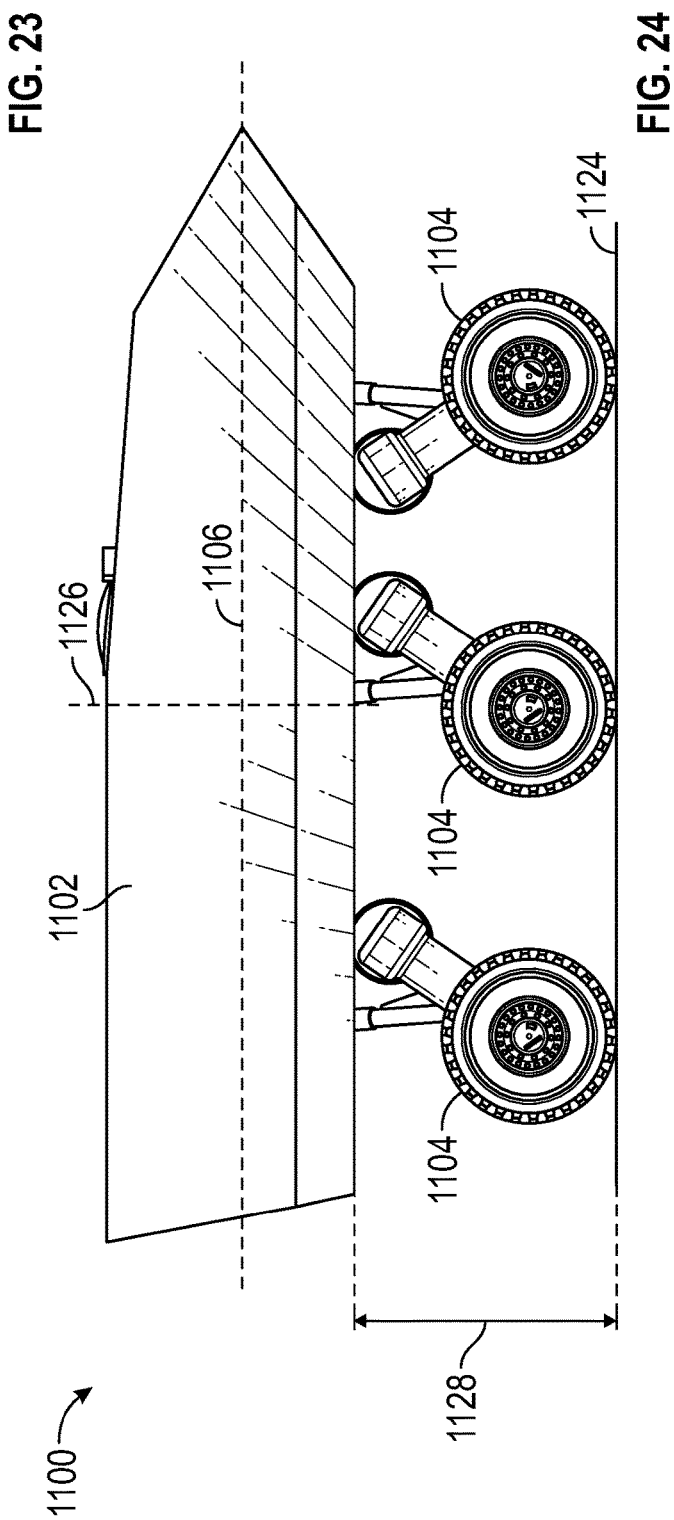
FIG. 24 is a side view of the suspension system of FIG. 20 in a raised position, according to an exemplary embodiment.

Referring now to FIGS. 21-24, the articulated arms 1110 can be selectively operated (e.g., extended or retracted, increased or decreased in overall length, etc.) to achieve a desired clearance 1128 between the body 1102 and the ground surface 1124. The articulated arms 1110 can be operated in unison to extend or retract to increase or decrease the clearance 1128 between the body 1102 and the ground surface 1124. For example, the articulated arms 1110 can be operated to raise the body 1102 to a maximum height (shown in FIG. 24) or lowered to a minimum height (shown in FIG. 22). The articulated arms 1110 can also be operated to raise or lower the body 1102 to an intermediate height as shown in FIGS. 22 and 23.

Referring still to FIGS. 21-24, the articulated arms 1110 can be operated to pitch the body 1102 forwards 1132 or to pitch the body rearwards 1130. For example, articulated arms 1110 that are longitudinally rearward on the vehicle or the body 1102 can be operated to extend, thereby pitching the body 1102 forwards 1132. Likewise, articulated arms 1110 that are longitudinally frontward on the vehicle or the body 1102 can be operated to retract, thereby pitching the body 1102 forwards 1132. The articulated arms 1110 that are longitudinally frontward can be operated to extend, thereby pitching the body 1102 rearwards 1130. Likewise, the articulated arms 1110 that are longitudinally rearward can be operated to retract, thereby pitching the body 1102 rearwards 1130. The articulated arms 1110 that are rearward and frontward can be operated in unison (e.g., extended and retracted or vice versa) to pitch the body 1102 forwards 1132 or rearwards 1130. The amount that the articulated arms 1110 are extended or retracted can be controlled to achieve both a desired amount of pitch of the body 1102 and to achieve a desired height or clearance 1128 of the body 1102.

The articulated arms 1110 can also be operated to control or adjust a roll of the body 1102 (e.g., an angular position of the body 1102 about the central longitudinal axis 1106). For example, articulated arms 1110 that are on a right side of the body 1102 (e.g., on a right side of a plane of the body 1102 defined by the vertical axis 1126 and the central longitudinal axis 1106) may be extended or retracted to pitch the body 1102. Likewise, the articulated arms 1110 that are on a left side of the body 1102 (e.g., on a left side of a plant of the body 1102 defined by the vertical axis 1126 and the central longitudinal axis 1106) can be extended or retracted to achieve a desired pitch of the body 1102. In some embodiments, both the articulated arms 1110 on the left side of the body 1102 and the articulated arms 1110 that are on the right side of the body 1102 are operated in unison to achieve the desired pitch of the body 1102.

In this way, the pitch, roll, and clearance of the body 1102 can be controlled or adjusted by operation of the articulated arms 1110. In some embodiments, the pitch, roll, clearance/elevation, etc., of the body 1102 is maintained constant (e.g., constant over time) if a degree of extension or retraction of the articulated arms 1110 is maintained. In other embodiments, the pitch, roll, and/or clearance of the body 1102 is adjusted in real-time by operating the articulated arms 1110 in real time. For example, a control system may operate to extend or retract (e.g., independently or in unison) any of the articulated arms 1110 in real time. The control system can operate the articulated arms 1110 in real-time based on sensor feedback (e.g., based on sensor feedback indicating a degree of extension or retraction of any of the articulated arms 1110, based on accelerometers or gyroscopes that indicate an acceleration of the body 1102 in multiple directions, etc.).

Referring again to FIG. 20, the articulated arms 1110 may extend in a direction that is not completely vertical. For example, the articulated arms 1110 may extend angularly outwards from the central longitudinal axis 1106. In this way, extension or retraction of the articulated arms 1110 can increase or decrease a track width 1134. The track width 1134 is defined as a lateral distance (e.g., in the lateral direction, along the lateral axis 1107) between the tractive elements 1104. Since the articulated arms 1110 are angled outwards from the central longitudinal axis 1106, extending the articulated arms 1110 results in the track width 1134 increasing, while retracting the articulated arms 1110 results in the track width 1134 decreasing.

Advantageously, the articulated arm suspension 1100 is a suspension system with multiple degrees of freedom. The articulated arm suspension 1100 can be operated to increase or decrease the track width 1134 of the vehicle, to raise or lower the vehicle, and/or to pitch or roll the vehicle as desired. The articulated arm suspension 1100 can provide 36 inches of vertical travel. Longitudinal and lateral travel of the tractive elements 1104 can be controlled by an operator of the vehicle. The track width 1134 can be increased to facilitate improved roll resistance of the vehicle. Additionally, the articulated arms 1110 can be selectively and independently operated to raise/lower particular tractive elements 1104 to place the tractive elements 1104 on top of a step or obstacle. In this way, the articulated arms 1110 can perform a crawling operation. The vehicle may be driven forwards with a front pair of the tractive elements 1104 raised to crawl the vehicle onto the step or the obstacle. Advantageously, this can facilitate improved transportation through soft soil, mud, etc. Additionally, if one of the tractive elements 1104 becomes damaged, the articulated arms 1110 can be operated to raise the damaged tractive element 1104 so that the damaged tractive element 1104 does not contact the ground surface 1124.

Double Ball Joint Suspension System

Referring now to FIGS. 26-32, a double ball joint suspension system 1200 for a vehicle 2700 (e.g., the vehicle 10) includes a body, a hull, a carriage, etc., shown as body 1202. The body 1202 can be fixedly coupled or integrally formed with a frame member, a bar, a beam, a central frame, etc., shown as frame 1206. The frame 1206 is configured to support or couple with (e.g., indirectly) tractive elements, wheels, treads, rotational members, transportation members, etc., shown as tractive elements 1204. The tractive elements 1204 are configured to engage a ground surface 1210 and propel or transport the vehicle 2700 along the ground surface 1210.

The body 1202 can be configured to support or transport passengers, military equipment, objects, etc. For example, the body 1202 can be a carriage configured to hold and support objects or people. An underside 1215 of the body 1202 can be fixedly coupled (e.g., fastened, welded, integrally formed, etc.) with the frame 1206. The frame 1206 can be an I-beam, a U-shaped beam, etc.

Figure 33:
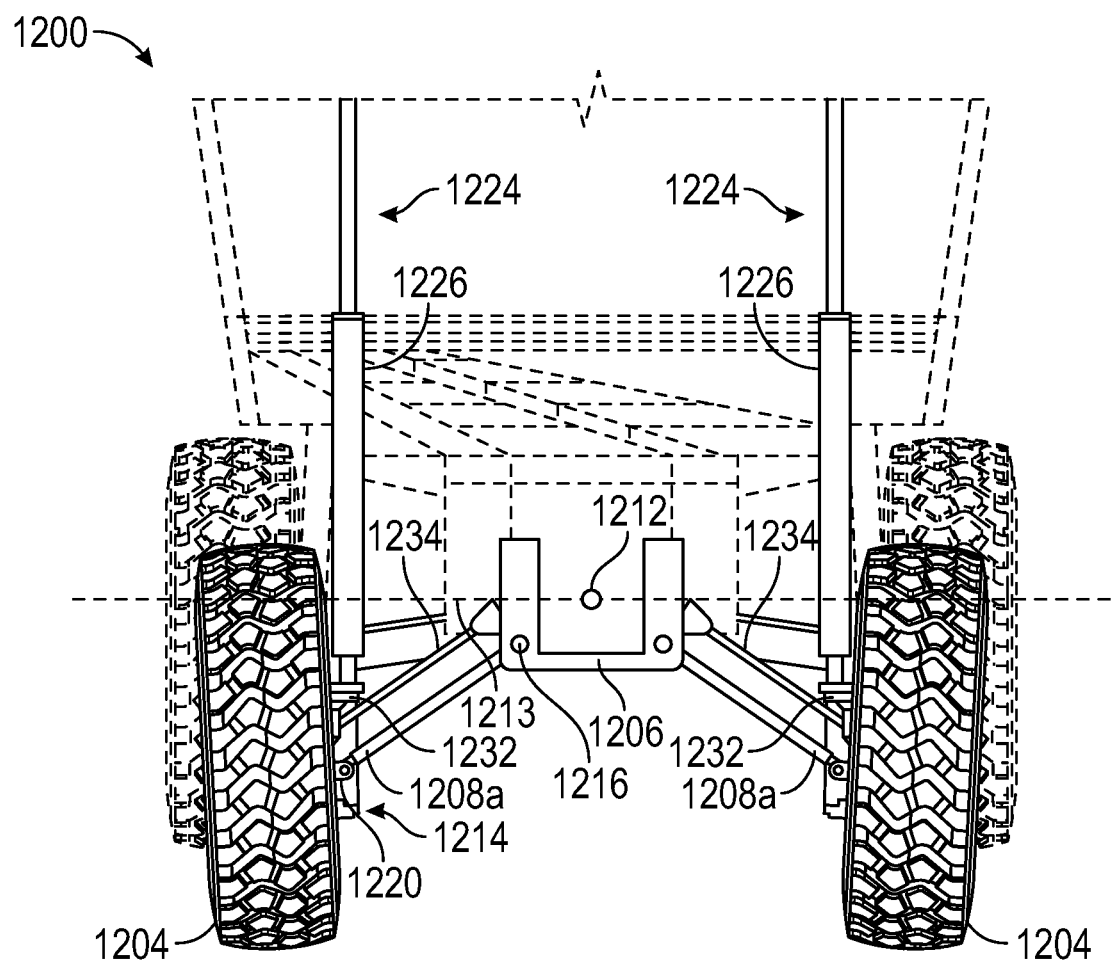
FIG. 33 is a front view of the suspension system of FIG. 26 with adjusted camber, according to an exemplary embodiment.

The frame 1206 can define a longitudinal axis 1212 that extends centrally along the frame 1206. The longitudinal axis 1212 can define a longitudinal direction of the vehicle 2700. A linkage, a bar, a beam, an elongated member, a tie rod, a control arm, etc., shown as linkage 1208 may extend between the tractive element 1204 and the frame 1206. Specifically, the linkages 1208 can extend from the frame 1206 to a wheel hub 1214 of the tractive element 1204. A first linkage 1208a is translationally fixedly coupled with the frame 1206 at a laterally inwards end through a connection 1216. The connection 1216 can be a pivotal connection (e.g., to pivotally couple the laterally inwards end of the linkage 1208 with the frame 1206), a rotatable connection (i.e., to rotatably couple the laterally inwards end of the linkage 1208 with the frame 1206) or a ball joint (e.g., to pivotally couple the laterally inwards end of the linkage 1208 with the frame 1206 and provide several degrees of rotational freedom). In some embodiments, the connection 1216 facilitates or allows rotation of the first linkage 1208a relative to the frame 1206 in at least one direction (e.g., about an axis that extends in a direction parallel with the longitudinal axis 1212). A laterally outwards end of the first linkage 1208a that is proximate the tractive element 1204 is coupled with the wheel hub 1214 through a ball joint 1220 such that the wheel hub 1214 and the tractive element 1204 can rotate relative to the first linkage 1208*a*. The first linkage 1208*a* can extend in a direction that is laterally outwards, partially longitudinally rearwards (or forwards) and at least partially in a vertical direction (e.g., upwards or downwards). The vertical direction is substantially perpendicular to both the longitudinal axis 1212 and the lateral direction (e.g., a direction along a lateral axis 1213 as shown in FIG. 33).

A second linkage 1208*b* extends between the frame 1206 and the wheel hub 1214 (e.g., between the frame 1206 and the tractive element 1204). The second linkage 1208*b* can couple with the frame 1206 at a laterally inwards end of the second linkage 1208*b* through a connection 1218 at a position that is longitudinally offset relative to the connection 1216. The connection 1218 can be a pivotal connection (e.g., to pivotally couple the laterally inwards end of the second linkage 1208*b* with the frame 1206), a rotatable connection (e.g., to rotatably couple the laterally inwards end of the second linkage 1208*b* with the frame 1206), a ball joint, etc. The connection 1218 can be longitudinally rearward of the connection 1216.

The second linkage 1208*b* extends in a direction that is at least partially laterally outwards from the longitudinal axis 1212. The second linkage 1208*b* couples with the wheel hub 1214 through the ball joint 1220. The ball joint 1220 can be translationally fixedly coupled with the wheel hub 1214 and can pivotally couple with the laterally outwards ends of both the first linkage 1208*a* and the second linkage 1208*b*. In this way, the frame 1206, the first linkage 1208*a* and the second linkage 1208*b* can form a triangle and may function as a control arm or an A-frame. The wheel hub 1214 and the tractive element 1204 can be driven to rotate about a steering axis 1222 that extends through the ball joint 1220. The steering axis 1222 can be substantially vertical, depending on a camber angle of the tractive element 1204 and the wheel hub 1214.

Referring particularly to FIGS. 26, 31-32, and 33, the suspension system 1200 can include power transmitting axles, constant velocity axles, etc., shown as axles 1234. The axles 1234 each extend laterally outwards from the frame 1206 to the corresponding wheel hub 1214. The axles 1234 are each configured to drive a corresponding tractive element 1204. The axles 1234 can include a spline at a laterally outer most end that is configured to engage the tractive elements 1204 and facilitate the transfer of rotational kinetic/mechanical energy to the tractive elements 1204 for transportation. The axles 1234 can each include one or more universal joints or any other joint that is configured to facilitate the transfer of the kinetic/mechanical axis about different axes.

Referring particularly to FIGS. 26, 30, and 32-33, the suspension system 1200 includes dampers, pistons, shock absorbers, struts, etc., shown as struts 1224, according to an exemplary embodiment. The struts 1224 can extend between the body 1202 and a corresponding wheel hub 1214. The struts 1224 are configured to absorb shocks, impulses, or sudden forces that are transmitted to the vehicle 2700 through the tractive elements 1204 (e.g., hitting an obstacle, hitting a depression such as a pothole, etc.). The struts 1224 can be extendable/retractable members or telescoping members and may include an outer member 1226 and an inner member 1228. The inner member 1228 can include a connection portion, an eyelet, a coupling, etc., shown as body connection portion 1230. The body connection portion 1230 is configured to translationally fixedly couple with the body 1202 (or slidably translationally couple with the body 1202). The body connection portion 1230 can be configured to pivotally couple with the body 1202 such that the strut 1224 can pivot in at least one direction relative to the body 1202 about the body connection portion 1230. The outer member 1226 can include a suspension connection portion, an eyelet, a connection portion, etc., shown as suspension connector 1232. The connector 1232 can rotatably and/or pivotally couple with the wheel hub 1214 such that the wheel hub 1214 and the strut 1224 can rotate or pivot relative to each other in at least one direction (e.g., along as least one axis). The connector 1232 may facilitate translationally fixedly couple the strut 1224 with the wheel hub 1214. In this way, the strut 1224 extends between the body 1202 and the wheel hub 1214 and is translationally fixedly coupled at either end with the body 1202 and the wheel hub 1214. The strut 1224 may be pinned at either end with the body 1202 and the wheel hub 1214. In other embodiments, the struts 1224 are mounted or translationally fixedly coupled at their opposite ends using ball joints, eyelets, etc. The outer member 1226 and the inner member 1228 can be rotatably fixedly coupled with each other (e.g., through a key) while being translationally coupled such that rotation of the inner member 1228 drives rotation of the outer member 1226 and vice versa.

The struts 1224 can be the same as or similar to the suspension elements described in greater detail with reference to U.S. application Ser. No. 14/684,082, now U.S. Pat. No. 9,944,145, granted Apr. 17, 2018, filed Apr. 10, 2015, the entire disclosure of which is incorporated by reference herein.

The tractive elements 1204 can be driven to rotate for steering through rotation of the struts 1224, or through the linkages 1208. For example, the first linkage 1208*a* and/or the second linkage 1208*b* can be replaced with or integrated with a linear actuator (e.g., a hydraulic actuator, an electric actuator, a pneumatic actuator, etc.). The actuator may extend or retract to drive the wheel hub 1214 and the tractive elements 1204 to rotate about their respective steering axes 1222. In other embodiments, one of the first linkage 1208 and the second linkage 1208 is driven to translate (e.g., extend or retract relative to the frame 1206) to drive the wheel hub 1214 and the tractive element 1204 to rotate about their respective steering axis 1222.

Referring particularly to FIG. 33, the struts 1224 can be extended or retracted to adjust a camber angle of the tractive element 1204. For example, the struts 1224 can retract (e.g., decrease in overall length) to produce a positive camber angle of the tractive element 1204. Likewise, the struts 1224 can extend to rotate the tractive element 1204 to produce a negative camber angle. The struts 1224 can be operated (e.g., by a control system) by adding or removing incompressible fluid to achieve a desired angle of camber for each tractive element 1204 (e.g., independently achieve a desired camber for each tractive element 1204).

In other embodiments, the first linkages 1208*a* and the second linkages 1208*b* are both replaced with or integrated with an actuator. The actuators can be operated to extend or retract the first linkages 1208*a* and the second linkages 1208*b* in unison, thereby adjusting the camber of the corresponding tractive element 1204.

The struts 1224 can also be operated to extend or retract to lower or raise the tractive elements 1204. For example, when the vehicle 2700 encounters an obstacle, a control system may operate the struts 1224 of a front set of tractive elements 1204 to retract, thereby raising the front set of tractive elements 1204 to "crawl" over the obstacle.

Figure 27:
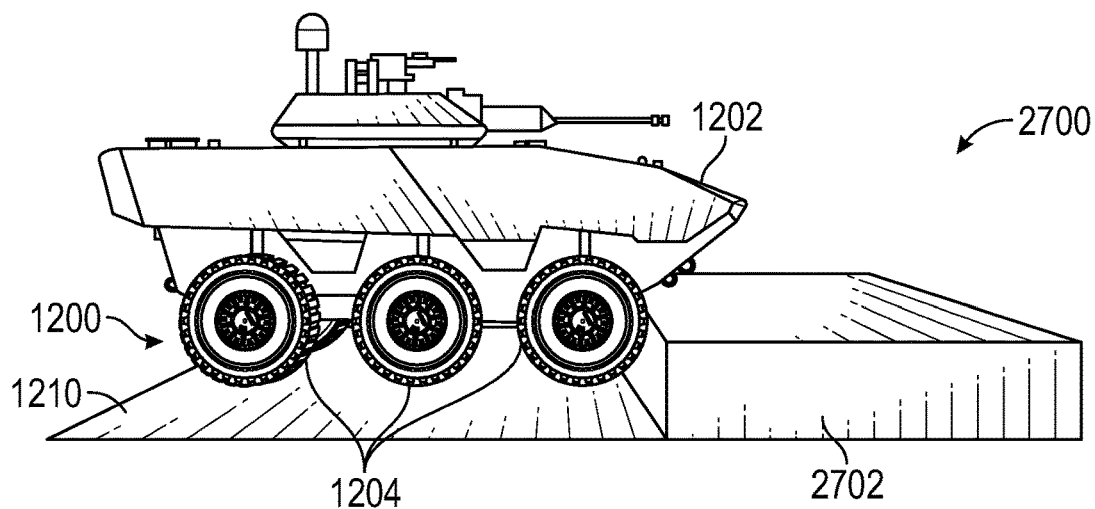
FIG. 27 is a perspective view of a vehicle equipped with the suspension system of FIG. 26 approaching a step, according to an exemplary embodiment.
Figure 28:
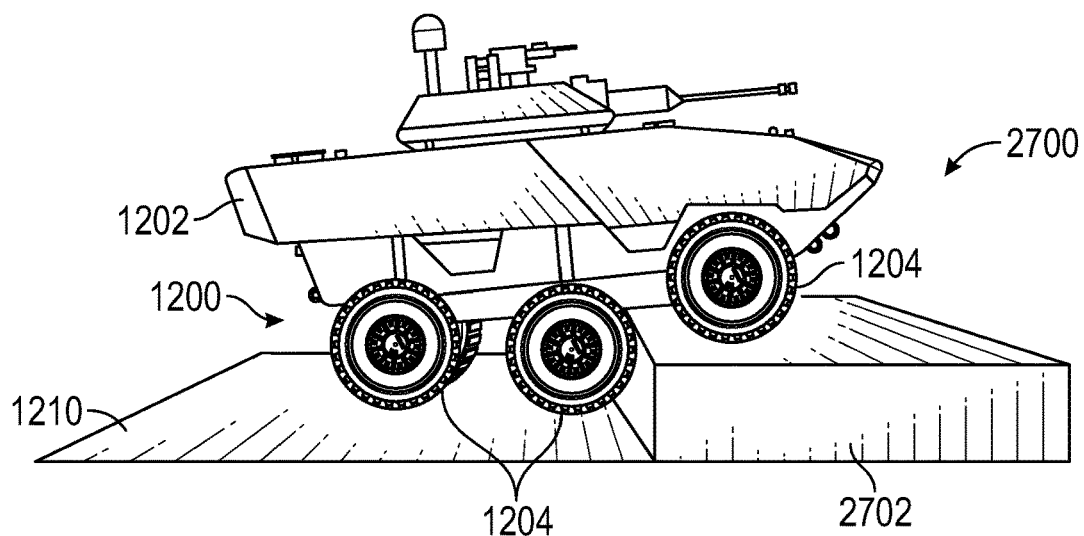
FIG. 28 is a perspective view of the vehicle of FIG. 27 crawling over the step, according to an exemplary embodiment.
Figure 29:
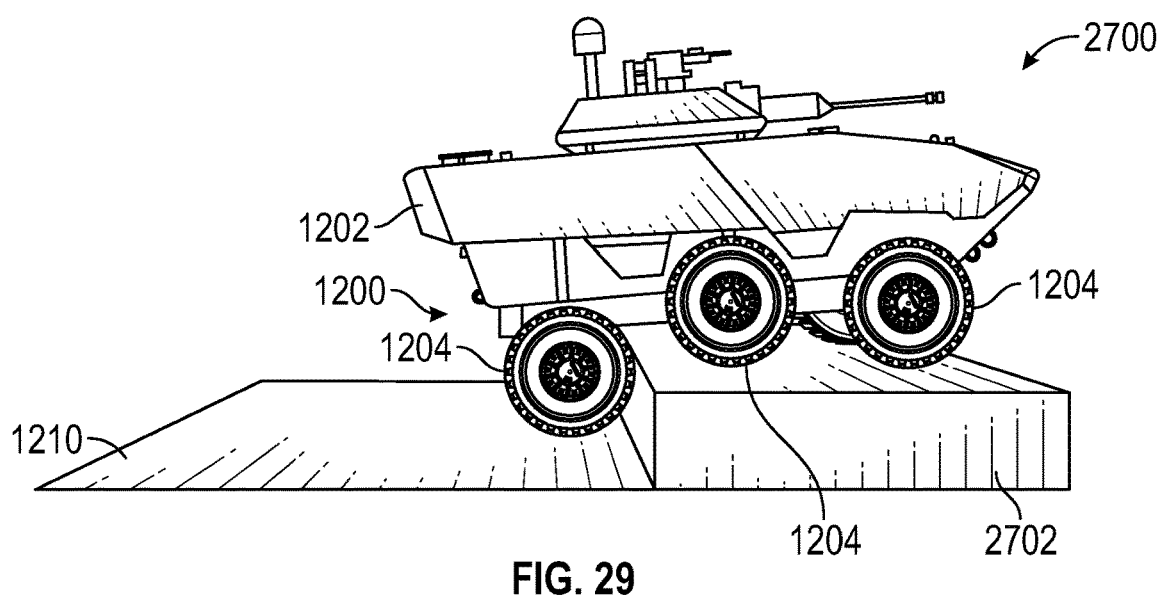
FIG. 29 is a perspective view of the vehicle of FIG. 27 completing a crawl operation over the step, according to an exemplary embodiment.
Figure 30:
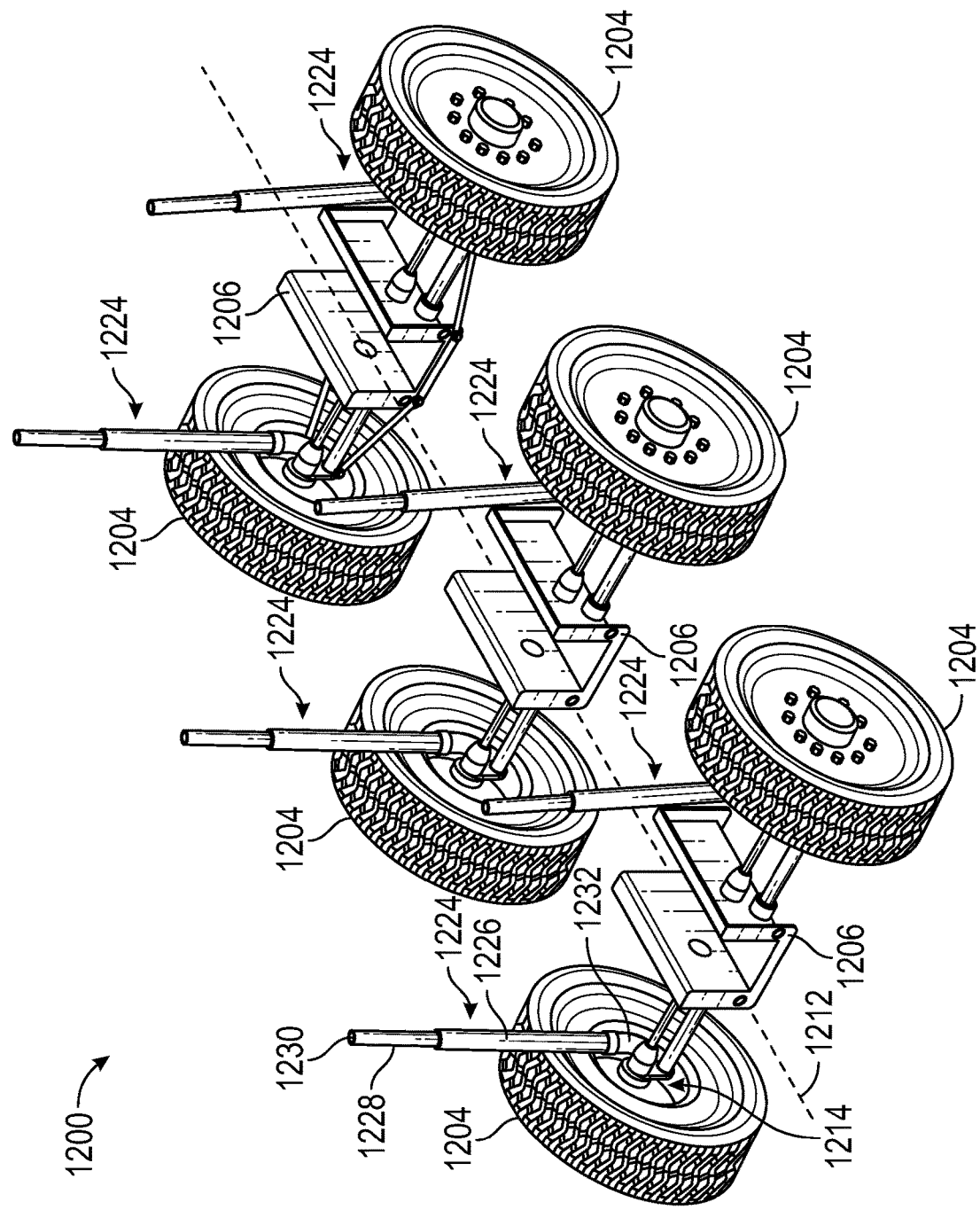
FIG. 30 is a perspective view of the suspension system of FIG. 26, according to an exemplary embodiment.
Figure 31:
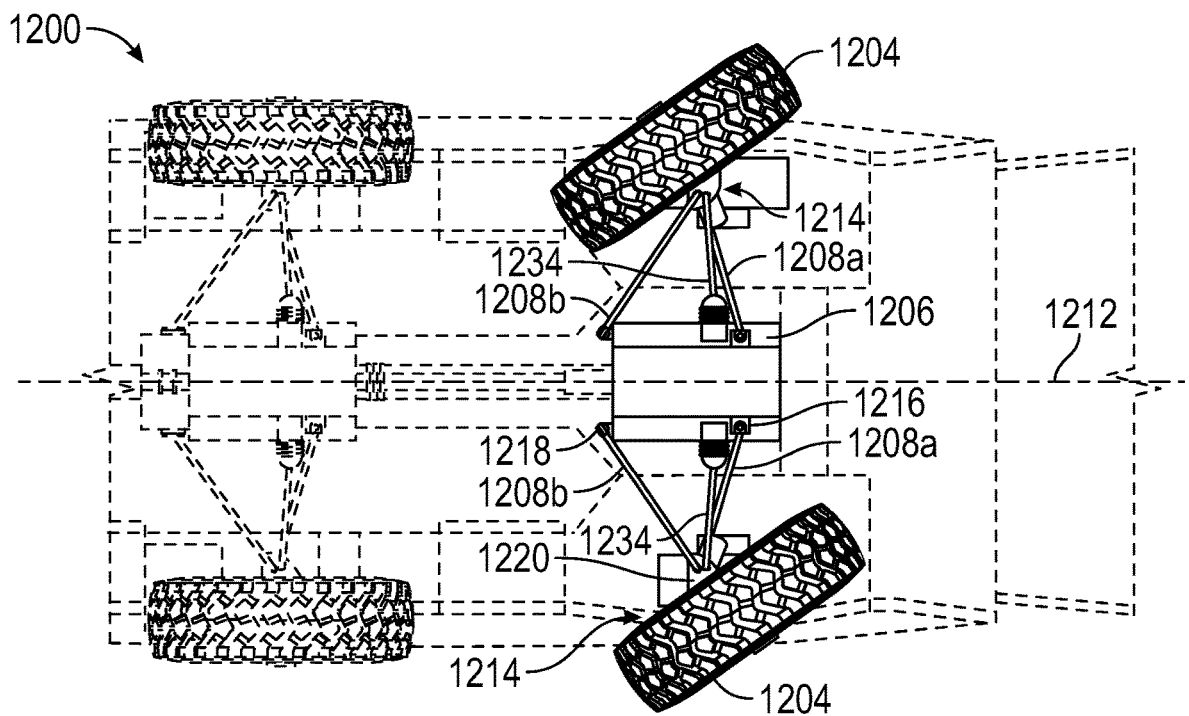
FIG. 31 is a bottom view of a portion of the suspension system of FIG. 26, according to an exemplary embodiment.
Figure 32:
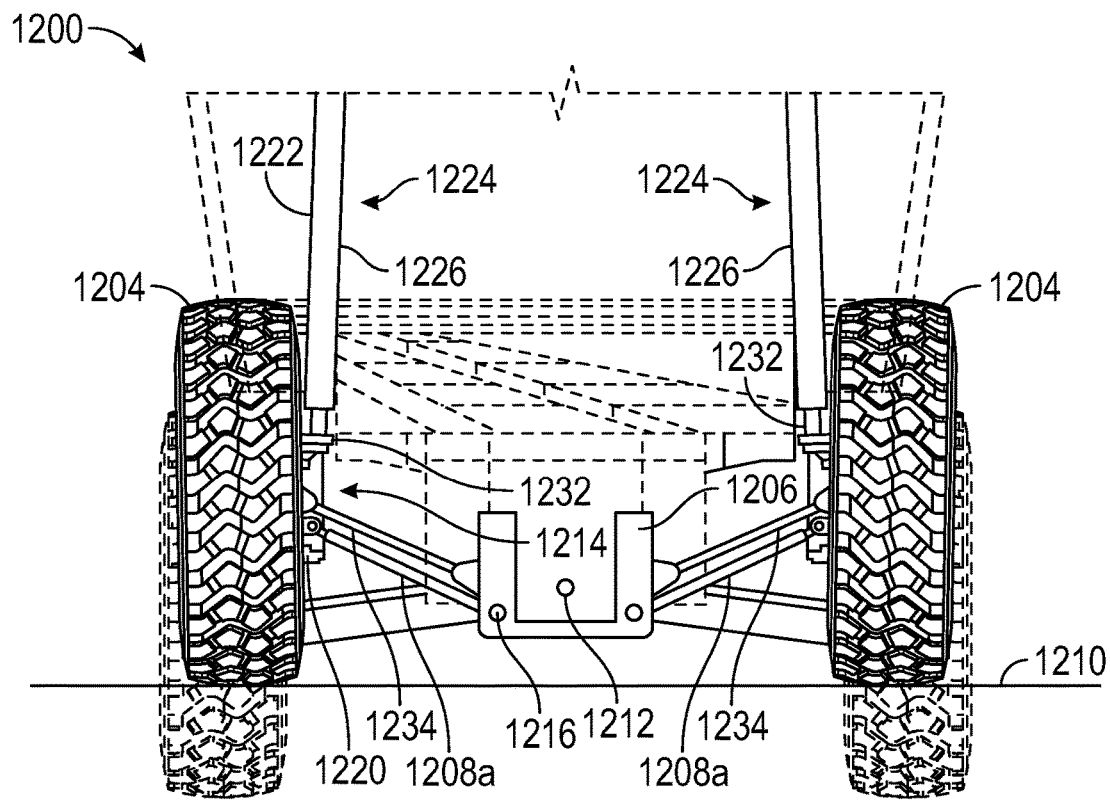
FIG. 32 is a front view of a portion of the suspension system of FIG. 26, according to an exemplary embodiment.

Referring particularly to FIGS. 27-29, the vehicle 2700 is shown performing a crawl operation up a step 2702. In FIG. 27, the vehicle first encounters the step 2702. In order to crawl up the step 2702, a control system or an operator may operate the struts 1224 to raise the front set of tractive elements 1204 (as shown in FIGS. 27-28). The operator or the control system can operate the rest of the struts 1224 to raise the tractive elements 1204 as the various sets of tractive elements 1204 engage or approach the step 2702. In this way, the vehicle 2700 can perform a crawl operation to lift itself over obstacle, steps, etc.

Figure 26:
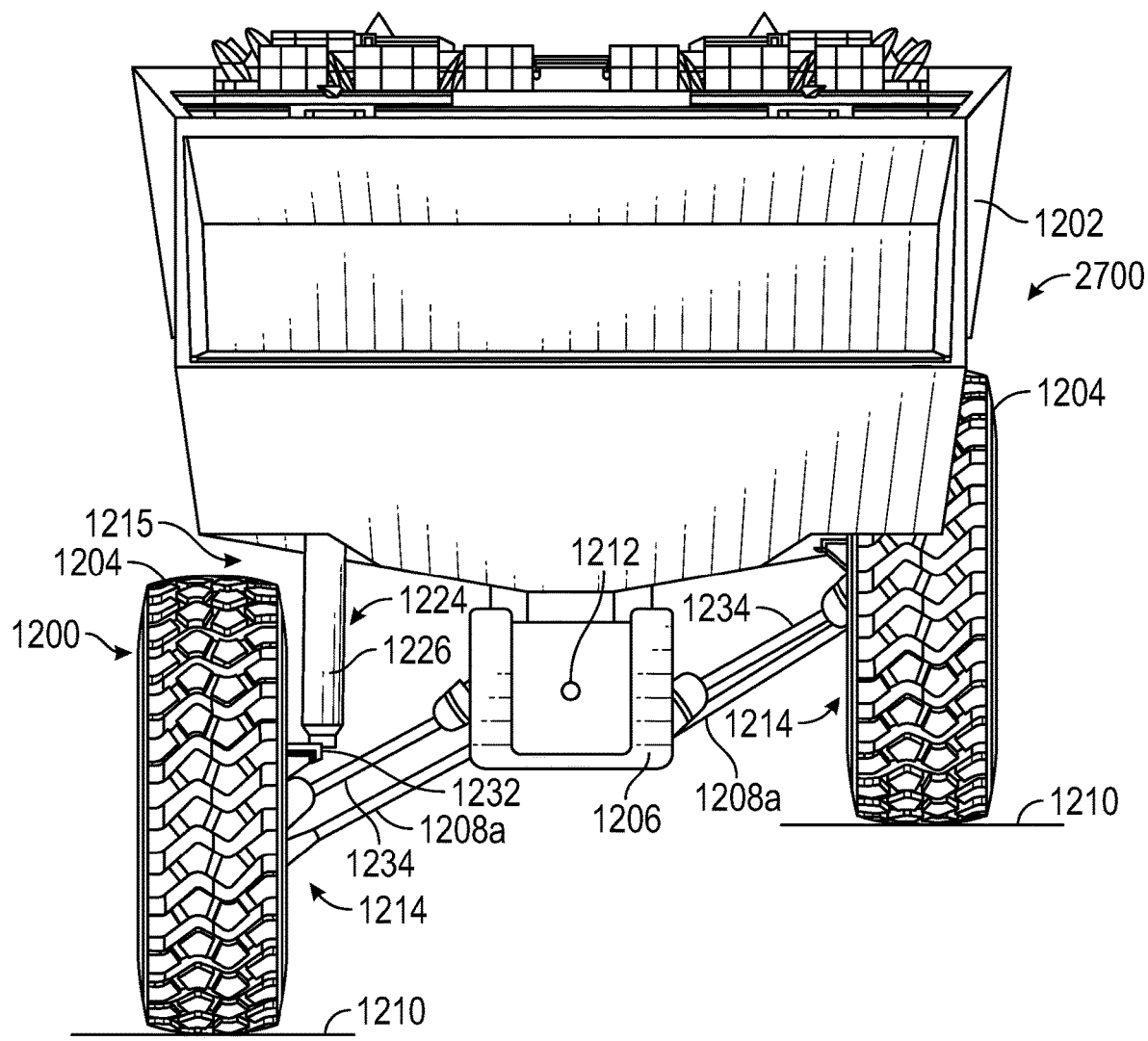
FIG. 26 is a front view of a suspension system including ball jointed linkages, according to an exemplary embodiment.

Referring particularly to FIG. 26, left and right tractive elements 1204 can be raised or lowered by operating the corresponding struts 1224. For example, if the vehicle 2700 is driving on uneven terrain, the struts 1224 can be operated (e.g., based on a user input or based on sensor feedback such as sensor information from a gyroscope) to level the body 1202, even if the ground surface 1210 that one of the tractive elements 1204 engages is elevated or lowered relative to the ground surface 1210 that others of the tractive elements 1204 engage. The struts 1224 can also be operated to raise or lower the body 1202, to adjust a pitch or roll angle of the body 1202, to level the body 1202, etc. For example, the struts 1224 can be operated in unison to raise or lower the body 1202 relative to the ground surface 1210, to pitch the vehicle 2700 forwards or rearwards, or to roll the body 1202 of the vehicle 2700 in either direction.

Advantageously, using the linkages 1208 facilitates a robust, lightweight suspension assembly. The suspension system 1200 also facilitates improved/adjustable ground clearance (e.g., raising and lowering the body 1202), up to 30 inches of travel (e.g., in the vertical direction) of the tractive elements 1204 (where the vertical travel of each tractive element 1204 may be each controlled independently), and reduced tire/tractive element scrub.

Advantageously, the suspension system 1200 facilitates modularity such that one or more of the linkages 1208 can be easily removed and replaced with an actuator or a telescoping linkage. Replacing the linkages 1208 can also facilitate longitudinal or lateral wheel movement and an adjustable track width (e.g., an adjustable lateral distance between corresponding tractive elements 1204).

It should be understood that any of the suspension systems of FIGS. 5-33 can be used with or integrated for use with the vehicle 10. Additionally, any or all combinations of the various suspension components shown in FIGS. 5-33 should be understood to be within the scope of the present disclosure.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical suspension system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A suspension system for a vehicle comprising:
    a wheel hub;
    a tractive element rotatably coupled with the wheel hub and configured to be driven for transportation and rotated for steering;
    a housing;
    a first power transmission train positioned at least partially within the housing configured to drive the tractive element for transportation, the first power transmission train comprising a first telescoping drive shaft;
    a second power transmission train positioned at least partially within the housing configured to drive the tractive element to rotate for steering, the second power transmission train comprising a second telescoping drive shaft;
    wherein the first telescoping drive shaft is positioned within the second telescoping drive shaft, and both the first telescoping drive shaft and the second telescoping drive shaft are positioned within the housing.

2. The suspension system of claim 1, further comprising:
    a third power transmission train positioned at least partially within the housing for rotating the wheel hub of the suspension system, the third power transmission train comprising a third telescoping drive shaft positioned within the housing, wherein the first telescoping drive shaft and the second telescoping drive shaft are both positioned within an inner volume of the third telescoping drive shaft.

3. The suspension system of claim 2, wherein one or more outwards facing surfaces of the first telescoping drive shaft are slidably coupled with one or more inwards facing surfaces of the second telescoping drive shaft, and one or more outwards facing surfaces of the second telescoping drive shaft are slidably coupled with one or more inwards facing surfaces of the third telescoping drive shaft.

4. The suspension system of claim 1, wherein the first telescoping drive shaft of the first power transmission train comprises:
an outer member comprising an input gear at a first end configured to receive a first torque input; and
an inner member comprising an output gear at a second end;
wherein a first end of the inner member is received within and slidably coupled with the outer member through a second end of the outer member;
wherein the first power transmission train further comprises an output drive shaft comprising a gear configured to engage the output gear of the first telescoping drive shaft to drive the tractive element for transportation.

5. The suspension system of claim 1, wherein the second telescoping drive shaft of the second power transmission train comprises:
an outer member comprising an input gear at a first end; and
an inner member comprising an output gear at a second end;
wherein a first end of the inner member of the second telescoping drive shaft is received within and slidably couples with the outer member of the second telescoping drive shaft through a second end of the outer member;
wherein the second power transmission train further comprises a gear configured to engage the output gear of the second telescoping drive shaft of the second power transmission train, wherein the gear of the second power transmission train is configured to drive the tractive element to rotate for steering.

6. The suspension system of claim 1, wherein the third telescoping drive shaft of the third power transmission train comprises:
an outer member comprising an input gear at a first end; and
an inner member comprising an output gear at a second end;
wherein a first end of the inner member of the third telescoping drive shaft is received within and slidably couples with the outer member of the third telescoping drive shaft through a second end of the outer member;
wherein the third power transmission train further comprises a gear configured to engage the output gear of the third telescoping drive shaft, wherein the gear of the third power transmission train is configured to drive the wheel hub to rotate.

7. The suspension system of claim 1, wherein the first telescoping drive shaft, the second telescoping drive shaft, and the third telescoping drive shaft are coaxial with each other, and each configured to rotate about a common axis.

8. The suspension system of claim 1, wherein the housing is a telescoping housing comprising:

an outer housing; and
an inner housing configured to be received within the outer housing and slide relative to the outer housing.

9. The suspension system of claim 8, wherein the first telescoping drive shaft, the second telescoping drive shaft, the third telescoping drive shaft, and the telescoping housing are configured to increase or decrease in length in unison.

10. The suspension system of claim 9, wherein the first power transmission train, the second power transmission train, and the third power transmission train are configured to continuously drive the tractive element for transportation, rotate the tractive element for steering, or rotate the wheel hub while the first telescoping drive shaft, the second telescoping drive shaft, the third telescoping drive shaft, and the telescoping housing are increasing or decreasing in length.

11. A suspension system for a vehicle, the suspension system comprising:
a plurality of suspension sub-systems, each angularly offset from each other and each comprising:
a wheel hub;
a tractive element rotatably coupled with the wheel hub and configured to be driven for transportation and rotated for steering;
a housing; and
a plurality of power transmission trains positioned at least partially within the housing, wherein each of the plurality of power transmission trains are configured to independently drive the tractive element for transportation, to drive the tractive element to rotate for steering, or to drive the wheel hub to rotate.

12. The suspension system of claim 11, wherein the housing of each of the plurality of suspension sub-systems is a telescoping housing, and each of the plurality of power transmission trains comprise a telescoping drive shaft, wherein the telescoping drive shafts of the plurality of power transmission trains and the telescoping housing of each of the plurality of suspension systems are configured to increase or decrease in length to translate the tractive element in a radial direction.

13. The suspension system of claim 12, wherein the plurality of power transmission trains are each configured to independently drive the tractive element for transportation, to drive the tractive element to rotate for steering, or to drive the wheel hub to rotate, while the telescoping housing and each of the plurality of power transmission trains increase or decrease in length in unison.

14. The suspension system of claim 11, further comprising a body member, wherein the housing of each of the plurality of suspension sub-systems is fixedly coupled with the body member.

15. The suspension system of claim 13, wherein the body member is rotatably coupled with a frame of the vehicle to rotate the plurality of suspension sub-systems in unison about the body member.

16. The suspension system of claim 11, wherein the plurality of suspension sub-systems comprises three suspension systems, each angularly offset from each other 120 degrees.

17. The suspension system of claim 11, wherein each of the plurality of suspension sub-systems comprises a damper piston fixedly coupled with the housing, wherein the damper piston comprises an outer member comprising an inner volume and an inner member configured to extend and retract within an inner volume of the outer member.

18. A vehicle comprising:
a chassis; and a suspension system coupled with the chassis, the suspension system comprising:

a wheel hub;

a tractive element rotatably coupled with the wheel hub and configured to be driven for transportation and rotated for steering;

a housing;

a first power transmission train positioned at least partially within the housing configured to drive the tractive element for transportation, the first power transmission train comprising a first telescoping drive shaft;

a second power transmission train positioned at least partially within the housing configured to drive the tractive element to rotate for steering, the second power transmission train comprising a second telescoping drive shaft;

wherein the first telescoping drive shaft is positioned within the second telescoping drive shaft, and both the first telescoping drive shaft and the second telescoping drive shaft are positioned within the housing.

19. The vehicle of claim 18, wherein the suspension system further comprises:

a third power transmission train positioned at least partially within the housing for rotating the wheel hub of the suspension system, the third power transmission train comprising a third telescoping drive shaft positioned within the housing, wherein the first telescoping drive shaft and the second telescoping drive shaft are both positioned within an inner volume of the third telescoping drive shaft.

20. The vehicle of claim 18, comprising a plurality of the suspension system, wherein the housing of each of the plurality of the suspension systems is fixedly coupled with a central member, and the central member is rotatably coupled with the chassis to rotate the plurality of the suspension systems in unison.

* * * * *